US010098506B2

(12) United States Patent
Dickson, Jr. et al.

(10) Patent No.: US 10,098,506 B2
(45) Date of Patent: Oct. 16, 2018

(54) GEAR SYSTEM FOR MIXERS AND MIXER ATTACHMENTS

(71) Applicant: BlendTec, Inc., Orem, UT (US)

(72) Inventors: Thomas D. Dickson, Jr., Orem, UT (US); Travis J. Mittanck, Springville, UT (US); Javier E. Jimenez, Provo, UT (US); Tyson D. Triplett, Provo, UT (US); Craig C. Hardcastle, Lehi, UT (US); Scott C. Losee, Santaquin, UT (US); Christian D. Mills, Highland, UT (US); Gregory D. Jackson, Bountiful, UT (US); Heber J. Redd, American Fork, UT (US)

(73) Assignee: BLENDTEC, INC., Orem, UT (US)

( * ) Notice: Subject to any disclaimer, the term of this patent is extended or adjusted under 35 U.S.C. 154(b) by 368 days.

(21) Appl. No.: 14/640,731

(22) Filed: Mar. 6, 2015

(65) Prior Publication Data

US 2016/0256006 A1  Sep. 8, 2016

(51) Int. Cl.
*A47J 43/07* (2006.01)
*A47J 43/08* (2006.01)
(Continued)

(52) U.S. Cl.
CPC ......... *A47J 43/0722* (2013.01); *A47J 43/046* (2013.01); *A47J 43/07* (2013.01);
(Continued)

(58) Field of Classification Search
CPC ...... A47J 43/08; A47J 43/085; A47J 43/0722; A47J 43/0766; A47J 43/0772; A47J 43/07;
(Continued)

(56) References Cited

U.S. PATENT DOCUMENTS 1,175,530 A * 3/1916 Kirchhoff ................. B01F 7/30
366/197
1,485,647 A * 3/1924 Ashley ..................... B01F 7/30
366/297
(Continued)

OTHER PUBLICATIONS

"Gear Mesh Misalign" article within Gear Solutions (Jun. 2006) p. 36-27.*

*Primary Examiner* — Tony G Soohoo
(74) *Attorney, Agent, or Firm* — Dorsey & Whitney LLP

(57) ABSTRACT

A variable-engagement planetary food mixing tool for attachment to a motorized food mixing apparatus is presented. The tool has a body that has a driveshaft engagement portion and a first longitudinal axis. The tool also has a sun gear concentric with the first longitudinal axis, wherein the sun gear has a first helical gear surface. A planet gear with a second longitudinal axis is also included, wherein the second longitudinal axis is non-parallel to the first longitudinal axis. The planet gear has a second helical gear surface extending around the second longitudinal axis. The planet gear is configured to engage the first helical gear surface of the sun gear in one or more positions along the second longitudinal axis. A mixing member is connected to the planet gear and moves around the first longitudinal axis while rotating around the second longitudinal axis as the planet gear traverses the sun gear.

14 Claims, 37 Drawing Sheets

(51) Int. Cl.
*A47J 43/046* (2006.01)
*B01F 7/00* (2006.01)
*B01F 7/02* (2006.01)
*B01F 7/14* (2006.01)
*B01F 7/16* (2006.01)
*B01F 7/30* (2006.01)
*B01F 15/00* (2006.01)

(52) U.S. Cl.
CPC ....... *A47J 43/0766* (2013.01); *A47J 43/0772* (2013.01); *A47J 43/08* (2013.01); *A47J 43/085* (2013.01); *B01F 7/00583* (2013.01); *B01F 7/021* (2013.01); *B01F 7/14* (2013.01); *B01F 7/30* (2013.01); *B01F 15/00201* (2013.01); *B01F 7/00658* (2013.01); *B01F 7/162* (2013.01); *B01F 2015/00597* (2013.01)

(58) Field of Classification Search
CPC ........... A47J 43/046; B01F 7/14; B01F 7/162; B01F 7/30; B01F 15/00201; B01F 7/021; B01F 7/00583; B01F 2015/00597; B01F 7/00658
USPC ......................................................... 366/343
See application file for complete search history.

(56) References Cited

U.S. PATENT DOCUMENTS

| | | | | |
|---|---|---|---|---|
| 1,491,831 | A * | 4/1924 | Ashley | B01F 7/30 74/16 |
| 2,003,829 | A * | 6/1935 | Gilbert | A47J 43/046 366/198 |
| 2,054,648 | A * | 9/1936 | Otto | B01F 7/30 366/245 |
| 3,126,196 | A * | 3/1964 | Staeger | A47J 43/046 366/287 |
| 4,044,632 | A * | 8/1977 | Wildhaber | A47J 43/08 74/410 |
| 4,079,917 | A * | 3/1978 | Popeil | A47J 43/082 366/244 |
| 4,311,397 | A * | 1/1982 | Wright | A21C 1/006 366/287 |
| 4,337,000 | A * | 6/1982 | Lehmann | A21C 1/1405 366/288 |
| 4,591,273 | A * | 5/1986 | Meyer | A47J 43/046 366/288 |
| 4,786,184 | A * | 11/1988 | Berezkina | B01F 7/305 366/288 |
| 4,802,407 | A * | 2/1989 | Negri | A01J 25/001 366/145 |
| 5,088,652 | A * | 2/1992 | Chen | A47J 42/46 241/169.1 |
| 5,267,790 | A * | 12/1993 | Sutherland | B01F 7/161 366/145 |
| 5,380,086 | A | 1/1995 | Dickson | |
| 6,652,137 | B1 * | 11/2003 | Bosch | B01F 7/00291 366/288 |
| 8,707,862 | B1 * | 4/2014 | Oliver | A47J 36/165 99/326 |
| 2004/0120215 | A1 * | 6/2004 | Huang | A21C 1/02 366/203 |
| 2004/0120216 | A1 * | 6/2004 | Donthnier | B01F 7/161 366/203 |
| 2004/0159244 | A1 * | 8/2004 | Leason | A47J 36/165 99/348 |
| 2004/0208082 | A1 * | 10/2004 | Huang | A21C 1/02 366/206 |
| 2005/0018534 | A1 * | 1/2005 | Nikkah | A47J 43/042 366/205 |
| 2007/0297283 | A1 * | 12/2007 | Ta | A47J 43/044 366/272 |
| 2009/0135666 | A1 * | 5/2009 | Watano | B01J 2/10 366/98 |
| 2012/0155215 | A1 * | 6/2012 | Verma | B01F 7/1695 366/199 |
| 2015/0083837 | A1 * | 3/2015 | Thienel | B01F 7/20 241/65 |
| 2015/0150416 | A1 * | 6/2015 | Hoare | A47J 43/0711 366/344 |
| 2016/0000266 | A1 * | 1/2016 | Potter | A47J 43/087 241/199.12 |
| 2016/0256005 | A1 * | 9/2016 | Dickson, Jr. | A47J 43/0722 |
| 2016/0256006 | A1 * | 9/2016 | Dickson, Jr. | B01F 15/00201 |
| 2016/0256007 | A1 * | 9/2016 | Dickson, Jr. | A47J 43/0722 |
| 2016/0256008 | A1 * | 9/2016 | Dickson, Jr. | B01F 13/045 |
| 2016/0256839 | A1 * | 9/2016 | Dickson, Jr. | B01F 15/00305 |

* cited by examiner

GEAR SYSTEM FOR MIXERS AND MIXER ATTACHMENTS

TECHNICAL FIELD

The present disclosure relates generally to food preparation apparatuses, systems, and methods and relates particularly to food mixing machines and methods with improved mixing quality and user interaction and interface.

BACKGROUND

Food mixing machines are used to stir, mix, and knead ingredients in bowls. Stand mixers, for example, are food mixing machines that have a motor mounted in a weight-bearing frame or stand. The motor rotates mixing or agitating tools such as paddles, whisks, wire whips, and hooks while they are positioned in a bowl or other mixing container. The motorized tools mix, knead, whip, and stir ingredients in the bowl to save time and labor.

Conventional food preparation equipment frustrate users in many ways. For a given task, if the wrong attachment tool is used, the machine may perform poorly or even cause damage to the mixer or tool. Users are therefore burdened with a need to spend time to learn how and when to use each tool, often with less-than-ideal results. Also, users often have to learn by trial and error how long and at what speeds a machine needs to mix or knead certain recipes. This often leads to wasted batches of ingredients that are improperly mixed.

Also, food mixers may not effectively mix small volumes of ingredients. Mixer tools do not usually reach far enough into a bowl to be able to mix or whip small portions of ingredients by themselves since the ingredients settle below the tips of the tools or otherwise do not get enough engagement with mixing implement. For example, a typical mixer requires three or more egg whites to make meringue, but would be unable to do so with one egg white. A mixer tool can be configured to fit tightly against a bottom surface of the bowl, but the tool can be damaged if the tool is then operated without the bowl correctly positioned, if the tool gets bent, or if heavy or solid ingredients resist the precisely configured movement of the tool.

Some food mixers do not have lids over the bowls, so powdery or liquid ingredients may easily splash or float out of the bowl during mixing, especially when the mixer runs at high speeds. Other mixers have lids or covers for the bowl that limit expulsion of ingredients, but they do not effectively provide access or vision of the interior of the bowl. Also, because the lids may be difficult or time-consuming to attach to the bowl, they may detrimentally come off as mixing tools are moving. These lids usually also have a central opening that opens directly above a mixer tool attachment, so when ingredients are added to the mix, they are placed at least partially on top of the tool attachment in a way that unnecessarily slows down the user, prolongs mixing tasks, and wastes ingredients.

There is therefore a need for improvements in food preparation and mixing equipment and methods.

SUMMARY

According to one aspect of the present disclosure, a food mixing machine for mixing ingredients is provided. The food mixing machine may comprise a base unit configured to rest on a horizontal surface. A motor may be positioned in the base unit, A bowl may be attached to the base unit, wherein the bowl may have a longitudinal axis extending at an angle that is non-parallel relative to a gravitational direction while the base unit is resting on the horizontal surface. A mixing tool may be positioned in the bowl, wherein the mixing tool may be operably connected to the motor to receive a torque from the motor and to move within the bowl to mix contents of the bowl.

The food mixing machine may have an angle that measures between about 165 degrees and about 175 degrees relative to the gravitational direction. The bowl may further comprise a central opening and the base unit further comprises a drive shaft, with the drive shaft extending through the central opening and connecting to the mixing tool. The bowl may comprise a central column extending through the bowl. The bowl may comprise an annular receptacle for holding ingredients. The bowl may also be removably attached to the base unit. The base unit may further comprise a nest portion, wherein the bowl may be attached to the base unit within the nest portion.

The mixing tool may be movable along the longitudinal axis of the bowl and may comprise a first gear surface engaging a second gear surface torqued by the motor. The first gear surface and the second gear surface may be helical.

A lid may cover the bowl, wherein the lid may have a recessed top surface that has a side portion in which an aperture is formed, and the aperture may open into the bowl. The lid may be attachable to the bowl in a plurality of positions. The aperture may be offset from the longitudinal axis of the bowl and may be formed in a nadir of the recessed top surface. The aperture may also comprise a first width at a first end of the aperture and a second width at a second end of the aperture, wherein the first width is larger than the second width. The mixing tool may be configured to rotate in a direction of rotation relative to the bowl, wherein the first end of the aperture in the lid is upstream of the second end of the aperture relative to the direction of rotation of the mixing tool.

In some embodiments, the base unit may comprise a plurality of housing portions connected to each other, with the plurality of housing portions forming an outer surface of the base unit that is water-tight. The bowl, motor, and mixing tool may be concentrically aligned along the longitudinal axis. The mixing tool may be directly driven by a drive shaft extending from the motor.

Another aspect of the disclosure relates to a method for improving mixture of ingredients in a food mixing machine. The method may comprise providing a food mixing machine having a base unit, a bowl attached to the base unit, a mixing tool positioned in the bowl, and a motor configured to rotate the mixing tool relative to the bowl, wherein the bowl may have a longitudinal axis. The method may further comprise positioning the base unit of the food mixing machine on a horizontal surface with the longitudinal axis of the bowl being non-perpendicular to the horizontal surface, inserting an ingredient into the bowl, and mixing the ingredient by rotating the mixing tool using the motor.

In some embodiments the ingredient is gravitationally biased to settle toward one side of the bowl. The mixing tool may be removably attached to the base unit. The method may also comprise attaching the mixing tool to a drive shaft, the drive shaft being rotatable by the motor. The mixing tool may be rotated upon attachment to or detachment from the base unit. Positioning the base unit may comprise positioning the longitudinal axis of the bowl at an angle between about 75 and about 85 degrees relative to the horizontal surface. Positioning the base unit may comprise placing a bottom surface of the base unit on the horizontal surface.

Positioning the base unit may comprise resting a plurality of feet of the base unit on the horizontal surface. The mixing tool may be configured to touch a bottom surface of the bowl while mixing the ingredient. In some arrangements, the method may further comprise inserting a drive shaft of the food mixing machine through the bowl.

Another aspect of the disclosure is a food preparation machine for mixing ingredients, wherein the food preparation machine comprises a base unit positionable on a horizontal surface and a bowl extending from the base unit, with the bowl having a first side and a second side, the first side being positioned closer to the horizontal surface than the second side. The machine may also comprise a mixing tool positioned in the bowl, with the mixing tool being operable to move within the bowl to mix contents of the bowl, and a motor positioned in the base unit and configured to rotate the mixing tool relative to the bowl.

In this machine, a plane extending through a bottom surface of the bowl may be positioned at a non-perpendicular angle relative to a vertical axis through the base unit. The bowl may be removably attached to the base unit. The bowl may comprise an annular shape. drive shaft may extend centrally through the bowl into engagement with the mixing tool. The mixing tool may be removably attached to the drive shaft. The mixing tool may be configured to contact a bottom surface of the bowl at least on the first side of the bowl. The base unit may comprise a plurality of housing portions connected to each other, the plurality of housing portions forming an outer surface of the base unit that is water-tight.

Another aspect of the disclosure relates to a food mixer that may comprise a base unit having a tool attachment portion, a mixing bowl attached to the base unit, and a motor attached to the base unit. The motor may have operational settings and may be configured to apply a torque to the tool attachment portion. A. mixing tool may be removably attached to the tool attachment portion, and a controller unit may be configured to detect the mixing tool attached to the tool attachment portion and to automatically control the operational settings of the drive motor based on the mixing tool detected.

The tool attachment portion may comprise a detection magnet and the base unit may comprise a sensor. The sensor may be connected to the controller unit and may be configured to sense a magnetic field of the detection magnet. The sensor may also be configured to determine a distance between the detection magnet and the sensor or to detect movement of the detection magnet. The detection magnet may be biased toward or away from the sensor by a biasing member. The food mixer may also comprise a magnet holder and a second magnet, the magnet holder being positioned within the tool attachment portion, the detection magnet being attached to a first end of the magnet holder, the second magnet being attached to a second end of the magnet holder, and wherein the second end is positioned proximate to the sensor in comparison to the first end.

The operational settings may comprise at least one of an operating speed, an operating time, and an operating power of the motor. The controller unit may be configured to detect a power level and a rotation speed of the motor and to output a signal if the rotation speed of the motor rises above an upper threshold value or falls below a lower threshold value for the power level and for the mixing tool detected. In some embodiments, the signal disables the motor. The signal may also output a message to a user interface.

Yet another aspect of the disclosure is a fast-stop food preparation apparatus. It may comprise a base unit, a mixing container attached to the base unit, a mixing tool configured to extend into and move within the mixing container, and a motor within the base unit. The motor may be configured to provide a torque to the mixing tool. A control unit may be within the base unit and connected to the motor. A contact sensor may be connected to the control unit, wherein the control unit is configured to stop rotation of the motor when the contact sensor detects a touch of a human hand.

In some arrangements, the mixing tool comprises a mixing member extending into the mixing container, wherein the contact sensor is connected to the mixing member and is configured to detect a touch of a human hand in contact with the mixing member. The mixing member may be an elongated hook, whisk, or kneading member. The base unit may comprise an outer surface, wherein the contact sensor is connected to the outer surface and is configured to detect a touch of a human hand in contact with the outer surface. This outer surface may be a user interface portion of the base unit.

The controller may he configured to stop rotation of the motor by reversing a motor drive direction of the motor. The motor may be configured to stop almost instantaneously, and more specifically within just a few degrees of a revolution. In some configurations the mixing tool may be configured to rotate within the mixing container, and the mixing container may be a bowl.

Another aspect of the disclosure relates to a programmable food preparation system. The system may include a food preparation apparatus that has a mixing container, a mixing tool extending into the mixing container, a motor configured to apply a torque to the mixing tool, a controller unit connected to the motor and configured to control an operational setting of the motor, and a first wireless communication interface in communication with the controller unit. The system may also include a remote control device comprising a computing device configured to receive operational parameters of the motor, and a second wireless communication interface configured to connect to the first wireless communication interface to transfer the operational parameters to the controller unit using the computing device. The controller unit may he configured to control the operational setting of the motor according to the operational parameters for preparing food in the mixing container using the mixing tool.

In some embodiments, the remote control device may comprise a connection to the Internet and may be configured to receive the operational parameters of the motor via the connection to the Internet. The remote control device may comprise a user interface and may be configured to receive the operational parameters of the motor via the user interface. The user interface may be touch-sensitive and may be positioned within a housing of the food preparation apparatus. The remote control device may also be portable.

The controller may be configured to stop rotation of the motor by reversing a motor drive direction of the motor. The motor may be configured to stop almost instantaneously, and more specifically within just a few degrees of a revolution. In some configurations the mixing tool may be configured to rotate within the mixing container, and the mixing container may be a bowl.

Still another aspect of the disclosure relates to a food preparation apparatus which may comprise a base unit, a mixing container attached to the base unit, a magnet sensor linked to the base unit, a mixing tool positioned in the mixing container, and a motor within the base unit that is configured to provide a torque to the mixing tool to move the mixing member within the mixing container. A lid may be removably attachable to the mixing container, and the lid may have a magnet positioned proximate the magnet sensor of the mixing container when the lid is attached to the mixing container in a locked orientation. A control unit may be connected to the magnet sensor and the motor, and the control unit may be configured to disable rotation of the motor when the lid is not in the locked orientation.

The magnet sensor may be positioned at a top end portion of the mixing container and may be a Reed switch. The lid may be attachable to the mixing container in a plurality of locked orientations.

The mixing container may be removably attached to the base unit, wherein the mixing container may comprise a first electrical interface connected to the magnet sensor, and the base unit may comprise a second electrical interface connected to the controller. The first and second electrical interfaces may be connected to each other when the mixing container is removably attached to the base unit in order to provide electrical connection between the magnet sensor and the control unit. The lid may comprise a flexible portion, and the magnet may be positioned in the flexible portion. The base unit may comprise a lid detection portion extending toward the lid, wherein the magnet sensor may be positioned in the lid detection portion.

Another aspect of the disclosure is related to a variable-engagement planetary food mixing tool for attachment to a motorized food mixing apparatus. The tool may comprise a body having a driveshaft engagement portion and a first longitudinal axis and a sun gear concentric with the first longitudinal axis, wherein the sun gear may have a first helical gear surface. A planet gear having a second longitudinal axis may also be included, with the second longitudinal axis being non-parallel to the first longitudinal axis, and the planet gear having a second helical gear surface extending around the second longitudinal axis. The planet gear may engage the first helical gear surface of the sun gear in a plurality of positions along the second longitudinal axis. A mixing member may be connected to the planet gear and may be configured to move around the first longitudinal axis while rotating around the second longitudinal axis as the planet gear traverses the sun gear.

In some embodiments, the driveshaft engagement portion may comprise a third helical gear surface configured to engage a gear surface of a driveshaft. The sun gear may comprise a bowl engagement portion that is configured to hold the sun gear stationary relative to a bowl when the bowl is inserted into the sun gear. The mixing member may be at least one of a hook, a whisk, a blade, or a kneading member.

The position of the planet gear along the second longitudinal axis may be dependent upon a velocity of movement of the planet gear relative to the sun gear. The position of the planet gear along the second longitudinal axis may be dependent upon a force applied to the mixing member along the second longitudinal axis. The first helical gear surface may have a first plurality of gear teeth and the second helical hear surface may have a second plurality of gear teeth, and the first plurality of gear teeth may not be a multiple of the second plurality of gear teeth.

The mixing member may comprise a plurality of wires, each of the wires having a diameter between about 0.09 inches and about 0.2 inches. In some embodiments the mixing member may comprise a plurality of wires forming a whisk shape, with each of the wires having a distal end extending away from the planet gear, and wherein the plurality of wires are laterally separable from each other at the distal ends or are non-overlapping along a longitudinal axis of the mixing member.

In another embodiment, a motorized food mixing apparatus having a variable engagement planetary food mixing tool is provided. The mixing apparatus may comprise a base unit and a motor housed in the base unit. A driveshaft may be rotatable by the motor, with the driveshaft having a first longitudinal axis. A mixing container may be attached to the base unit, and a mixing tool may be included that comprises a body engaging the driveshaft, a sun gear concentric with the first longitudinal axis, the sun gear having a first helical gear surface, a planet gear having a second longitudinal axis, the second longitudinal axis being non-parallel to the first longitudinal axis, the planet gear having a second helical gear surface extending around the second longitudinal axis and engaging the first helical gear surface of the sun gear in a plurality of positions along the second longitudinal axis, and a mixing member extending into the mixing container, wherein the mixing member is connected to the planet gear and configured to move around the first longitudinal axis while rotating around the second longitudinal axis as the planet gear traverses the sun gear.

The mixing container may comprise a post and the sun gear of the mixing tool may comprise an engagement surface, wherein the engagement surface engages the post and holds the sun gear stationary relative to the post. The mixing member may rest against a bottom surface of the mixing container. The first longitudinal axis may be tilted away from a vertical direction.

Another embodiment discloses a food mixer which may comprise a base unit having a tool attachment portion. A mixing bowl may be attached to the base unit. A motor may be attached to the base unit, wherein the motor may have operational settings and may be configured to apply a torque to the tool attachment portion. A mixing tool may be removably attached to the tool attachment portion. A temperature sensor of the mixer may be configured to measure a temperature of the motor, and a controller unit may be configured to receive measurements of the temperature of the motor and to reference motor efficiency data to determine an output power of the motor.

Yet another embodiment discloses a method of controlling a food mixer apparatus that comprises providing a mixer apparatus having a motor connected to a mixing tool attachment, an input power sensor for the motor, and a temperature sensor for the motor. The mixing tool attachment may extend into a mixing container. The method may further comprise operating the motor to rotate the mixing tool attachment, and measuring the temperature of the motor using the temperature sensor and the input power of the motor using the input power sensor while the motor is operating. The method may then comprise calculating the output power of the motor using the input power and the temperature of the motor and adjusting operational settings of the motor based on the calculated output power.

The above summary of the present invention is not intended to describe each embodiment or every implementation of the present invention. The Figures and the detailed description that follow more particularly exemplify a preferred embodiment.

BRIEF DESCRIPTION OF THE DRAWINGS

The accompanying drawings and figures illustrate a number of exemplary embodiments and are part of the specification. Together with the present description, these drawings demonstrate and explain various principles of this disclosure. A further understanding of the nature and advantages of the present invention may be realized by reference to the following drawings, In the appended figures, similar components or features may have the same reference label.

Figure 1A:
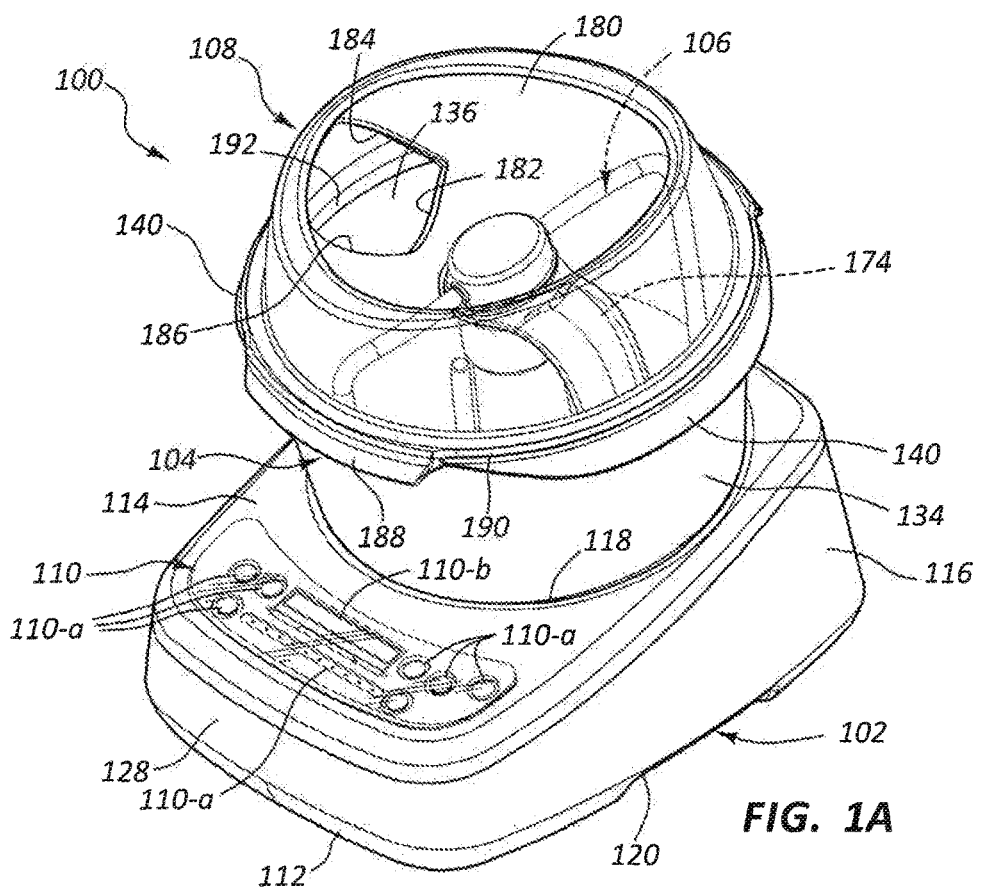
FIG. 1A is a perspective view of a mixer apparatus according to the present disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

Apparatuses, systems, and methods of the present disclosure may provide improved and effective ways to limit or overcome drawbacks of conventional food preparation devices.

In one aspect of the present disclosure, a food mixing device and method are provided that tilt at least the mixing container (e.g., bowl) at an angle relative to a vertical direction while mixing takes place. The angle may be within a range of about 5 degrees to about 15 degrees off-vertical while the base of the mixing device is resting on a flat horizontal surface. One advantage to moving the blender base and bowl to an angle of about 10 degree angle is an improved alignment of the arcuate bowl radius and the center action of the moving/rotating whisks, paddles and dough hooks. This may help to more effectively and quickly align and engage the mixing tools with the media being mixed in the bowl. The tilted geometry provides effective mixing due to swirling and settling motion in the ingredients that is induced by gravity as the ingredients are mixed and agitated. The tilt may also help ingredients to more readily slide off of the angled side surfaces of the bowl and attachments so that they gather downward and toward one side of the bowl for more thorough and efficient mixing with less unincorporated waste ingredients. By comparison, users of a conventional mixer would be more likely have to stop mixing, scrape the sides clean of unmixed ingredients, and then resume mixing in order to ensure complete intermixing.

Additionally, this arrangement and alignment facilitates mixing of small amounts or volumes of recipe mixing materials that other conventional mixers cannot engage due to spacing between the mixer attachments and the bowl. For instance, a tilted-bowl mixing machine may help ingredients to settle or pool on one side of the bowl, so the depth of the ingredients in that side of the bowl is greater than the depth of ingredients that would be distributed evenly across the entire bottom surface of the bowl. This is particularly effective when the bowl has an annular shape similar to a bundt pan with a central column, since the depth of the settled or pooled ingredients on one side of the annular shape is even deeper than a normal, semispherical bowl. For example, while typical mixers require three or more egg whites to make meringue, an angled mixer of the present disclosure may do so with only one egg white.

An angled bowl may also improve the visibility of the contents of the bowl in common settings, such as when the mixer is positioned on a countertop or shelf. A conventional mixer has a mixing container opening upward, so the user has to get closer to or farther above the top of the mixer in order to see the same amount of the interior as an angled-bowl mixer.

A mixer of the present disclosure may also have improvements for the convenience and effectiveness of a lid that covers the bowl of the mixer. The lid may comprise a recessed top surface configured to funnel media into an aperture that opens into the mixing container. The aperture may be offset from the center of the lid, thereby allowing media on top of the lid to flow or fall directly into the path of the mixing tools and ingredients already within the container. Additionally, the aperture may be shaped to keep ingredients from being ejected from the container by having a downstream side that is smaller than and/or raised higher than (i.e., has a smaller depth than) an upstream side of the aperture.

The lid may also be attached to the bowl in a plurality of positions, such as being attached with the aperture being selectively placed in a position that is more convenient for right-handed use or left-handed use. The bowl may be removably attachable to the base in a plurality of positions as well, so the aperture in the lid may be positioned in a plurality of positions relative to a base of the mixer by combining the plurality of positions of the lid relative to the bowl with the plurality of positions of the bowl relative to the base in order to achieve a customized aperture position. Conventional mixers tend to favor only right-handed users and have few options for the placement of any lid openings.

In some embodiments, the mixer may also comprise a lid sensor. The lid sensor may be positioned near the upper rim or lip of the mixing container and may detect the presence of the lid when it is attached to the mixing container. In some embodiments, the sensor may be at the end of a member extending toward the lid from the base of the mixer. The mixing machine may adjust its operation according to whether the lid is detected, such as by turning off the drive motor if the lid is removed, improperly attached, or otherwise not detected. In one embodiment, the lid sensor may be a Reed switch configured to detect the presence of a magnet in a portion of the lid. The lid sensor may be integrated with the mixing container, such as being located at the upper lip or rim of the container and having electrical leads leading down to a connection in the base of the mixer. The sensor may alternatively be positioned on a post or other member extending upward toward the position where the lid connects to the mixing container.

In another aspect of the disclosure, a waterproof mixer is set forth. The mixer may comprise a base unit or stand on which a mixing container is attachable. The panels or housing segments that house the motor and other electronics of the mixer may be configured to retain a gasket or other sealing element between each other so that liquids such as water cannot seep into the inside of the housing. Additionally, the motor may be configured as a low-noise, low-heat-producing, brushless DC motor that may drive a sealed driveshaft without the need for exhaust vents or other openings in the housing. Elements of the user interface of the mixer may be touch-capable or sealed beneath a waterproof layer so that liquids cannot penetrate the outer surface of the user interface (e.g., seep between the edge of a button and a housing panel).

Additional aspects of the disclosure relate to detection of attachments that are connected to a food mixer apparatus and correlative mixer control. In one example, the mixer may comprise a controller unit configured to detect whether a mixing tool is attached to the mixer and to control the operational settings of the motor of the mixer accordingly, such as if no tool is attached, the motor may be disabled. Alternatively, the mixer may detect the type of attachment that is attached, and the speed or power settings of the motor may be modified to properly mix using that attachment type. In one embodiment, the attachments may have a magnetic element that, when connected to the mixer apparatus, is detectable by a Hall effect sensor (or other magnet-sensitive sensor) in the mixer. Alternatively, the magnetic element may be detected by movement of a magnet in the base of the mixer (e.g. the driveshaft). Each attachment may induce a different voltage via the Hall effect sensor, so the mixer may determine which kind of attachment (e.g., dough hook, cookie whisk, etc.) is attached. In some cases, the controller unit may disable certain speeds, power levels, or torque levels of the motor based on the type of attachment used.

Certain embodiments of the present disclosure may concern a control system for a food preparation apparatus wherein the motor may be stopped quickly in cases of emergency. A mixing tool or agitator in a container of the apparatus may be connected to a touch sensor, wherein if a human hand comes into contact with the tool or agitator while the motor is operating, a controller may quickly turn off the motor or reverse its motion to cause it to come to a stop. In another embodiment, the controller may turn off or stop the motor when a hand comes into contact with the outer surface of the apparatus, such as a user interface surface or a housing of the apparatus. This may quickly limit movement of the motor in situations where a user may desire to stop the motion of a mixing tool extending into the mixing container.

Additional aspects of mixing apparatuses and methods may include remote control or programming of the mixing apparatuses. A remote control device such as a computing device (e.g., smartphone, tablet, or PC) may wirelessly connect to the mixing apparatus and transfer settings to the apparatus for mixing and preparing in a predetermined manner. For example, a user may determine a preferable mix cycle, power settings, timing, etc. for making a certain recipe, and those settings may be transferred to a controller in the apparatus to prepare that recipe according to those settings. In another example, a remote control device may comprise a scale or other measuring device that is configured to communicate with the controller of the apparatus to transmit weight or other measurements taken of ingredients for a desired recipe. The apparatus may then control the mixing cycle to prepare a recipe that is customized to the portions added to the apparatus after they are measured.

Some specialized attachments are also part of the present disclosure. The attachments may be mixing tools attachable to a food mixing apparatus, such as wires, whisks, hooks, or other mixing implements. Mixing tools may comprise a planetary gear system that allows the ends of the tools to extend into a mixing container at variable depths. In one embodiment, a mixing tool may extend downward to touch the bottom of a mixing container under light loads, but under heavier loads, the tool may retract upward, thereby increasing gear engagement in the planetary gear system and preserving effectiveness of the tool. The planetary gear system may also help make mixing more thorough by causing the planet gears to rotate around the sun gear in uneven patterns so that the mixing tools are at different angles of rotation each time they complete a revolution around the mixing container.

Another aspect of the present disclosure relates to a wire whisk tool. While conventional whisks can be difficult to clean due to small cracks or crevices in the tool where the wires meet or cross over each other, presently disclosed whisk tools may not have crossing wires and may therefore be easier to clean. The diameter of the wires in the whisk tool may also be greater than a typical whisk, with a diameter between about 0.09 inches and about 0.2 inches. Other conventional whisks are made of smaller diameter wire and are therefore more prone to damage and bending. They are also not as effective at making meringue, since the smaller diameter tends to break down the protein chains in the product being mixed, even though they are still small enough to whip air into the ingredients being mixed. The present whisks may also implement a ball plunger assembly to retain the whisks on the housing while still being easily removed for cleaning. Helical gear assemblies in the whisks are quieter than straight gears and create thrust on the whisks pulling them up based on the load. This may control the gap between the whisks and bottom of the bowl. When there is little load on the whisks they may ride on the bottom of the bowl, getting maximum engagement with the ingredients being mixed, and when the is load increased the whisks may travel upward from the bottom of the bowl to increase the gap between the bowl and the whisk and increase the engagement between the gears.

Yet another aspect of the present disclosure relates to a system for automatic kneading using a mixing apparatus. While conventional devices may be able to monitor the output power of the motor of the apparatus and control the motor's settings based on this information, the present systems may transduce temperature of the motor to track and account for changes in efficiency of the motor output in view of the input motor voltage and the measured motor current to determine the output power of the motor. Further, in embodiments where the motor directly drives the mixing tools, no gear train (and its own contributory inefficiencies) needs to be monitored or accounted for, so the calculation of the efficiency of the motor may be improved. Direct-drive mixer apparatuses also have less power losses, so the mixing action of the motor may be more powerful than existing devices.

The present description provides examples, and is not limiting of the scope, applicability, or configuration set forth in the claims. Thus, it will be understood that changes may be made in the function and arrangement of elements discussed without departing from the spirit and scope of the disclosure, and various embodiments may omit, substitute, or add other procedures or components as appropriate. For instance, the methods described may be performed in an order different from that described, and various steps may be added, omitted, or combined. Also, features described with respect to certain embodiments may be combined in other embodiments.

Mixer Apparatus

Various aspects of the present disclosure may be explained by reference to the figures. FIGS. 1A through 10 show aspects of an example embodiment of a mixer apparatus 100 of the present disclosure. The mixer apparatus 100 may comprise an assembly of elements, including at least a base unit 102 (i.e., a stand, housing, or support) that is configured to rest on a horizontal surface. A bowl 104 or other mixing container may be attached to or integrated with the base unit 102, and a rotary mixing tool 106 may be positioned in the bowl 104. The rotary mixing tool 106 may be operably connected to a motor 166 within the base unit 102 (see FIG. 8), whereby the motor may provide a torque or cause rotary movement of the rotary mixing tool 106, as described in further detail hereinafter. A lid 108 may be attached to the bowl 104 to cover the rotary mixing tool 106, the internal space of the bowl 104, and any ingredients or other media in the bowl 104.

The mixer apparatus 100 may be used as a food mixing device that may mix, knead, or otherwise stir and combine food ingredients or other media in the bowl 104 using a rotary mixing tool 106 such as, for example, a hook, wire, or whisk. In some embodiments, the mixer apparatus 100 may be used as a blending apparatus used to shear or pulverize food ingredients or other media using a rotary mixing tool 106 such as, for example, a blending blade.

The mixer apparatus 100 may have a variety of shapes and sizes. While the mixer apparatus 100 shown in these figures is a relatively small model configured to rest on a countertop or shelf and to hold several quarts of material in the bowl 104, other embodiments may comprise a larger or smaller apparatus, such as, for example, a machine configured to rest on the floor and to hold many gallons of material in its mixing container. Thus, those having ordinary skill in the art will appreciate that the mixer apparatus 100 may be scalable to various sizes and that the features and inventive elements of the mixer apparatus 100 may be implemented in forms of various other types of mixing and blending devices without departing from the spirit and scope of the present disclosure.

The base unit 102 may be a compact unit configured to rest on a horizontal surface such as a countertop, shelf, or tabletop. The base unit 102 may comprise a user interface 110, a bottom housing 112, an upper housing 114, and a side housing 116. A motor 166 and electronics unit 254 (e.g., power electronics and control electronics) may be housed within the base unit 102. See FIGS. 4-8. FIGS. 2A-2D show details of the base unit 102 and bowl 104 with the lid 108 and rotary mixing tool 106 detached. FIGS. 3A-3C show the base unit 102 also isolated from the bowl 104.

The bottom housing 112 may be the portion of the base unit 102 that is configured to rest on a flat horizontal surface. The exterior of the bottom housing 112 may comprise a rubberized layer 119 (or the bottom housing 112 may be constructed of a rubberized material) to enhance friction between the bottom housing 112 and other surfaces to which it comes into contact. See FIGS. 2B and 6-8. The bottom housing 112 may provide a continuous surface for the bottom of the base unit 102, meaning there are no vents or unsealed openings in the bottom housing when the mixer apparatus 100 is fully assembled. Any elements that extend through the bottom housing 112 may be sealed against intrusion by liquids or other materials through the bottom housing 112, such as by using gaskets, o-rings, or other liquid-tight seals. See also FIGS. 8-10.

The bottom housing 112 of the base unit 102 may include a plurality of side recesses 120 (i.e., grip features) configured to receive fingers of a human hand. The side recesses 120 may facilitate the grip of a user when the base unit 102 is lifted from a flat horizontal surface with the bottom surface 122 of the bottom housing 112 against the horizontal surface. Additionally, because the side recesses 120 are formed in the bottom housing 112, the side recesses 120 may be rubberized for additional grip. In some embodiments, a plurality of bumps or feet may extend from the bottom surface 122 and the base unit 102 may rest on each of the plurality of bumps or feet when placed on a horizontal surface.

The bottom housing 112 may comprise a bottom surface 122. See FIGS. 2B and 7-8 The bottom surface 122 may be generally planar, such that when the base unit 102 rests on a horizontal surface, the bottom surface 122 is parallel to the horizontal surface. A cord recess 124 may be formed in the bottom surface 122. The cord recess 124 may receive a cord wrapping guide 126. Thus, an electrical cord connected internally to the base unit 102 may extend through the cord recess 124 and be stored by the cord wrapping guide 126.

The side housing 116 extends peripherally around the exterior of the base unit 102. The side housing 116 may be generally symmetrical through a longitudinal plane of the base unit. The side housing may comprise a front end 128 and a rear end 130. As indicated in FIG. 3B, the front end 128 may have a shorter height (as measured from the bottom surface 122 or the horizontal surface on which the base unit 102 is rested) than the rear end 130. Thus, height $H_1$ of the front end 128 may be less than height $H_2$ of the rear end 130. This difference in $H_1$ and $H_2$ may contribute to the bowl 104 having a longitudinal axis L that is tilted relative to a vertical axis V through the base unit 102 at an angle A. See also FIG. 2C. In other words, one side of the bowl 104 may be closer to a bottom surface 122 of the mixer apparatus 100 (or a horizontal surface on which it is positioned) than the opposite side of the bowl 104 when the bowl 104 is mounted to the base unit 102. Alternatively said, a plane may extend through a bottom surface of the bowl 104 that is positioned at a non-parallel angle relative to a vertical axis (e.g., V) through the base unit 102.

Figure 12:
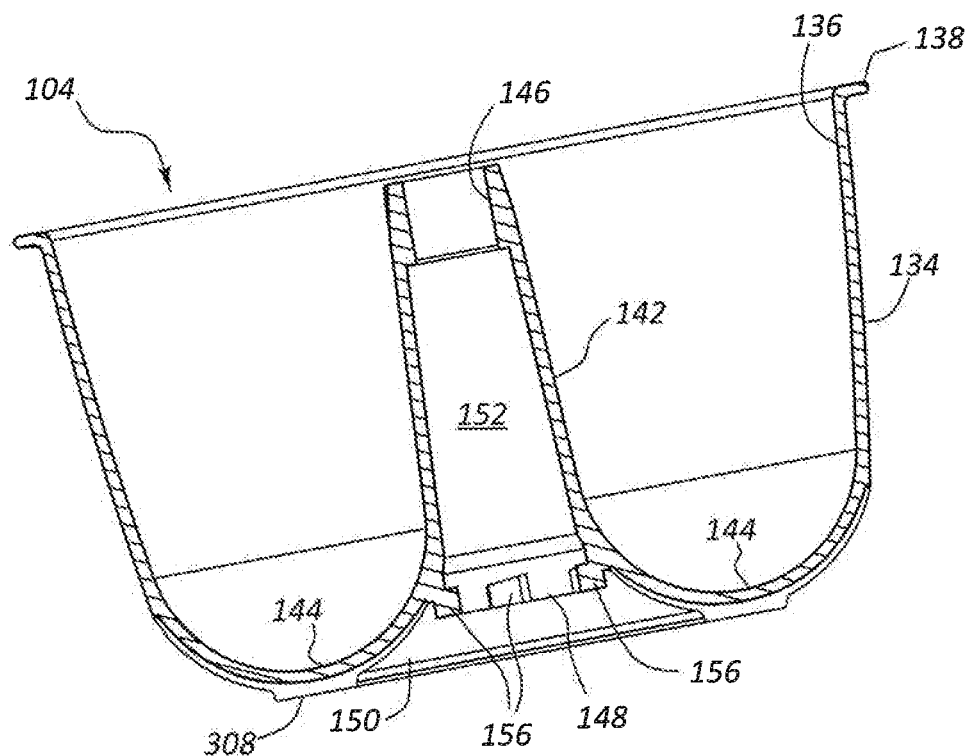
FIG. 12 is a central side section view of the bowl of FIG. 11.
Figure 13:
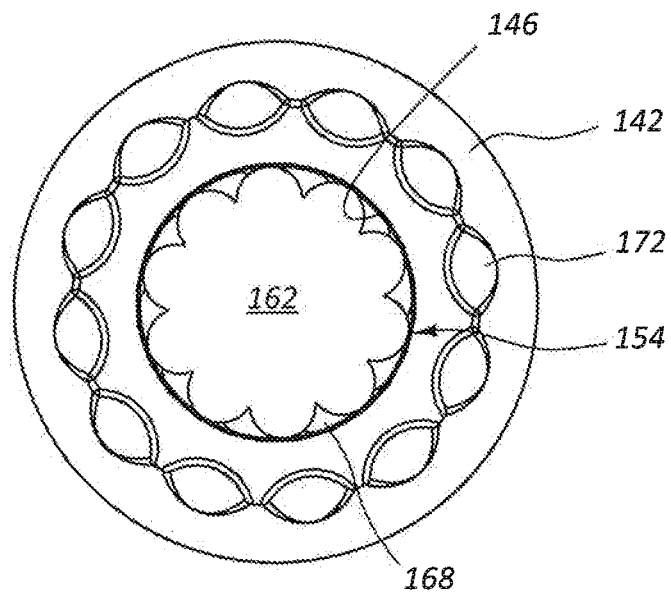
FIG. 13 is a detail top view of a central column of the bowl of FIG. 11.

An underside surface 150 of the bowl 104 (see FIGS. 7 and 12) may have a plane extending through it. The plane through the underside surface 150 may be positioned at a non-parallel and non-perpendicular angle relative to a vertical axis through the base unit 102 (e.g., vertical axis V of FIG. 3). The about 10-degree tilt of the bowl 104 makes this underside surface 150 non-perpendicular to axis V on the mixer apparatus 100. In some embodiments, the plane through the underside surface 150 extends across the bottom of the circular base portion 308 of the bowl 104 indicated in FIG. 7. The underside surface 150 may be referred to alternatively as a "bottom surface" of the bowl 104. In some cases, the bottom surface 144 of the interior of the bowl 104 may intersect the plane that is non-perpendicular to axis V extending through it. If the bottom surface 144 is curved (as shown in FIG. 12), this non-perpendicular plane may be defined as being perpendicular to the longitudinal axis of the bowl 104 or intersecting the bottom surface 144 at the same depth into the bowl at a plurality of points of contact between the bottom surface 144 and the non-perpendicular plane. For example, in the pictured embodiment, such a plane would contact the curve of the bottom surface 144 in a manner forming a circle in the plane due to the nadir of the bottom surface 144 being circular.

Figure 2A:
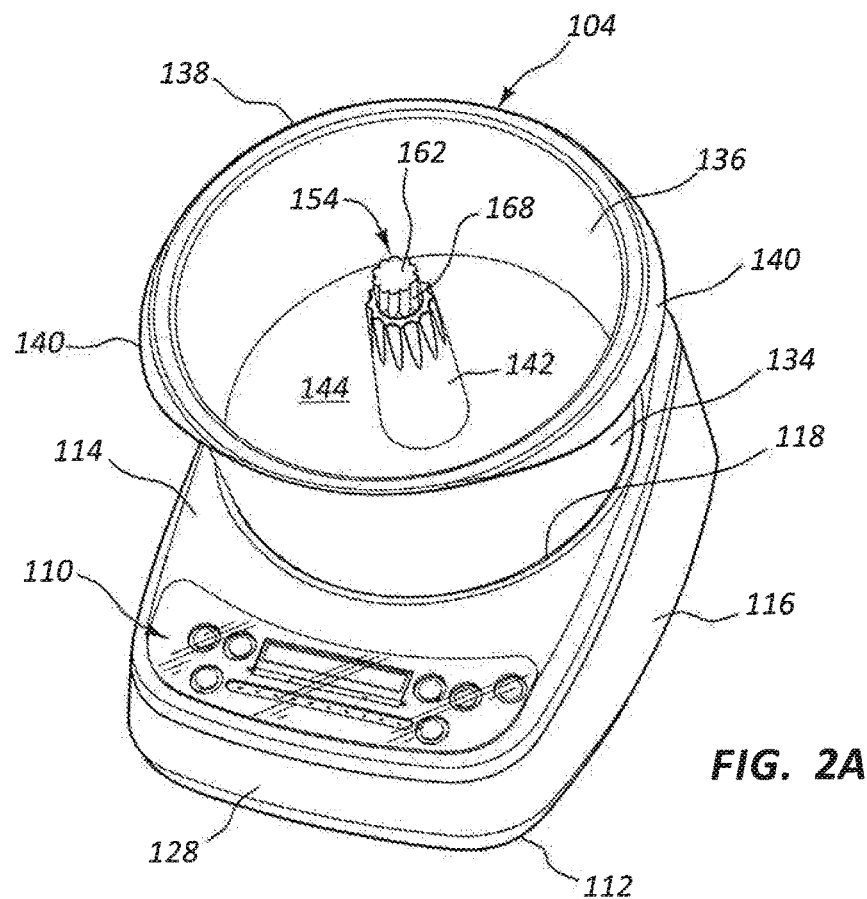
FIG. 2A is a perspective view of the mixer apparatus of FIG. 1A with the lid and mixing tool attachments removed.
Figure 2B:
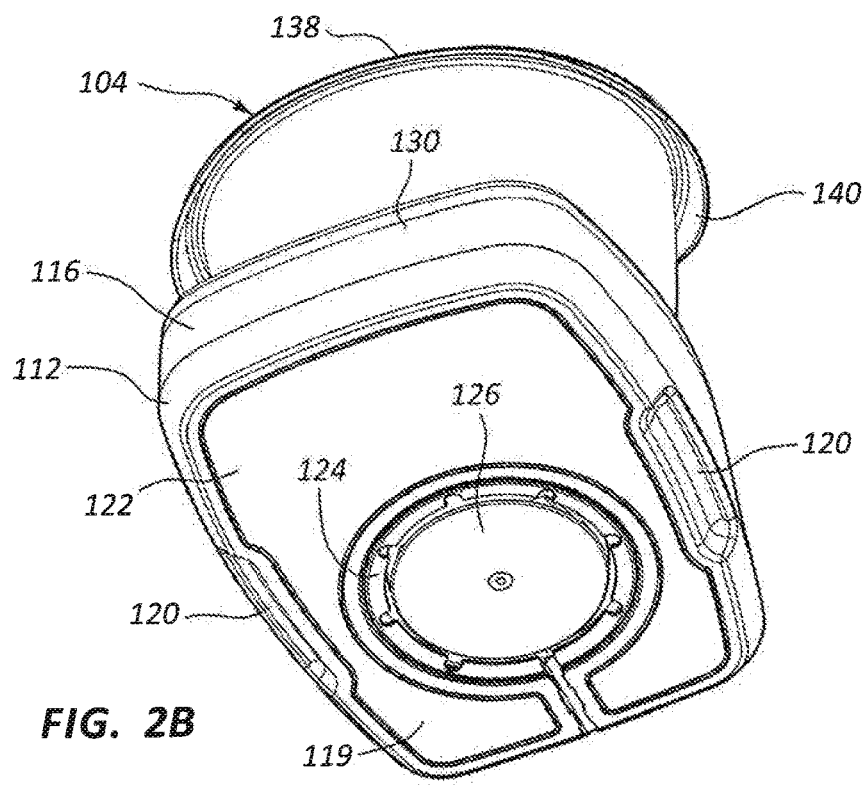
FIG. 2B is a bottom perspective view of the mixer apparatus of FIG. 2A.
Figure 2C:
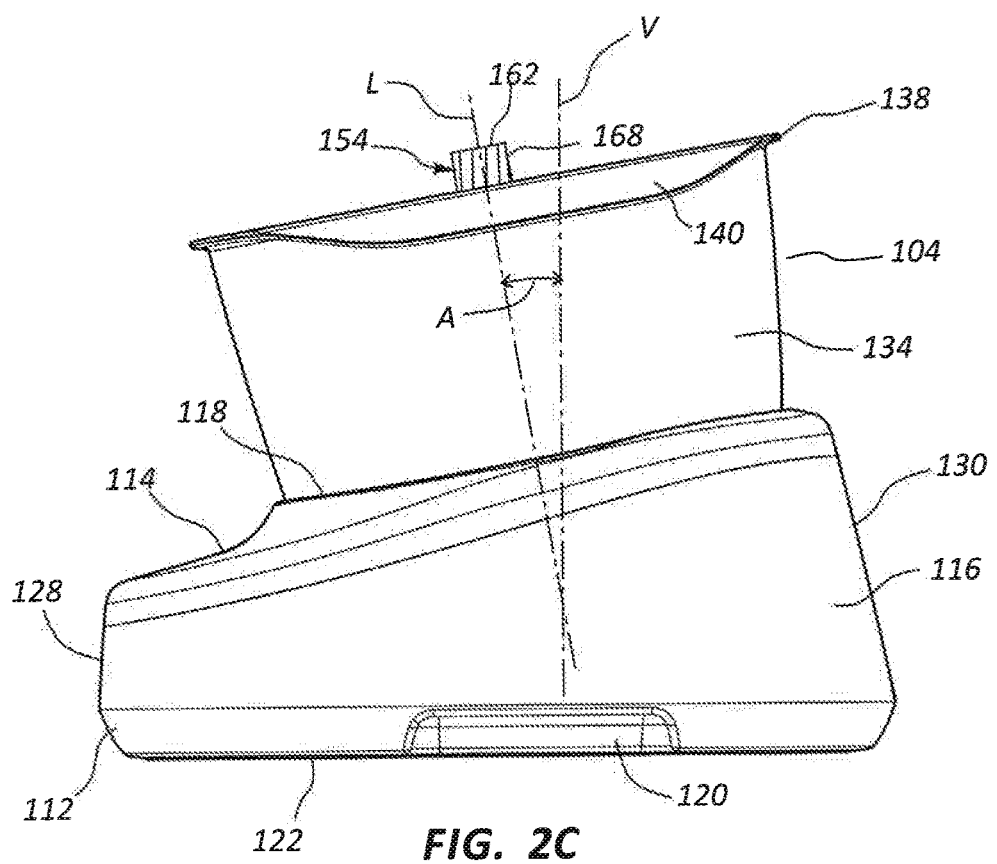
FIG. 2C is a side view of the mixer apparatus of FIG. 2A.
Figure 2D:
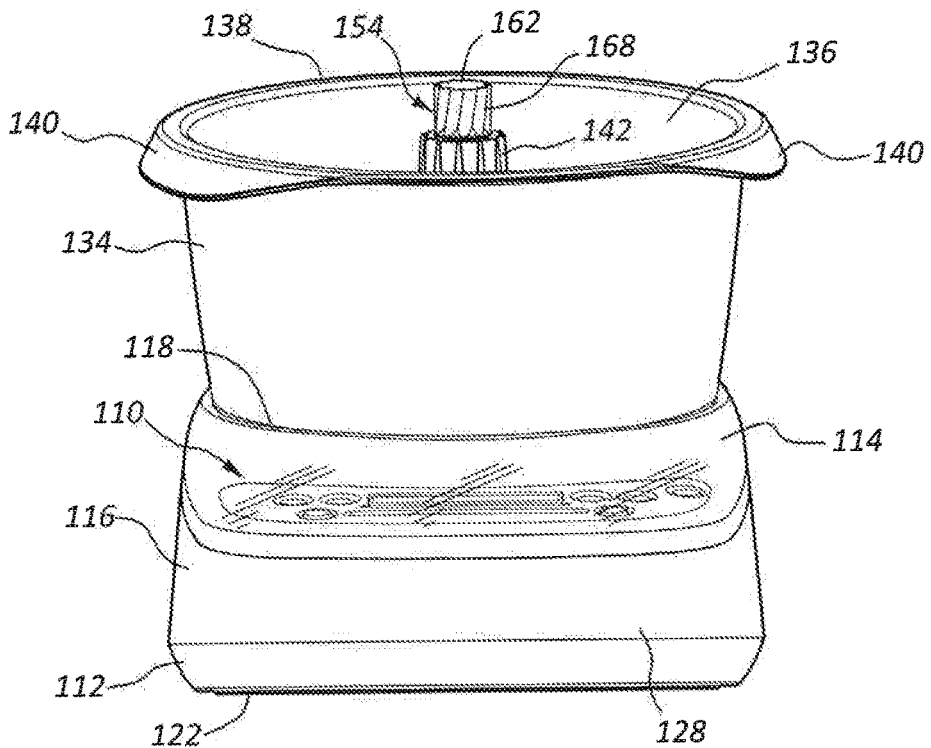
FIG. 2D is a front view of the mixer apparatus of FIG. 2A.
Figure 2E:
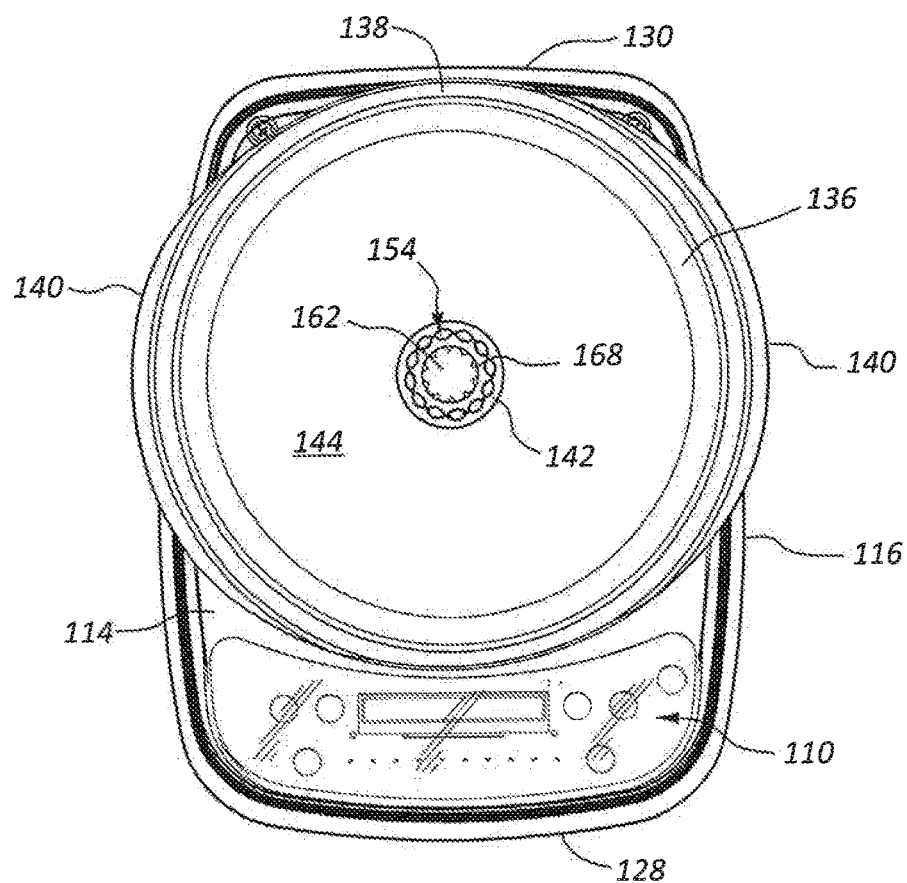
FIG. 2E is a top view of the mixer apparatus of FIG. 2A aligned with the longitudinal axis of the bowl.
Figure 3A:
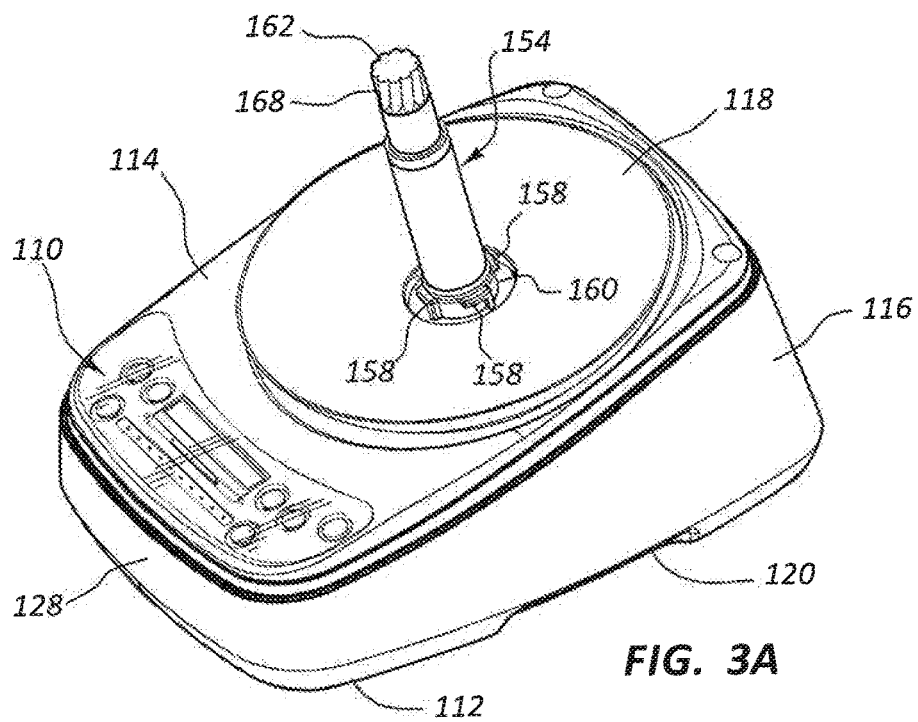
FIG. 3A is a perspective view of the mixer apparatus of FIG. 2A with the bowl removed.
Figure 3B:
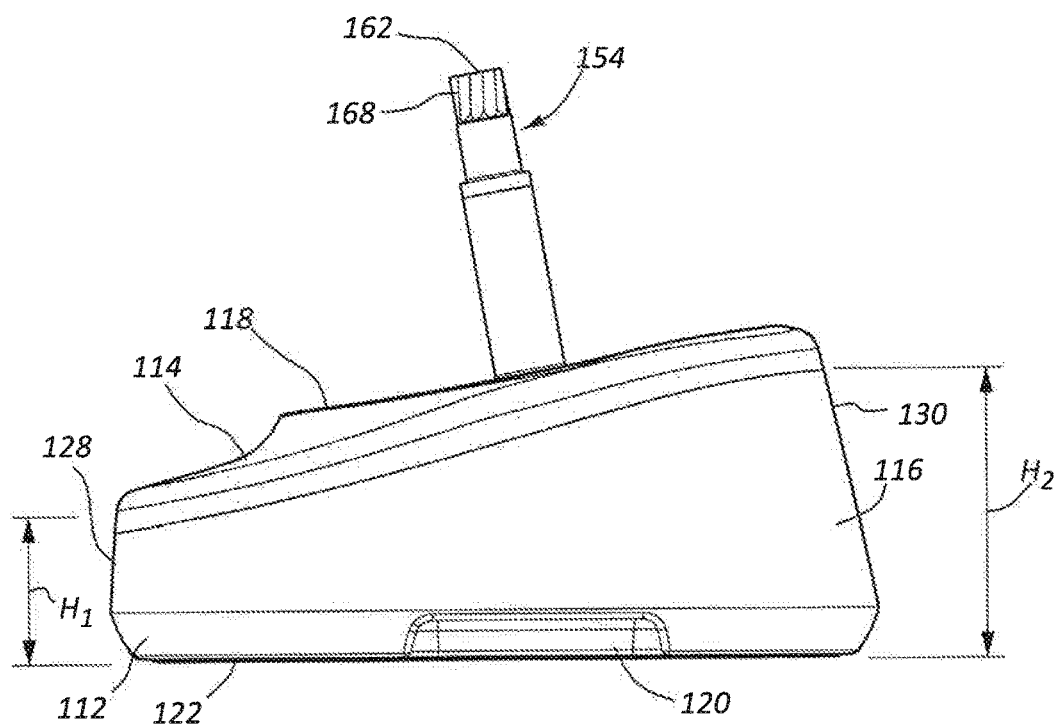
FIG. 3B is a side view of the mixer apparatus of FIG. 3A.
Figure 3C:
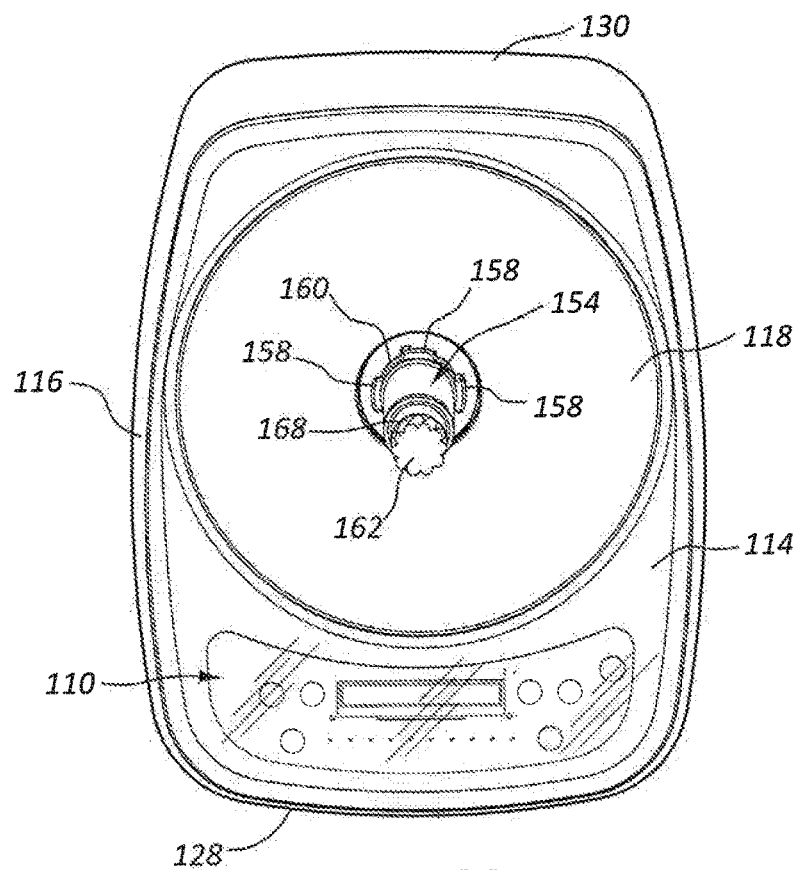
FIG. 3C is a top view of the mixer apparatus of FIG. 3A aligned with the vertical or gravitational direction.

The angle A of FIG. 2C may be between about 5 degrees and about 15 degrees, and in some typical applications (including the example embodiment of these figures) may particularly be about 10 degrees. Alternatively, the angle between axis L and axis V may be measured from a gravitational direction (i.e., directly vertically downward), in which case the angle between that direction and the axis L may measure between about 165 degrees and about 175 degrees, or more particularly about 170 degrees.

The bottom housing 112 may also contribute to the tilt of longitudinal axis L, since the bottom housing 112 may comprise a tilted shaft 132 extending along longitudinal axis L. The motor 166 and driveshaft 154 of the base unit 102 may be mounted to and extend from the tilted shaft 132. See FIGS. 8-10.

The side housing 116 may be connected to the bottom housing 112. The seam between the side and bottom housings 116, 112 may be sealed by a gasket, o-ring, or fluid-repelling adhesive to prevent intrusion of liquids into the interior of the base unit 102. In some embodiments, the side housing 116 may be formed integrally as one piece with the bottom housing 112. The upper housing 114 may be connected to the side housing 116 on an upper end of the side housing 116. In some embodiments, the upper hosing 114 may be formed integrally with the side housing 116. The upper housing 114 may also be sealed to the side housing 116, such as by use of a gasket, o-ring, or adhesive.

The upper housing 114 may comprise a recessed portion 118 in which the bowl 104 may be received. The recessed portion 118 may comprise a bowl, ring, or nest shape configured to receive a bottom surface 150 of the bowl 104. See FIGS. 3A-3C, 7, and 8. The upper housing 114 may also comprise a translucent or semi-transparent material at least where the user interface 110 is located. Thus, elements of the user interface 110 may be visible through the upper housing 114, especially when features of the user interface 110 are backlit. In embodiments where the user interface 110 is touch-sensitive, the upper housing 114 may comprise a material that is conducive to a touch interface, at least where the user interface 110 is located, in order for the user interface 110 to be touch-accessible through the upper housing 114. For example, the upper housing 114 may comprise a material through which a touch of a finger of a human hand may be sensed by the user interface 110. In another embodiment, the upper housing 114 may comprise a material that is at least partially flexible or movable such that a user pressing into the base unit 102 at the user interface 110 may operate buttons or resistive touch components beneath the surface of the upper housing 114. The upper housing 114 may therefore be a sealed surface that prevents particles and fluids from penetrating into the interior of the base unit 102. The upper housing 114 may also be easy to clean due to being a continuous surface in which small debris and messes do not collect easily.

The user interface 110 may comprise a plurality of buttons or other touch-sensitive surfaces 110-a and a display 110-b. See FIG. 1A. These portions of the user interface 110 may be visible through the upper housing 114. The touch-sensitive surfaces 110-a may be used to input instructions for the electronics unit 254, as discussed further in connection with FIGS. 4-8 elsewhere herein. The display 110-b may present information to the user such as, for example, the current operational settings of the mixer apparatus 100.

The upper housing 114 may he sloped. Thus, the back of the upper housing 114 may be at height $H_2$ and the front of the upper housing 114 may be at height $H_1$. This slope may approximately correspond with the tilt of longitudinal axis L as being about perpendicular to the longitudinal axis L of the bowl 104. Thus, the combination of the side housing 116 and the upper housing 114 may create a generally ramped outer surface of the base unit 102 with a recessed portion 118 that is generally parallel to a plane generally defined by the top of the ramped upper housing 114.

Figure 11:
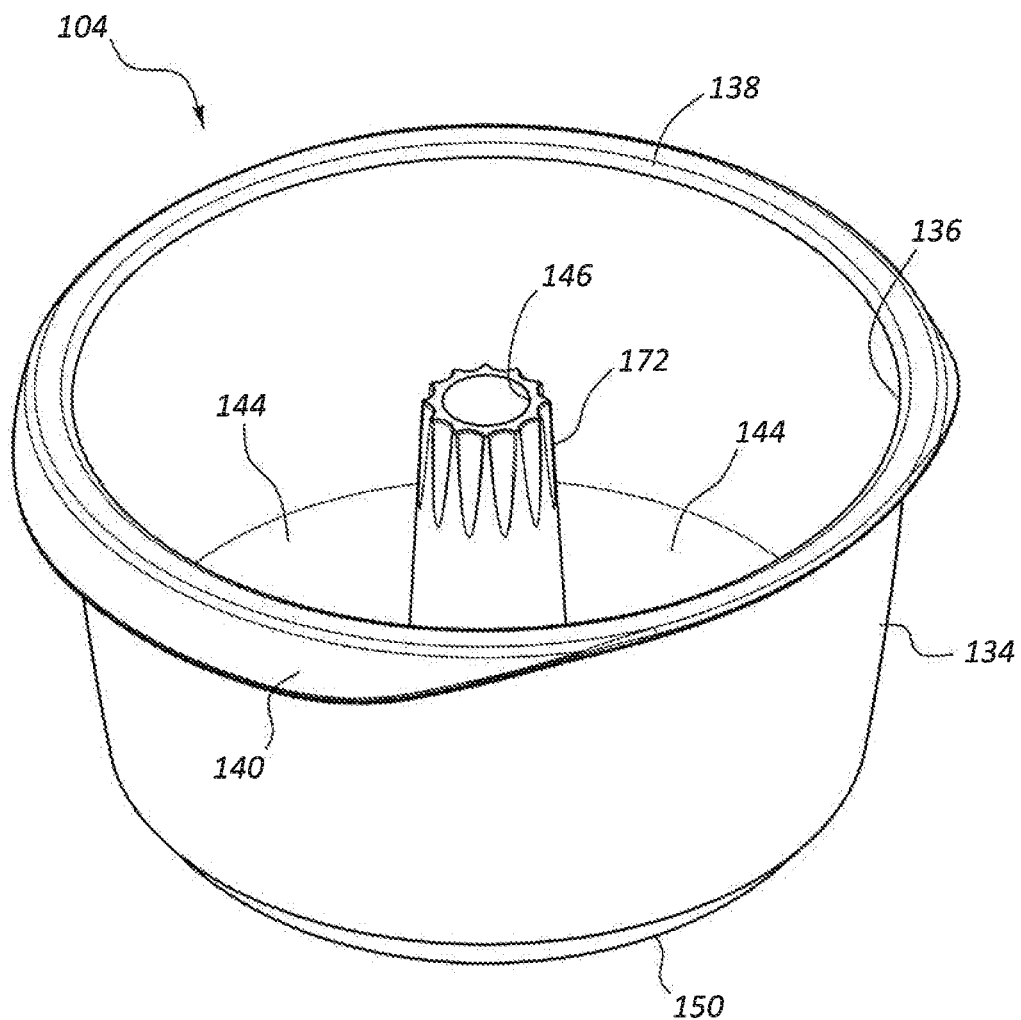
FIG. 11 is a perspective view of a bowl of a mixer apparatus of the present disclosure.

The bowl 104 may comprise a sidewall 134 having an inner surface 136. The upper end of the bowl 104 may comprise a rim 138 (which may alternatively be referred to as a lip or upper edge) and a plurality of side grips 140. See FIGS. 1A-2E, 6-8, and 11-13. The inner surface 136 of the bowl may be a generally ring-shaped or annular receptacle for ingredients, as shown, for example, in FIG. 11, due in part to a central column 142 (which may alternatively be referred to as a central post) that extends through the bowl 104 from a bottom surface 144 of the bowl 104 to a height about equal to the rim 138. See FIGS. 8 and 11-12. The outer surface of the central column 142 and the bottom surface 144 of the bowl may be parts of the inner surface 136 of the bowl 104. The outer surface of the central column 142 may be continuous with the bottom surface 144 of the bowl 104 such that the inner surface 136 forms a curve from the inner edge of the rim 138 to the top of the central column 142, as shown in FIG. 12. The bowl 104 may therefore be referred to as having a shape of a bundt pan or a circularly-lofted U-shape.

The central column 142 may be generally hollow, with an upper central opening 146 at the top that extends through to a lower central opening 148 in an underside surface 150 of the bowl 104. The tube 152 extending between the central openings 146, 148 may be configured to receive a driveshaft 154 extending from the base unit 102. The lower central. opening 148 at the bottom of the bowl 104 may comprise interlocking members 156 configured to engage corresponding interlocking members 158 in a base portion 160 of the driveshaft 154. The interlocking members 156, 158 may allow the bowl 104 to be removably retained to the base unit 102 while the mixer apparatus 100 is used. The bowl 104 may be attached to the base portion 160 by inserting the interlocking members 156 of the bowl 104 between the interlocking members 158 of the base portion 160 and rotating the bowl 104. Because there are four different interlocking members 158 in the base portion 160, the bowl 104 may be attached in at least four different orientations, depending on which interlocking members 156 are inserted between the interlocking members 158 of the base portion 160. As a result, when the lid 108 is attached to the bowl 104 and the howl 104 is attached to the base unit 102, the lid 108 may be in at least four different orientations relative to the base unit 102. In other embodiments, a different number of interlocking members 158 may be present.

The driveshaft 154 may be configured to rotate within the central column 142 of the bowl 104 without causing the bowl 104 to rotate. Detailed features of the driveshaft 154 are shown in FIGS. 4-5 and 21-28. The driveshaft 154 may comprise a distal end 162 and a proximal end 164. The proximal end 164 may be connected to a motor 166 in the base unit 102. See FIGS. 8 and 21-22. The distal end 162 may comprise an attachment surface 168 to which mixing tools may be attached. The attachment surface 168 in these embodiments comprises a gear surface configured to engage a corresponding gear surface of a mixing tool. See, e.g., gear surface 170 of FIG. 23. Thus, when the driveshaft 154 rotates, it drives motion of the mixing tool due to engagement of these gear surfaces. The motor 166 directly drives the driveshaft 154, so the mixer apparatus 100 has less transmission efficiency loss than conventional mixer apparatuses which use more lossy gear trains, belts, and other mechanisms to generate torque in their respective mixing tools. Additionally, the direct drive configuration of the present mixer apparatus 100 allows finer control over the movement of the mixing tools since changes in motion of the driveshaft 154 are directly and immediately transferred to the mixing tools. Thus, in an emergency stop, the mixing tools may potentially be stopped faster using the present system than in a conventional mixer.

The attachment surface 168 may comprise a helical gear surface configured to engage a helical gear surface of a mixing tool (e.g., rotary mixing tool 106). A helical gear surface may be beneficial as an attachment surface 168 on a driveshaft 154 for several reasons. First, it may ensure that a mixing tool is attached in the proper orientation and direction since the tool may not be threaded on to the driveshaft 154 contrary to the direction of the threads. Second, the threading may prevent the tool from being dislodged by simply pulling or pushing upward. The necessary twisting motion may therefore reduce the chance that the tool may lift itself off of the driveshaft 154 while the mixer apparatus 100 is used. Third, the direction of threading may be configured to oppose the natural tendency of the rotary mixing tool 106 to twist off of the driveshaft 154 as it rotates in the bowl 104. Thus, if the driveshaft 154 rotates in a counter clockwise direction (when viewed from above), the rotary mixing tool 106 may also turn in a counter clockwise direction in the howl 104 and may come into contact with ingredients being mixed. The forces applied by the ingredients that resist movement of the rotary mixing tool 106 may tighten or otherwise hold the rotary mixing tool 106 to the attachment surface 168 by further tightening the engagement of the helical gear surfaces. Then, when mixing is finished, the rotary mixing tool 106 may be removable by turning the rotary mixing tool 106 in the direction of mixing motion (e.g., counter clockwise direction as viewed from above) to loosen the threaded helical gear surfaces. In one embodiment, the mixer runs in a counterclockwise direction for mixing and clockwise to remove the attachments.

The top end of the central column 142 of the bowl 104 may comprise a fluted peripheral surface 172. See FIGS. 2A, 2D, 2E, 6, and 12-13. The fluted peripheral surface 172 may be used to engage and retain a stationary mixing tool 174 that may be fitted to the fluted peripheral surface 172. See FIGS. 1A-1C and 6-8. The stationary mixing tool 174 may be a kneading tool that remains stationary as a baffle for ingredients in the bowl 104 while a rotary mixing tool 106 operates around it. For example, the stationary mixing tool 174 may be beneficial to use when the rotary mixing tool 106 is a kneading hook used to knead dough. In some embodiments, the mixer apparatus 100 may be used without the stationary mixing tool 174.

In some embodiments, the rotary mixing tool 106 may have multiple gear engagement surfaces. One of the gear engagement surfaces may engage the attachment surface 168, and another may engage the fluted peripheral surface 172. See FIGS. 17B and 19B. Mixing tool attachments having this feature are described in greater detail in connection with FIGS. 17A-20B.

The motor 166 may be positioned in the base unit 102. The motor 166 may be rotor and stator based, thereby reducing heat and noise generated during its operation. The motor 166 may be mounted to the tilted shaft 132 of the bottom housing 112. Bearings 176, 178 may be positioned between the rotor of the motor 166 and the tilted shaft 132. See FIGS. 5 and 8. Thus, the motor 166 may have a longitudinal axis aligned with the axis L running through the tilted shaft 132, and the motor 166, tilted shaft 132, driveshaft 154, bowl 104, and rotary mixing tool 106 may be concentrically aligned along axis L. See FIG. 8.

The direct drive of the rotary mixing tool 106 via the driveshaft 154 may increase efficiency of the motor 166 in applying torque to the rotary mixing tool 106 and may reduce noise generated by the mixer apparatus 100 due to the absence of a belt drive, gear train, or comparable drive system to transfer torque to the rotary mixing tool 106. The direct drive configuration also allows more precise control over the motion of the rotary mixing tool 106.

Additionally, reduced heat production by the motor 166 may allow the base unit 102 to have a sealed exterior surface (e.g., without vents or other heat dissipation openings), thereby allowing the base unit 102 to be waterproof. In sonic embodiments, the entire base unit 102 may be rinsed or placed underwater without the water penetrating the base unit 102. This feature may make the base unit 102 much easier to clean after use.

Referring now to FIGS. 1A-1E, 6-8, and 14A-15C, the lid 108 may be attached to the rim 138 of the bowl 104. The lid 108 may comprise a top surface 180. The top surface 180 may be recessed toward the bowl 104 when attached to the howl 104. An aperture 182 in the lid 108 may extend through the top surface 180 and open into the bowl 104 below. A plurality of latching portions 188 may extend from the lid 108 to help the lid 108 stay retained to the howl 104.

Figure 1B:
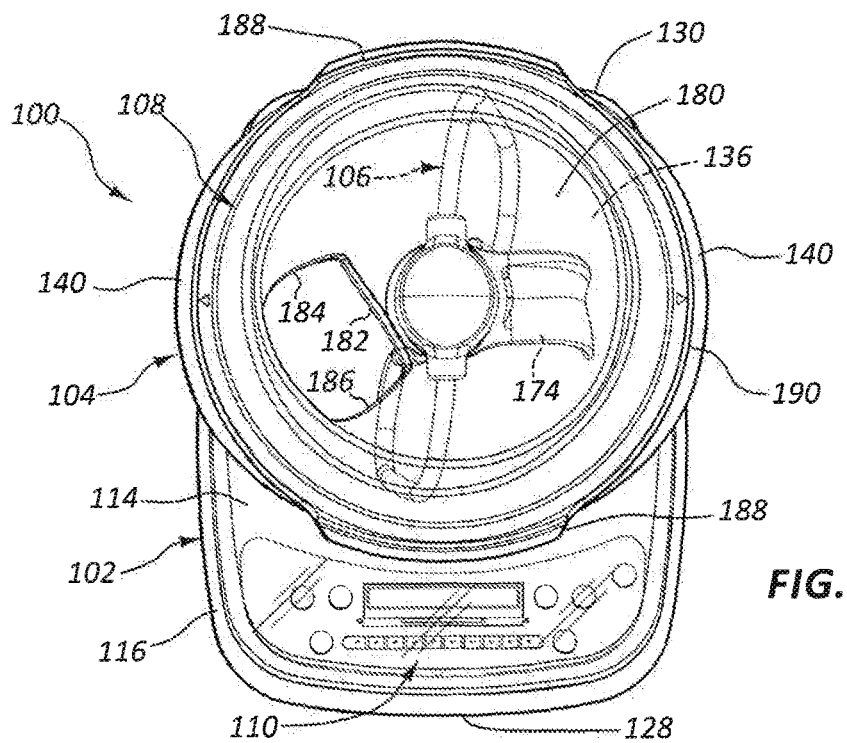
FIG. 1B is a top view of the mixer apparatus of FIG. 1A aligned with a longitudinal axis of a bowl of the mixer apparatus.
Figure 1C:
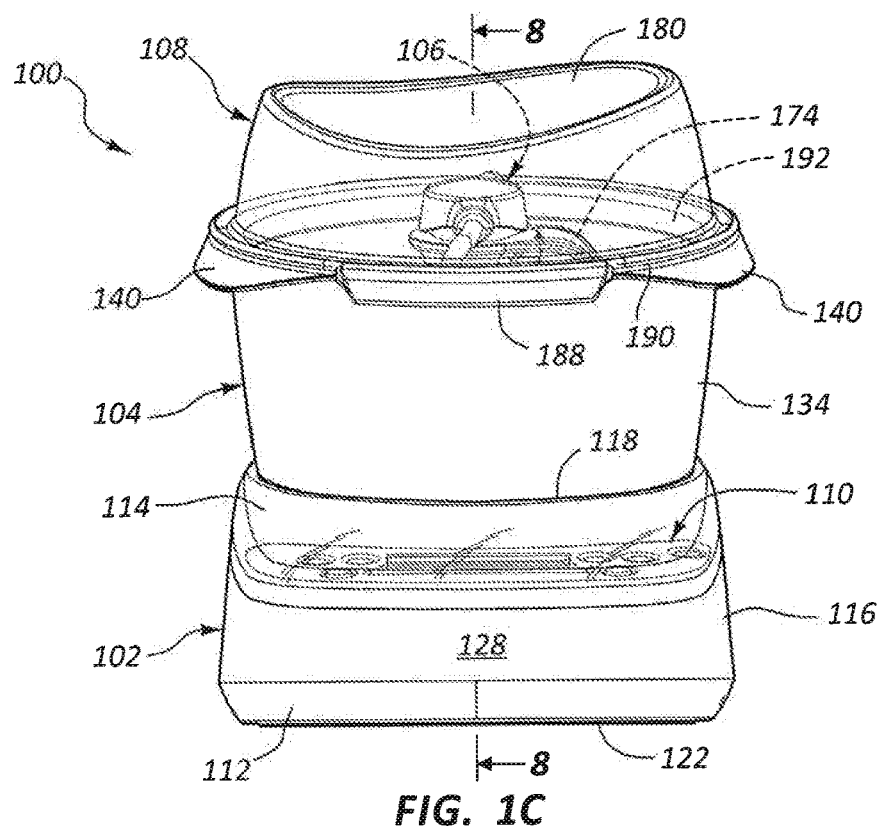
FIG. 1C is a front view of the mixer apparatus of FIG. 1A.
Figure 1D:
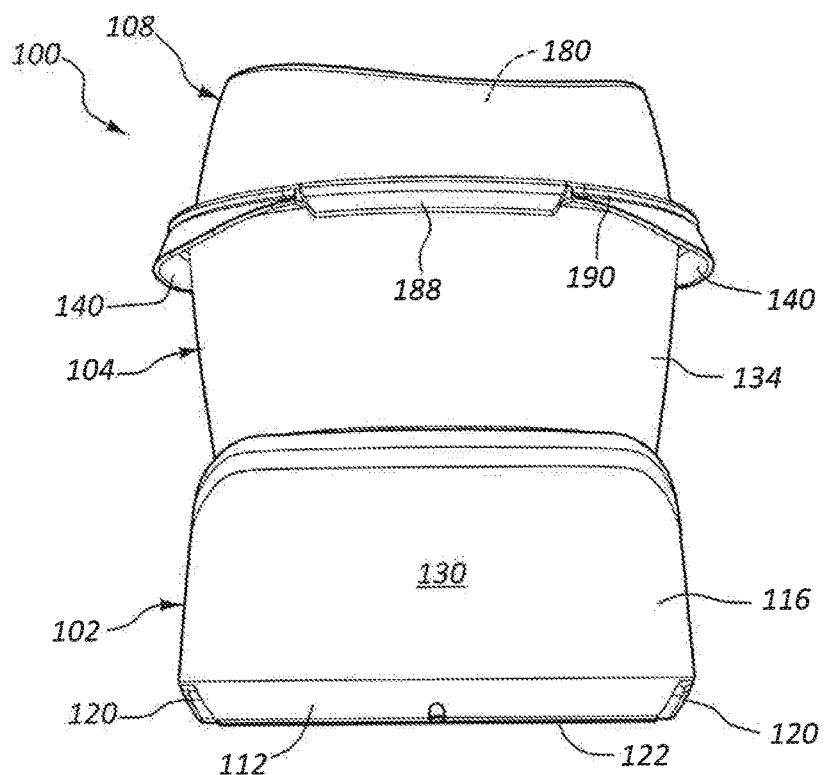
FIG. 1D is a rear view of the mixer apparatus of FIG. 1A.
Figure 1E:
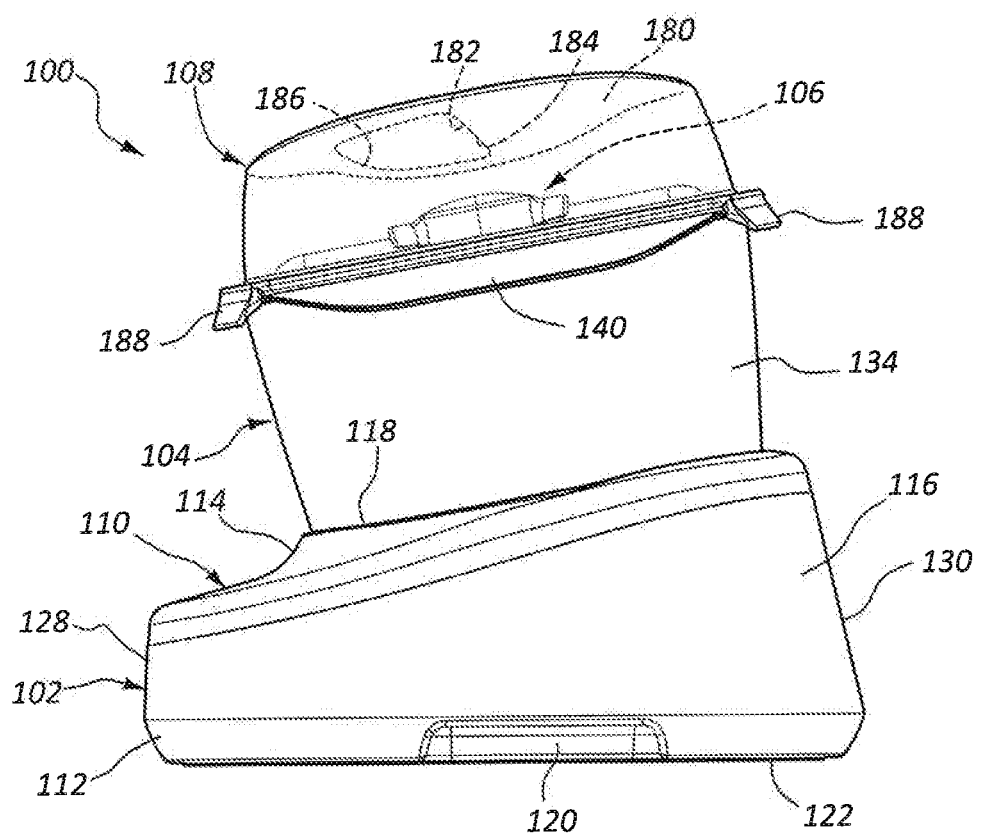
FIG. 1E is a side view of the mixer apparatus of FIG. 1A.

The top surface 180 of the lid 108 may form a funnel or bowl shape. See FIGS. 14A-15C. The aperture 182 in the lid 108 may at least partially open at the bottom of the funnel or bowl shape such that material on the lid 108 (e.g., fluids) will be directed and funneled toward and through the aperture 182. The top surface 180 may be tilted when the lid 108 is attached to the bowl 104, and because the bowl 104 may be attached to the base unit 102 in at least four different orientations, the aperture 182 may likewise be positioned relative to the base unit 102 in at least four different orientations. For example, the aperture 182 may be positioned close to the right, left, front, or back side of the base unit 102. FIG. 1B shows a configuration where the aperture 182 is toward the right, front side of the base unit 102, but the bowl 104 (and therefore aperture 182) may be attached to the base unit 102 at at least three other positions relatively rotated 90 degrees around the longitudinal axis L. In each of these four orientations, the funnel or bowl shape of the top surface 180 may beneficially have a form and depth D at its nadir (see FIG. 15C) sufficient to cause material on the lid to collect into the aperture 182, even if the aperture 182 is positioned toward the rear end 130 of the base unit 102 and is raised relative to the bottom surface 122 of the base unit 102 (as compared to when the aperture 182 is positioned toward the front end 128 of the base unit 102). Thus, the aperture 182 may be at a nadir of the top surface 180 irrespective of the attached orientation of the lid 108 on the bowl 104 when the bowl 104 is attached to the base unit 102 and the base unit 102 lies on a horizontal surface. This kind of repositionable aperture may be beneficial in many instances. For example, while many conventional mixers have top openings that are most comfortable for right-handed users, the aperture 182 of lid 108 may allow the user to select and change which side of the bowl 104 the aperture 182 is on, so left-handed users may also use the mixer apparatus 100 naturally and comfortably. Additionally, some users may find the aperture 182 to be most conveniently accessed while at the front or rear of the bowl 104, and they can also be accommodated.

Figure 14A:
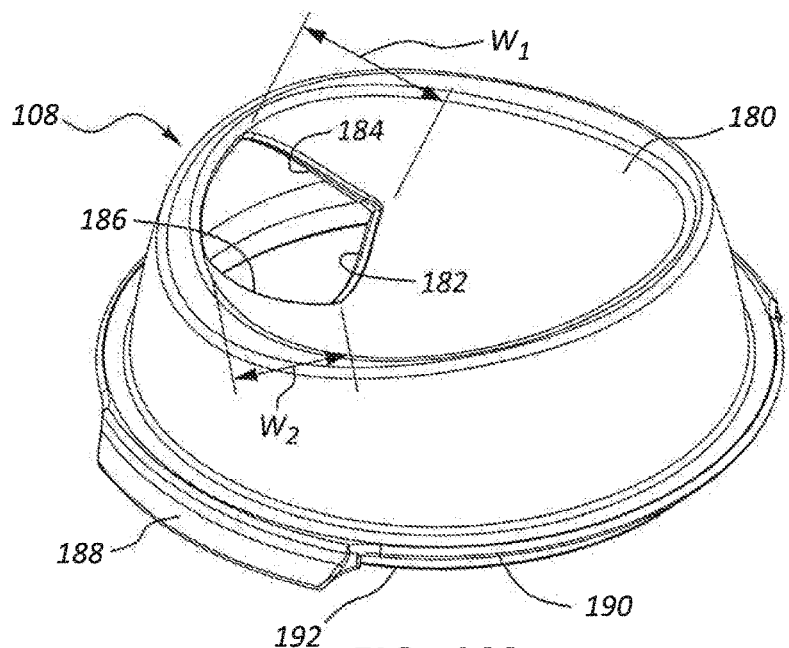
FIG. 14A is a perspective view of a lid of a mixer apparatus of the present disclosure.
Figure 14B:
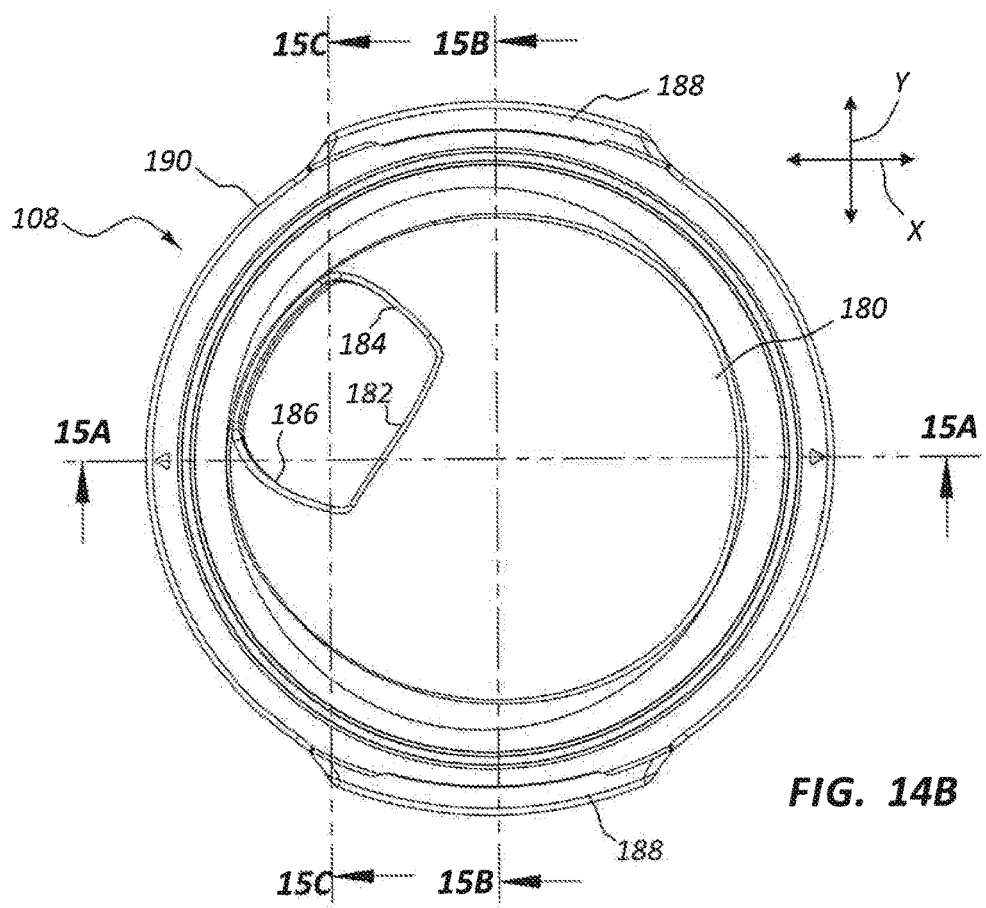
FIG. 14B is a top view of the lid of FIG. 14A.

The aperture 182 may be positioned on the lid 108 at a position laterally offset from the longitudinal axis L or center point of the bowl 104, as shown in FIGS. 1B and 14B. Being offset from the longitudinal axis L may allow material entering the aperture 182 to fall directly into the path of motion of the mixing implements (e.g., wires 248, 250) extending from the mixing tools 106, 174 into the bowl 104. In some arrangements, the aperture 182 may be defined as being positioned directly above the bottom surface 144 of the bowl 104 (when the bowl 104 rests on a flat horizontal surface), or it may be defined as being positioned along an axis extending parallel to the longitudinal axis L which intersects the bottom surface 144 of the bowl 104 (irrespective of the rotated orientation of the bowl 104). The laterally offset aperture 182 may also beneficially keep ingredients added through the lid 108 from falling directly on top of the rotary mixing tool 106 where it may be difficult to subsequently move them into the bowl 104. Thus, the rotary mixing tool 106 may stay cleaner during operation than other mixer devices.

The aperture 182 in the lid 108 may also have an irregular partially curved shape, as indicated by FIGS. 14A-14B. A first end 184 of the aperture 182 at a first side of the aperture 182 may have a different size and shape from a second end 186 at a second side of the aperture 182. The first end 184 may be upstream from the second end 186 of the aperture 182. This may mean that compared to the direction of rotation of the rotary mixing tool 106, the first end 184 is passed by a portion of the rotary mixing tool 106 before the second end 186 is passed is passed by the rotary mixing tool 106. Thus, if the rotary mixing tool 106 is configured to rotate counter-clockwise (when viewed from above), the first end 184 may be positioned in a clockwise direction relative to the second end 186 and relative to the bowl 104.

The first end 184 of the aperture 182 may have a larger width $W_1$ than the width $W_2$ of the second end 186 of the aperture 182. See, e.g., FIG. 14A. This irregularity of the shape of the aperture 182 may help prevent ingredients in the bowl 104 from being splashed or splattered out through the aperture 182 when the mixer apparatus 100 is operated as the rotary mixing tool 106 turns counter-clockwise. Because the downstream side of the aperture 182 (i.e., the second end 186) is smaller than the upstream side (i.e., the first end 184), there is less area through which ingredients can be ejected from the bowl 104 in the direction they are propelled by the rotary mixing tool 106. However, the first end 184 may still be widened relative to the second end 186 so that additional ingredients may easily be added to the bowl 104 through the aperture 182. In other embodiments, the first end 184 may be positioned deeper into the top surface 180 (at least on average) than the second end 186 (at least on average). Thus, the trajectory of material being turned within the bowl 104 may not directly align with the opening of the aperture 182 in the direction of motion of the rotary mixing tool 106.

Figure 15A:
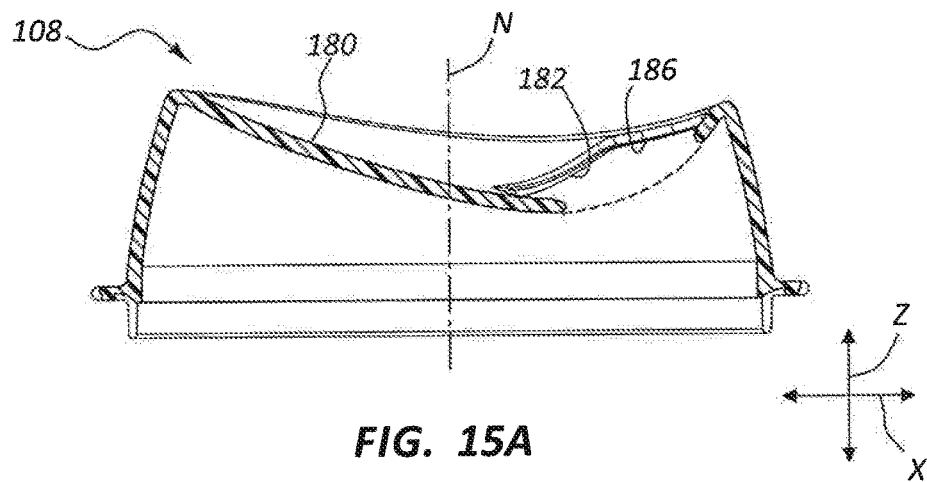
FIG. 15A is a section view of the lid of FIG. 14A taken through section lines 15A-15A in FIG. 14B.
Figure 15B:
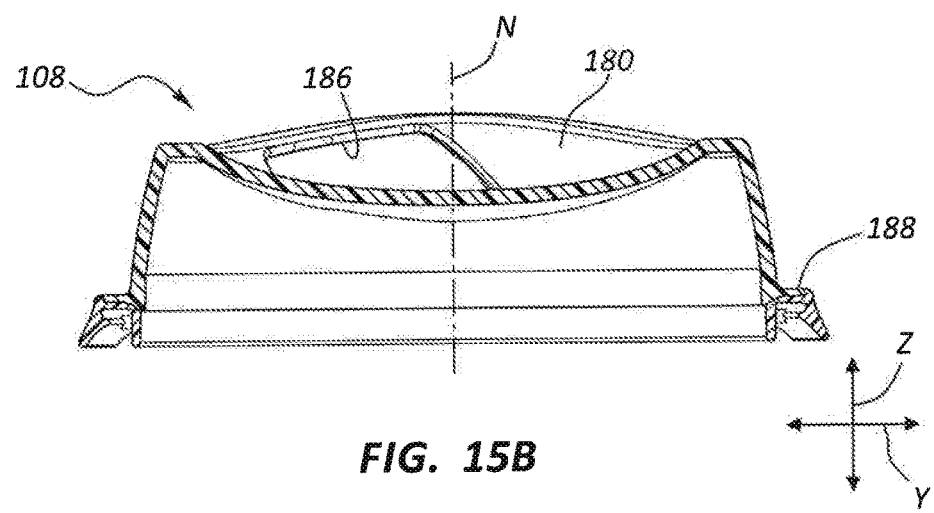
FIG. 15B is a section view of the lid of FIG. 14A taken through section lines 15B-15B in FIG. 14B.
Figure 15C:
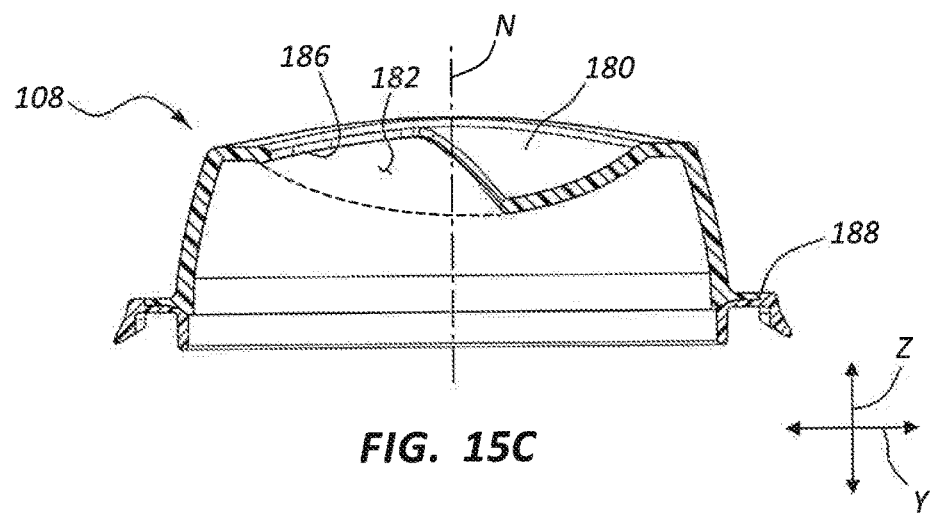
FIG. 15C is a section view of the lid of FIG. 14A taken through section lines 15C-15C in FIG. 14B.

FIGS. 15A-15C show various section views of the lid 108, as indicated by the section lines in FIG. 14B. FIG. 15A is a central side section view of the lid 108, FIG. 15B is a central side section view perpendicular to FIG. 15A, and FIG. 15C is a section view parallel to FIG. 15B at the nadir of the top surface 180 of the lid 108.

FIG. 15A shows that the funnel recess of the top surface 180 of the lid 108 may have an irregular or offset curvature with respect to the central axis N of the lid 108. Thus, the aperture 182 may be offset from the central axis N while still being at a nadir of the top surface 180. FIGS. 15B and 15C show that the top surface 180 in some section views comprises a centered profile with its nadir at the central axis N. FIG. 15C also shows that the aperture 182 may be at this nadir. Thus, the curvature of the top surface 180 cross sections that have offset curvature and cross sections that do not have offset curvature.

FIGS. 14B-15C show axes X, Y, and Z for convenient reference. In this embodiment, sections of the top surface 180 taken through a Z-X plane have offset curvature with respect to central axis N, and sections taken through a Z-Y plane have central curvature. As a result, media that falls on the top surface 180 moves in a Y-direction toward the central axis N of the lid 108 and moves in an X-direction toward the offset nadir of the lid 108. These combined funneling movements may occur irrespective of the rotated position of the lid 108 relative to the bowl 104.

In some embodiments, the lid 108 may comprise a pair of latching portions 188. The latching portions 188 may extend downward from a lower edge 190 of the lid 108. The lower edge 190 of the lid 108 may comprise a flexible seal portion 192 configured to extend into the bowl 104 when the lid 108 is retained to the bowl 104 by the latching portions 188. See FIG. 8. The flexible seal portion 192 may contact the inner surface 136 of the bowl 104 near the top rim 138 and may form a removable seal around the inner perimeter of the rim 138 to prevent ingredients from passing through the contacting perimeters of the lid 108 and the bowl 104. Thus, when the lid 108 is coupled to the bowl 104, the flexible seal portion 192 may be inserted into the bowl 104 adjacent to the inner surface 136. Because the flexible seal portion 192 is within the bowl 104, ingredients that get onto the flexible seal portion 192 may be predisposed to fall back into the bowl 104.

The latching portions 188 may secure the lid 108 to the bowl 104 by wrapping around the rim 138 of the bowl 104 and forming a reversible interference between the latching portions 188 and the rim 138 in positions where the rim 138 does not have side grips 140. The latching portions 188 may therefore be attachable to the bowl 104 in a plurality of positions. In this example embodiment, the lid 108 may be attachable in two positions rotated at 180 degrees relative to each other around the longitudinal axis L since the latching portions 188 may be fitted to opposite ends of the bowl 104.

Figure 8:
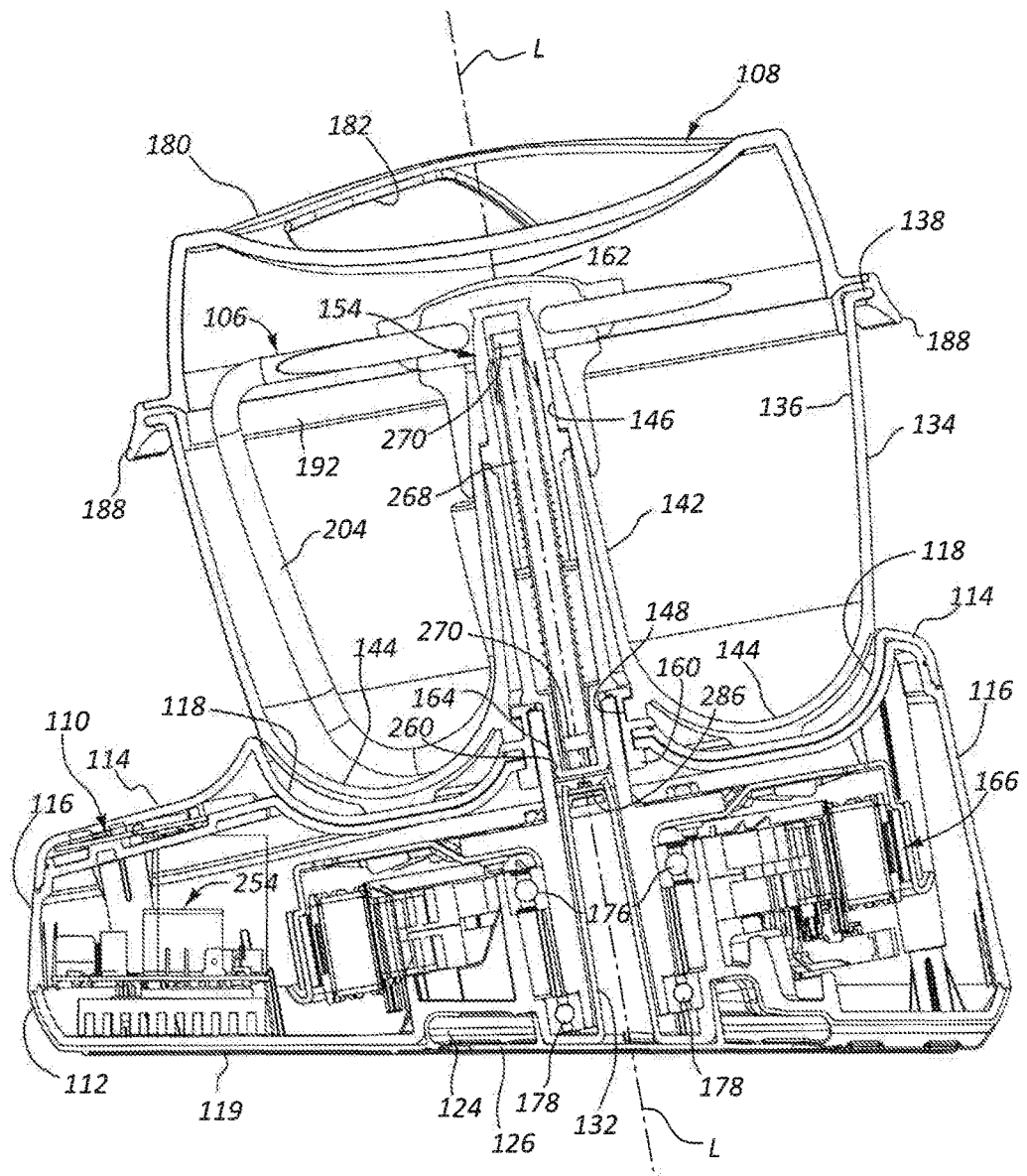
FIG. 8 is a central side section view of the mixer apparatus of FIG. 1A.
Figure 9:
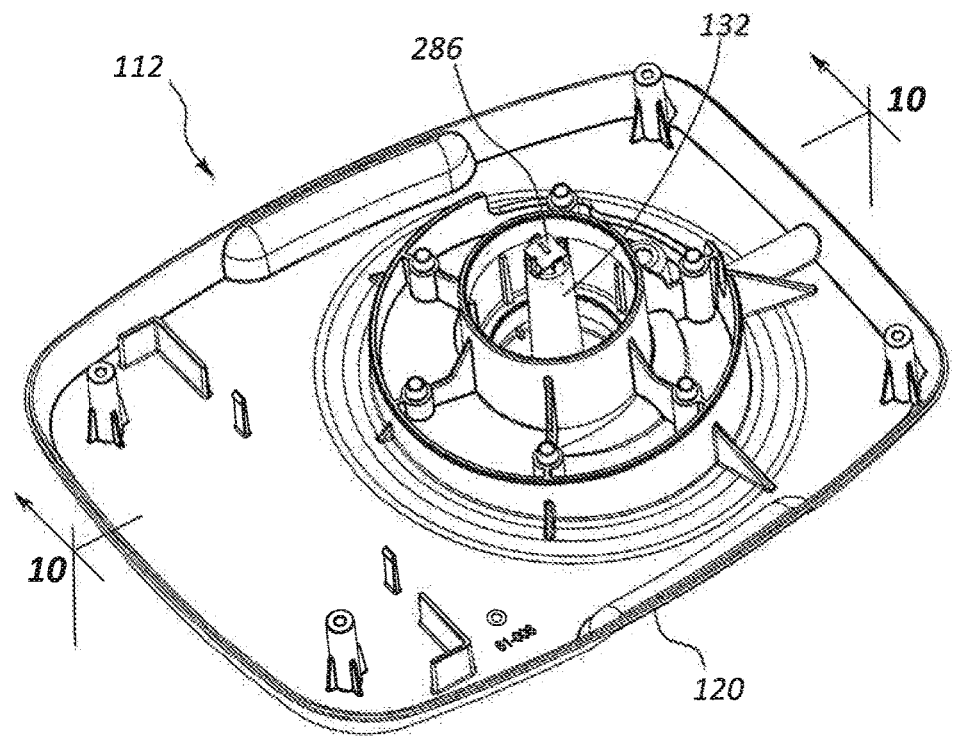
FIG. 9 is a top perspective view of the lower housing of the mixer apparatus of FIG. 1A.
Figure 10:
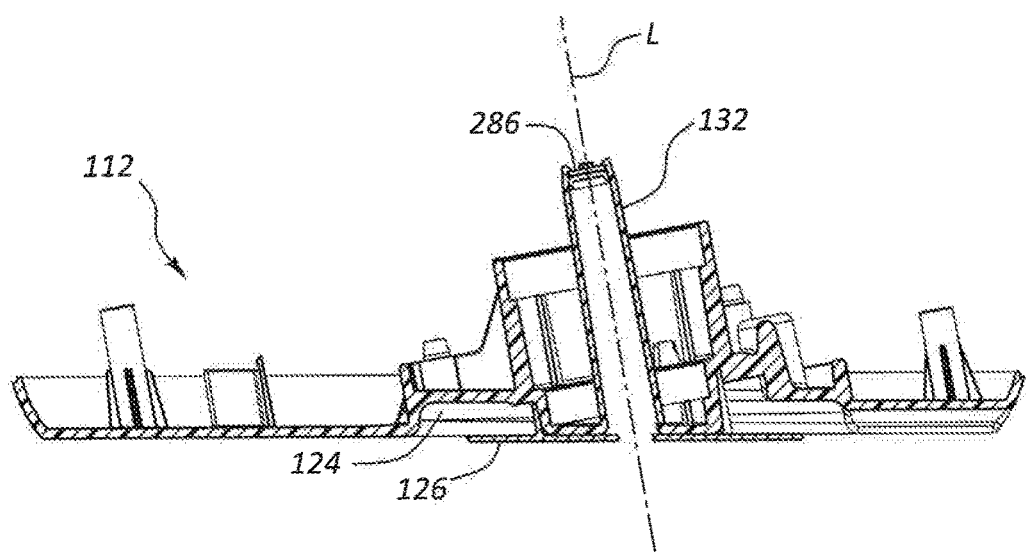
FIG. 10 is a side section view of the lower housing of FIG. 9.

The latching portions 188 may comprise a flexible material configured to mold around the rim 138 of the bowl 104 when the lid 108 is pressed down onto the bowl 104. See, e.g., FIG. 8 showing the latching portions 188 wrapped around the rim 138 such that some of each latching portion 188 extends around an underside of the rim 138 to create a mechanical interlock between the lid 108 and the bowl 104. However, because the latching portions 188 are flexible, the lid 108 may be pulled off of the bowl 104 by bending the latching portions 188 outward and pulling up on the lid 108.

Mixing Tool Attachments

Figure 16A:
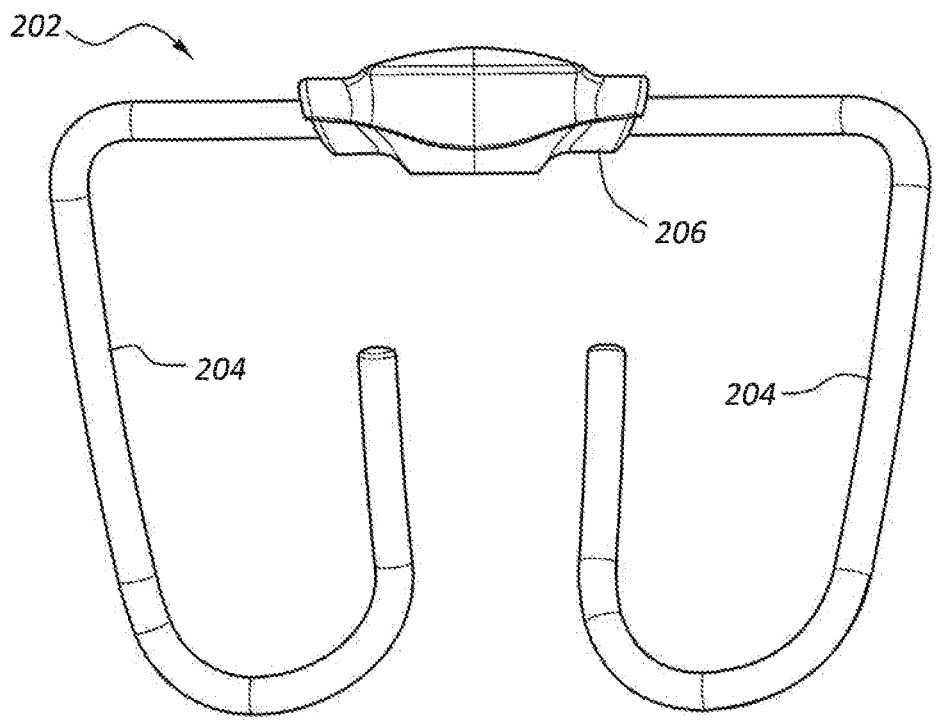
FIG. 16A is a side view of a dough hook attachment according to e present disclosure.
Figure 16B:
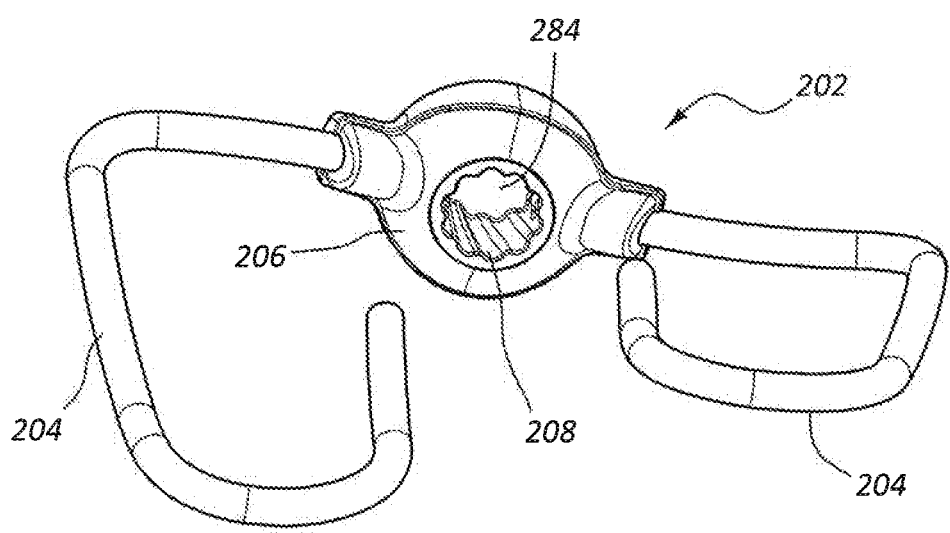
FIG. 16B is a bottom perspective view of the dough hook attachment of FIG. 16A.

A variety of rotary mixing tools 106 may be used with the mixer apparatus 100. FIGS. 16A-16B show a dough hook attachment 202 configured to connect to an attachment surface 168 of the driveshaft 154. An embodiment of a dough hook attachment is shown as the mixing tool attachment 106 attached to the driveshaft 154 in FIGS. 1A-1C and 8. The dough hook attachment 202 may comprise a plurality of dough hooks 204 extending from a body portion 206. The dough hooks 204 may be shaped to knead ingredients deep in the bowl 104 of the mixer apparatus 100 while avoiding contact with a stationary mixing tool 174 (if any) in the bowl 104. The body portion 206 may comprise an inner attachment surface 208 (see FIG. 16B). The inner attachment surface 208 may be configured to receive the attachment surface 168 of the distal end 162 of the driveshaft 154. Thus, the inner attachment surface 208 may be a helical gear surface that can he threaded onto the threads of the attachment surface 168 of the driveshaft 154. The direction of the threads on the inner attachment surface 208 may drive the dough hook attachment 202 downward when it is torqued by contact with ingredients in the bowl 104 and may be loosened by turning the dough hook attachment 202 in the other direction to remove the attachment 202 from the driveshaft 154.

Figure 17A:
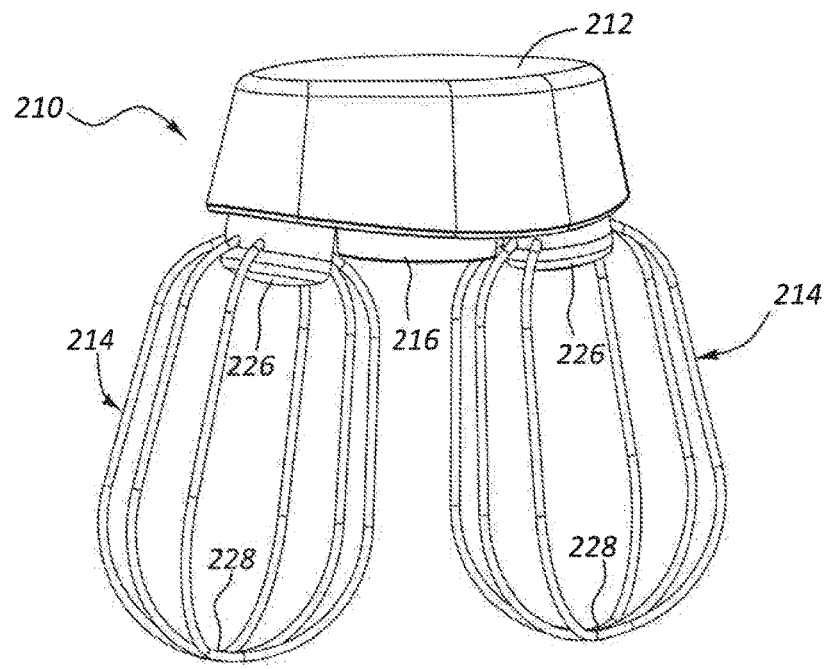
FIG. 17A is a perspective view of a French whisk attachment according to the present disclosure.
Figure 17B:
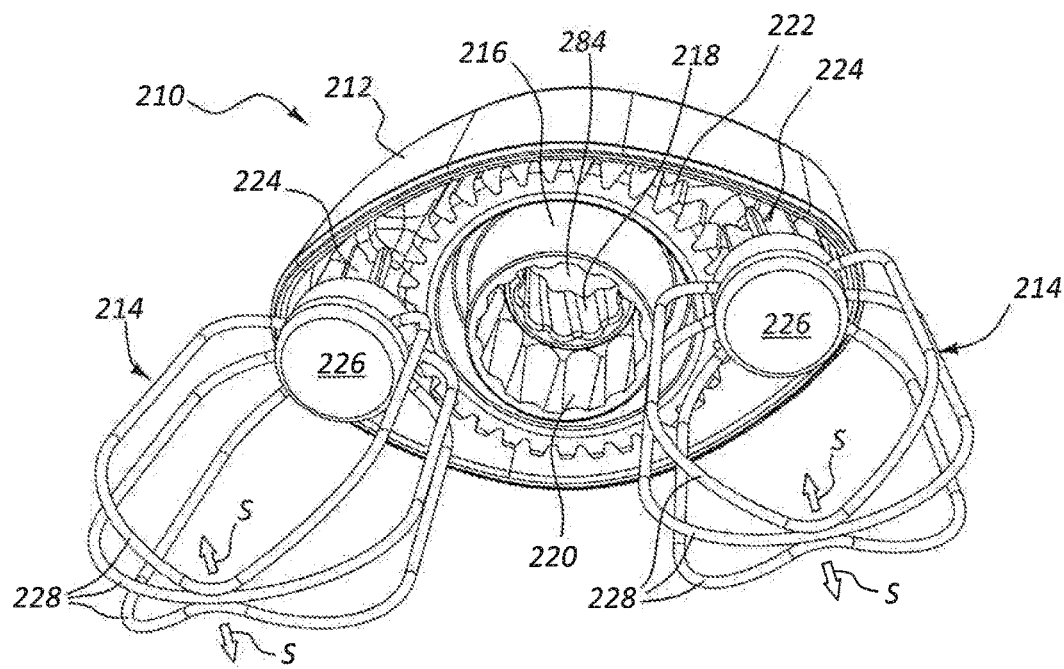
FIG. 17B is a bottom. perspective view of the attachment of FIG. 17A.
Figure 18A:
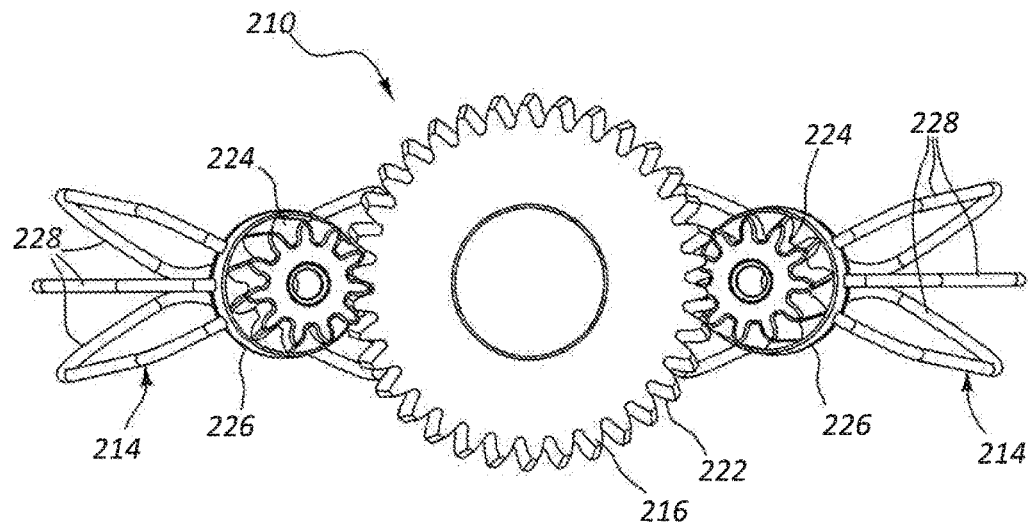
FIG. 18A is a top view of the attachment of FIG. 17A with an upper housing portion removed.
Figure 18B:
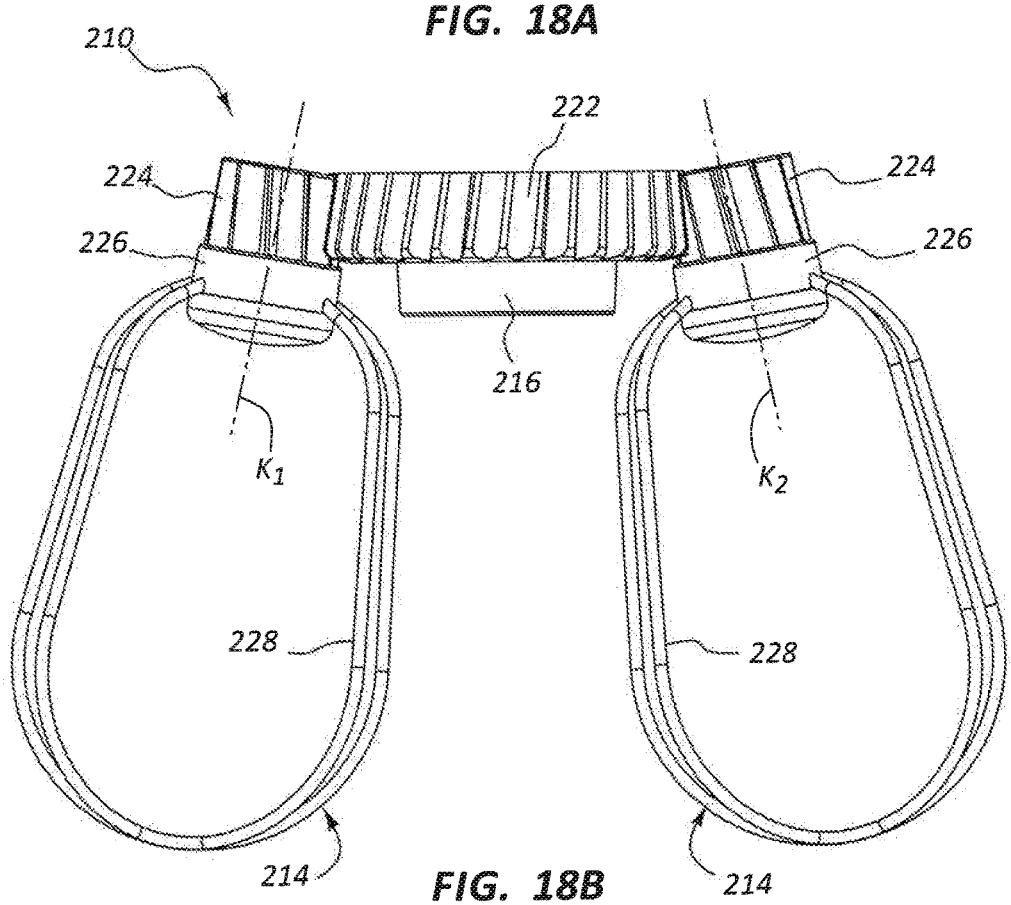
FIG. 18B is a side view of the attachment of FIG. 18A.

FIGS. 17A-17B show another mixing tool attachment for the mixer apparatus 100. This attachment is a French whisk attachment 210. The French whisk attachment 210 may comprise a central body 212 in which two whisks 214 and a central gear 216 may be positioned. FIGS. 18A-18B show the French whisk attachment 210 with the central body 212 hidden to show detail of internal parts.

FIG. 17B shows that the central body 212 of the French whisk attachment 210 may have an upper attachment surface 218. The upper attachment surface 218 may be configured to be threaded onto the distal end 162 of the driveshaft 154. Thus, when the driveshaft 154 rotates, the central body 212 may receive a torque, causing it to rotate as well. The central gear 216 in the central body 212 may have a column engagement surface 220 that is configured to interlock with and receive the central column 142 of the bowl 104 at the fluted peripheral surface 172. Thus, the central gear 216 may engage the fluted peripheral surface 172 and may be held in place thereby relative to the bowl 104 as the central body 212 rotates relative to the central column 142. The central gear 216 may also comprise an outer gear surface 222 configured to engage the whisks 214 at their respective whisk gear surfaces 224. The whisk gear surfaces 224 are formed on the outer surfaces of whisk holders 226 that are each mounted to the central body 212 of the French whisk attachment 210.

The whisk holders 226 may each translate along their respective longitudinal axes $K_1$, $K_2$ while being held by the central body 212 against the central gear 216. The movement of the whisk holders 226 along these axes $K_1$, $K_2$ may increase or decrease the engagement of the outer gear surface 222 with the whisk gear surfaces 224. Wires 228 extend downward from the whisk holders 226 to be placed into a bowl 104 when the French whisk attachment 210 is connected to a driveshaft 154.

While the French whisk attachment 210 is in use, the whisk holders 226 may act as planet gears that rotate around the central gear 216 which may act as a sun gear. The number of teeth on the outer gear surface 222 of the central gear 216 may not be divisible by the number of teeth of the whisk gear surfaces 224. In other words, the number of teeth of the outer gear surface 222 may not be a multiple of the number of teeth of the whisk gear surfaces 224. Thus, as the whisk holders 226 revolve around the central gear 216, the wires 228 may be at different rotational positions relative to their rotational axes (i.e., $K_1$, $K_2$) each time the whisk holders 226 make a complete revolution around the central gear 216. For example, the French whisk attachment 210 has a central gear 216 with 35 teeth, and the whisk holders 226 each have 11 teeth. Therefore, it would take several revolutions of the whisk holder 226 around the central gear 216 for an individual tooth of the whisk holder 226 to be positioned between two particular teeth of the central gear 216 more than once. Because the wires 228 rotate past the same points in the bowl 104 at inconsistent angles, mixing quality may be improved as the material in the bowl 104 is engaged from various different directions in each revolution.

Figure 19A:
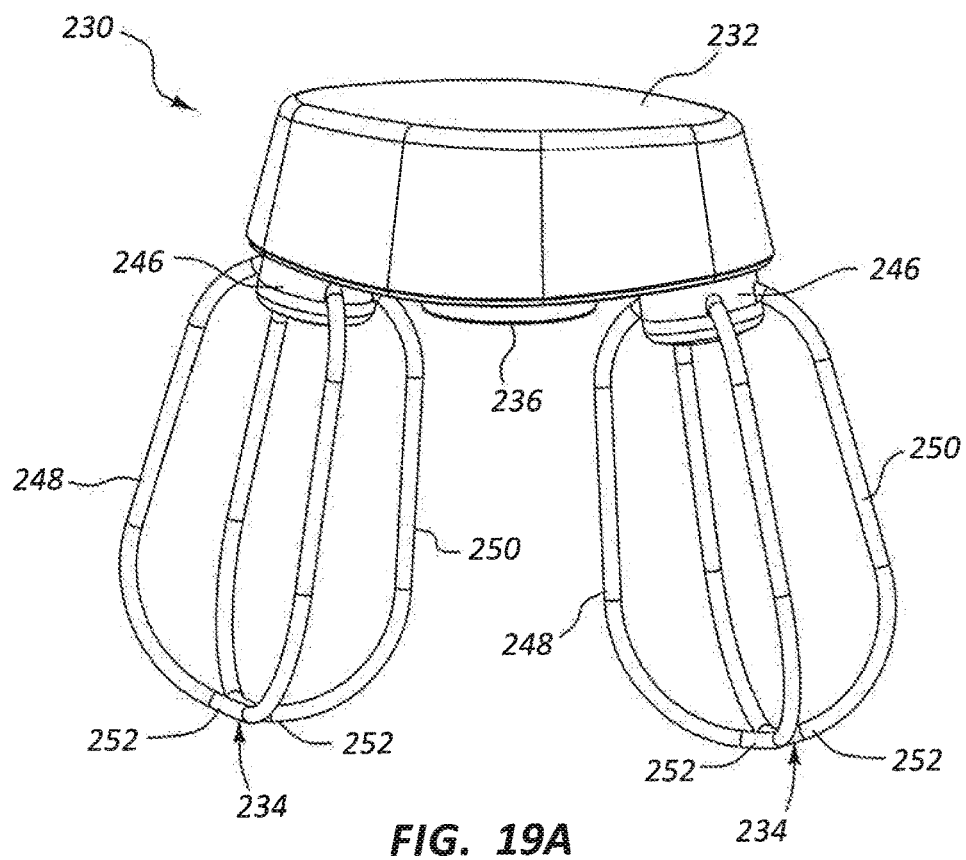
FIG. 19A is a perspective view of a cookie whisk attachment according to the present disclosure.
Figure 19B:
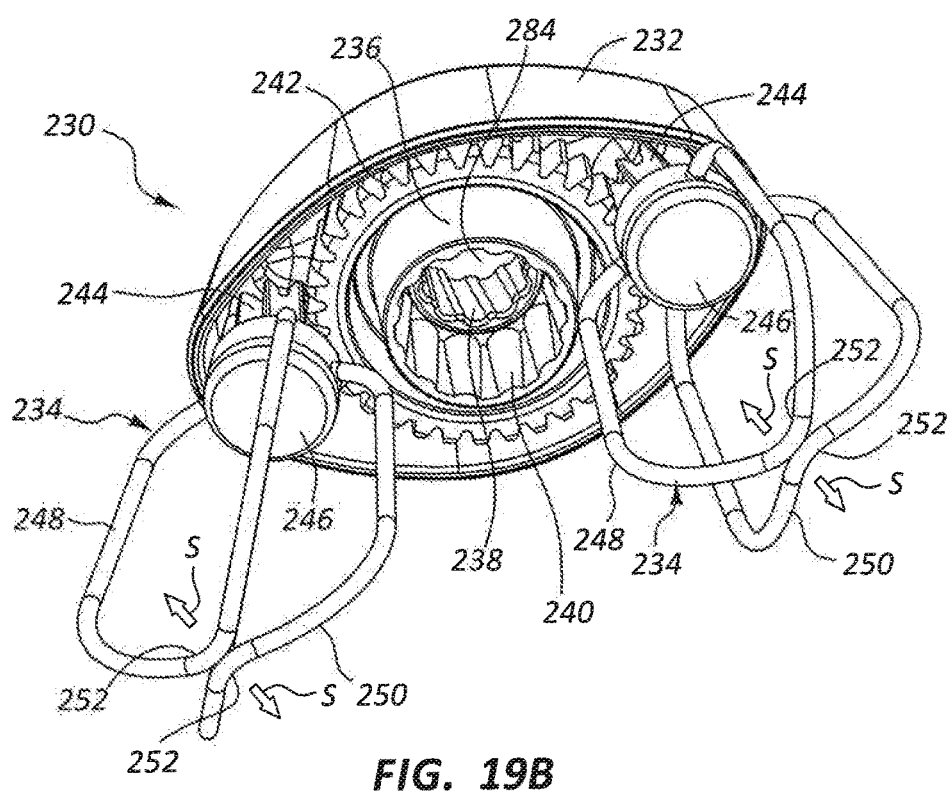
FIG. 19B is a bottom perspective view of the attachment of FIG. 19A.
Figure 20A:
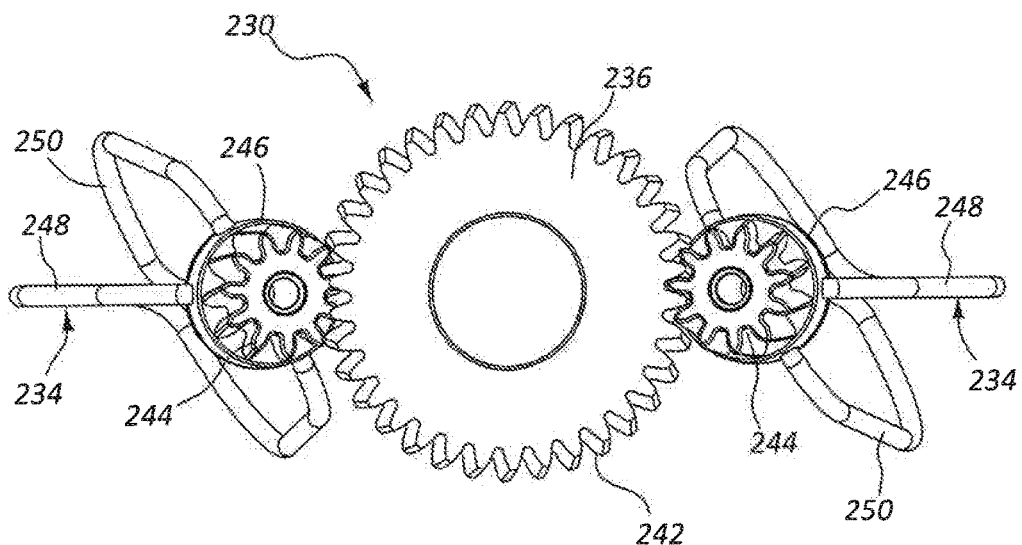
FIG. 20A is a top view of the attachment of FIG. 19A with an upper housing portion removed.
Figure 20B:
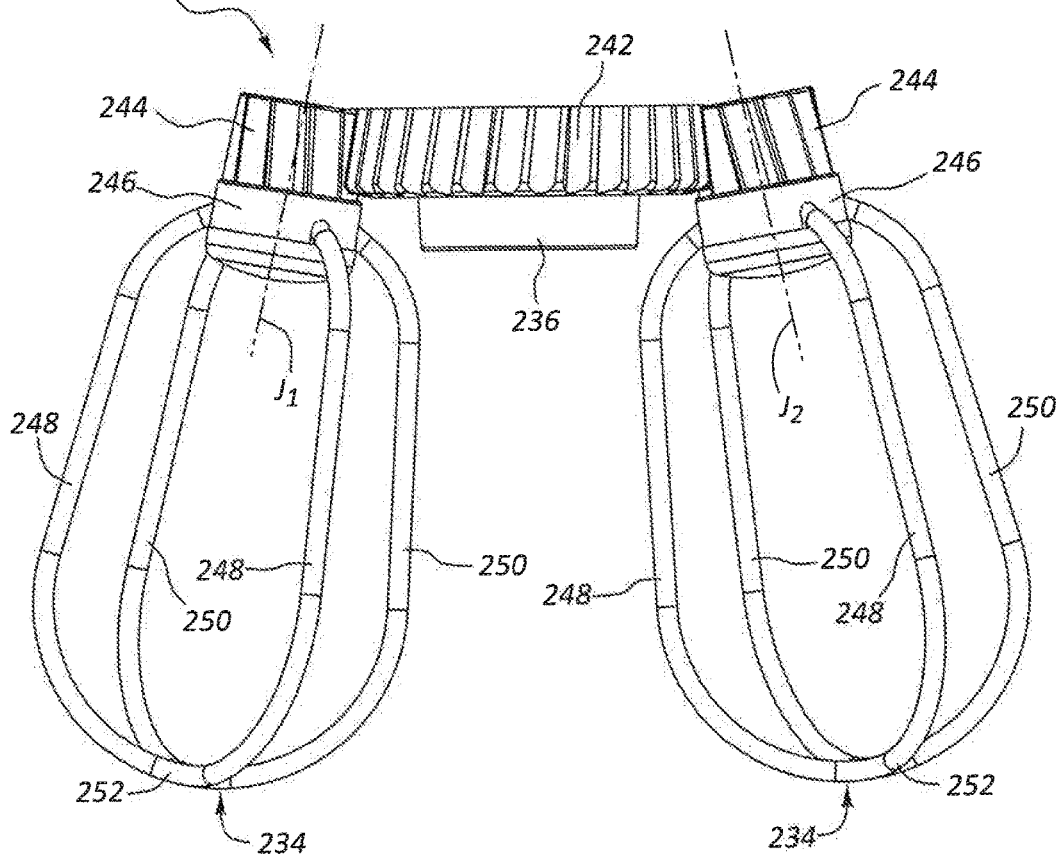
FIG. 20B is a side view of the attachment of FIG. 20A.

FIGS. 19A-19B show another embodiment of a rotary mixing tool 106 of the present disclosure. This tool is a cookie whisk attachment 230 having a central body 232 in which two whisks 234 and a central gear 236 may be positioned. FIGS. 20A-20B show the cookie whisk attachment 230 with the central body 232 hidden.

Similar to FIG. 17B of the French whisk attachment 210, FIG. 19B shows that the central body 232 of the cookie whisk attachment 230 may have an upper attachment surface 238. The upper attachment surface 238 may be configured to be threaded onto the distal end 162 of the driveshaft 154. Thus, when the driveshaft 154 rotates, the central body 232 may receive a torque, causing it to rotate as well. The central gear 236 in the central body 232 may have a column engagement surface 240 that is configured to interlock with and receive the central column 142 of the bowl 104 at the fluted peripheral surface 172. Thus, the central gear 236 may engage the fluted peripheral surface 172 and may he held in place thereby relative to the bowl 104 as the central body 232 rotates relative to the central column 142. The central gear 236 may also comprise an outer gear surface 242 configured to engage the whisks 234 at their respective whisk gear surfaces 244. The whisk gear surfaces 244 are formed on the outer surfaces of whisk holders 246 that are each mounted to the central body 232 of the cookie whisk attachment 230.

The whisk holders 246 may each translate along their respective longitudinal axes $J_1$, $J_2$ while being held by the central body 232 against the central gear 236. The movement of the whisk holders 246 along these axes $J_1$, $J_2$ may increase or decrease the engagement of the outer gear surface 242 with the whisk gear surfaces 244. Wires 248, 250 extend downward from the whisk holders 246 to be placed into a bowl 104 when the cookie whisk attachment 230 is connected to a driveshaft 154.

While the cookie whisk attachment 230 is in use, the whisk holders 246 may act as planet gears that rotate around the central gear 236 which may act as a sun gear. The number of teeth on the outer gear surface 242 of the central gear 236 may not be divisible by the number of teeth on the whisk gear surfaces 244. In other words, the number of teeth of the outer gear surface 242 may not be a multiple of the number of teeth of the whisk gear surfaces 244. Thus, as the whisk holders 246 revolve around the central gear 236, the wires 248, 250 may be at different rotational positions relative to their rotational axes (i.e. $K_1$, $K_2$) each time the whisk holders 246 make a complete revolution around the central gear 236. For example, the cookie whisk attachment 230 has a central gear 236 with 35 teeth, and the whisk holders 246 each have 11 teeth. Therefore, it would take several revolutions of the whisk holder 246 around the central gear 236 for an individual tooth of the whisk holder 246 to be positioned between two particular teeth of the central gear 236 more than once. Because the wires 248, 250 rotate past the same points in the bowl 104 at inconsistent angles, mixing quality may be improved as the material in the bowl 104 is engaged from various different directions in each revolution.

The wires 228, 248, 250 of the whisk attachments 210, 230 may be laterally separable from each other at their distal ends, as indicated by the arrows labeled S in FIGS. 17B and 19B. Thus, there may be a space between the distal ends 252 and/or the distal ends 252 may be reversibly (e.g., elastically) pulled apart. As a result, the wires 228, 248, 250 may be easier to clean than conventional whisks that have wires attached to each other at their distal ends since the spaces and surfaces between the wires 228, 248, 250 may be accessed more easily than in conventional whisks when they are spread apart. The surfaces between the wires 228, 248, 250 may also be more durable and rust resistant since debris, water, and sticky materials can be rinsed or wiped away more easily.

The wires 228, 248, 250 may also be referred to as not crossing or intersecting each other. Thus, the distal ends of the wires 228, 248, 250 may be laterally adjacent to each other or touching each other laterally but not overlapping along the longitudinal axes $J_1$, $J_2$, $K_1$, $K_2$ of the whisks.

Wires 228, 248, 250 of the whisk attachments 210, 230 may have a diameter between about 0.09 inches and about 0.2 inches. Other conventional whisks typically have smaller diameters and are therefore more prone to bending, breaking, cracking, and other undesirable results. When making certain recipes, a smaller diameter wire may be less effective at its mixing task as well. For example, when making a meringue, wires having a diameter less than the diameter of the wires 228, 248, 250 of the whisk attachments 210, 230 tend to break down protein chains in the product being mixed, even though they may still whip air into the ingredients. A larger diameter wire may still whip air effectively, but may cause less damage to the protein chains, resulting in a higher quality result.

Each of the whisk attachments 210, 230 may have whisk holders 226, 246 capable of translation along their longitudinal axes $K_1$, $K_2$, $J_1$, $J_2$ with respect to the central bodies 212, 232. Thus, when the wires 228, 248, 250 are placed under load, such as a load applied along a longitudinal axis $K_1$, $K_2$, $J_1$, $J_2$, the helical gear surfaces (i.e., outer gear surfaces 222, 242 and whisk gear surfaces 224, 244) may increase engagement as the whisk holders 226, 246 are pulled generally upward along the longitudinal axes $K_1$, $K_2$, $J_1$, $J_2$. When load is relieved, the helical gear surfaces may decrease engagement and the whisk holders 226, 246 may move downward. This movement along the longitudinal axes $K_1$, $K_2$, $J_1$, $J_2$ may be referred to a float engagement or variable engagement of the gears in the whisk attachments 210, 230 since the engagement of the whisk holders 226, 246 with the central gears 222, 242 is variable and the whisk holders 226, 246 can "float" up and down along the longitudinal axes $K_1$, $K_2$, $J_1$, $J_2$. In some cases, the velocity or acceleration of movement of the whisk holders 226, 246 relative to the central gears 222, 242 may affect the position of the whisk holders 226, 246 relative to the central gears 222, 242.

Figure 17C:
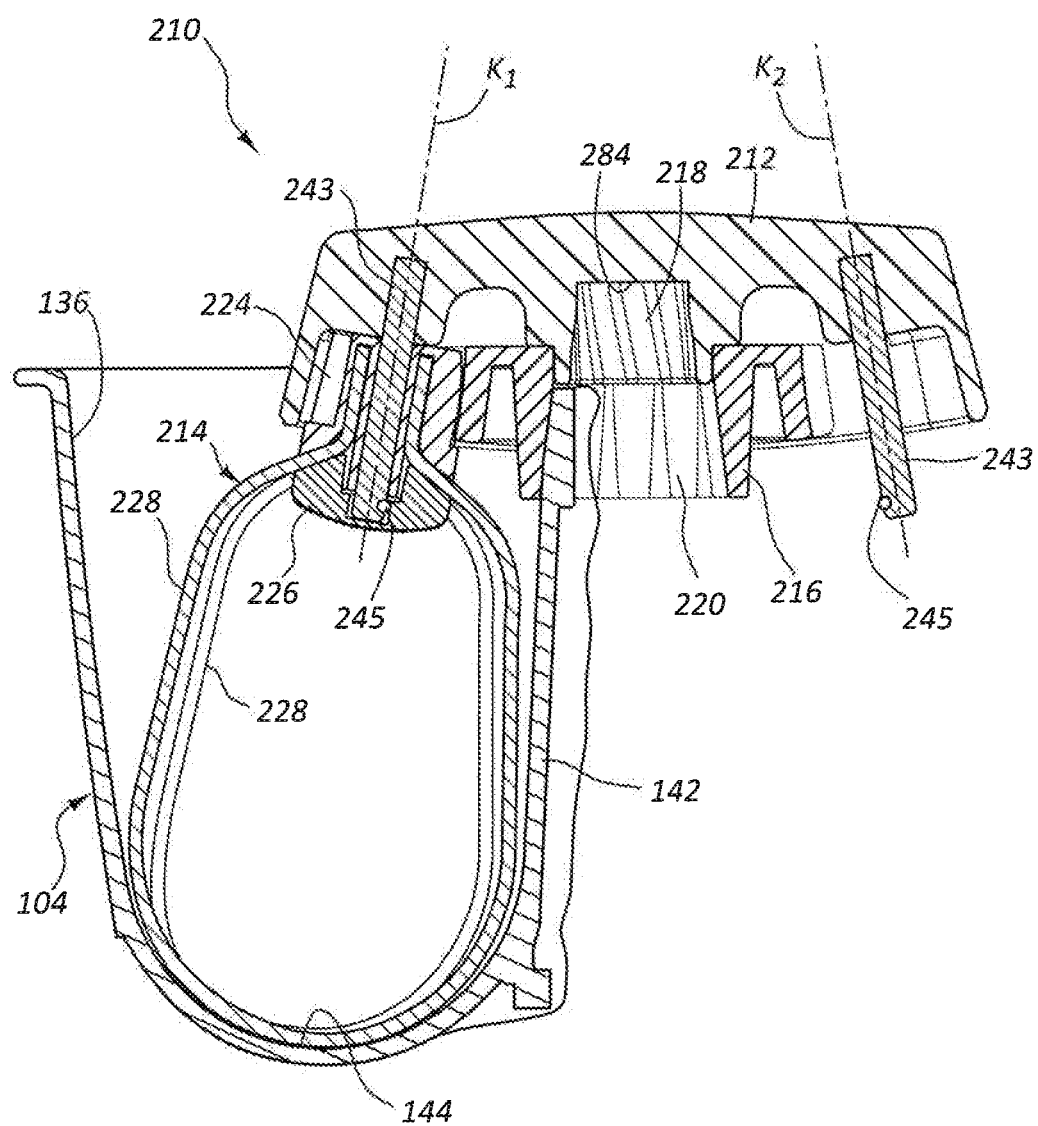
FIG. 17C is a partial section view of the attachment of FIG. 17A in a bowl.
Figure 19C:
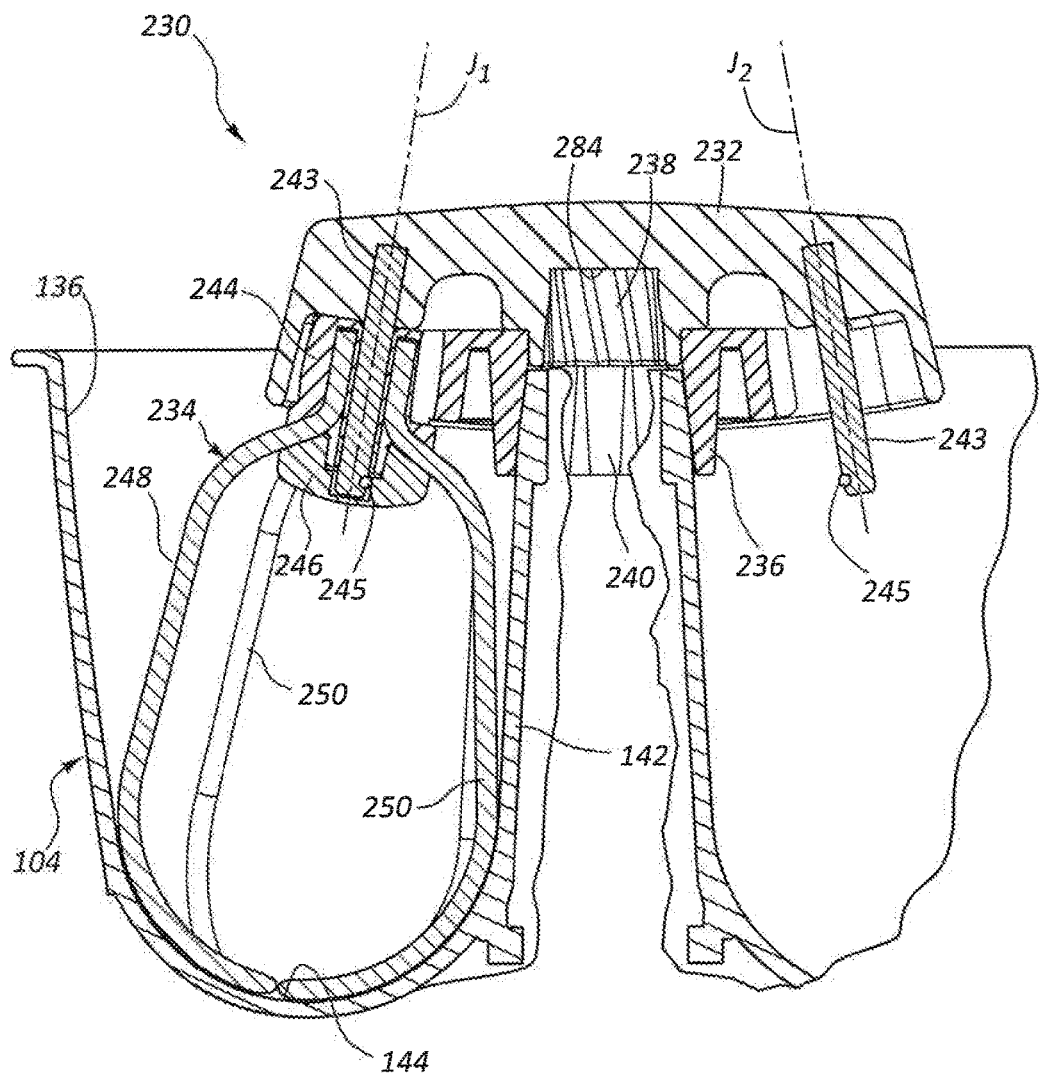
FIG. 19C is a partial section view of the attachment of FIG. 19A in a bowl.

FIGS. 17C and 19C show ball plunger rods 243 along which the whisk holders 226, 246 translate. The biased ball plungers 245 of the rods 243 may allow the whisk holders 226, 246 to be removably attached to the central bodies 212, 232 by the ball plungers 245 retracting into the rods 243 when sufficient force is applied to pull off the whisk holders 226, 246. This may make it easier to clean the whisks 214, 234 separate from the rest of the mixing tool.

The ability to translate and Change gear engagement may improve the ability of the whisk attachments 210, 230 to mix small amounts of media in a bowl. In some embodiments, the rotary mixing tool 106 may be configured to extend into the bowl 104 and touch the bottom surface 144 of the bowl 104 when under light loads. The whisk attachment 210, 230 may therefore scrape or ride along the bottom surface 144 as it rotates around the central column 142. As additional load is applied, the whisk holders 226, 246 may move away from the bottom surface 144, thereby reducing the load on the wires 228, 248, 250 while simultaneously increasing the ability of the whisk holders 226, 246 to keep mixing due to the increase in gear engagement. Thus, when small amounts of ingredients are in the bowl 104, the wires 228, 248, 250 may effectively contact and mix those ingredients while still being able to handle larger, less delicate tasks. For example, the whisk attachments 210, 230 may make a meringue from just one egg white in the bowl 104 due to the deep extension and bottom-touching contact of the wires 228, 248, 250. FIGS. 17C and 19C also show how the wires 228, 248, 250 may extend into a bowl 104 to contact a bottom surface 144 of the bowl 104. If sufficient force is applied to the whisks, they may retract along the rods 243 upward into the central bodies 212, 232, thereby also increasing the engagement of the gears in the central bodies 212, 232.

The helical gear surfaces (i.e., outer gear surfaces 222, 242 and whisk gear surfaces 224, 244) may also be advantageous in reducing the noise generated by the gears as compared to conventional straight gears.

Tool Attachment Detection and Control

The base unit 102 may house an electronics unit 254. See FIGS. 4-8. The electronics unit 254 may comprise power electronics and control electronics. The power electronics may provide power to the motor 166 and user interface 110. The control electronics may receive information via sensors and the user interface 110 to control the operation of the mixer apparatus 100. Control electronics may include a computer system and be referred to as a control unit. See also FIG. 35 and related description below. The electronics unit 254 may be wired to provide power and control signals to the motor 166 and other electronic elements disclosed herein. Such wiring is omitted from the figures.

Figure 21:
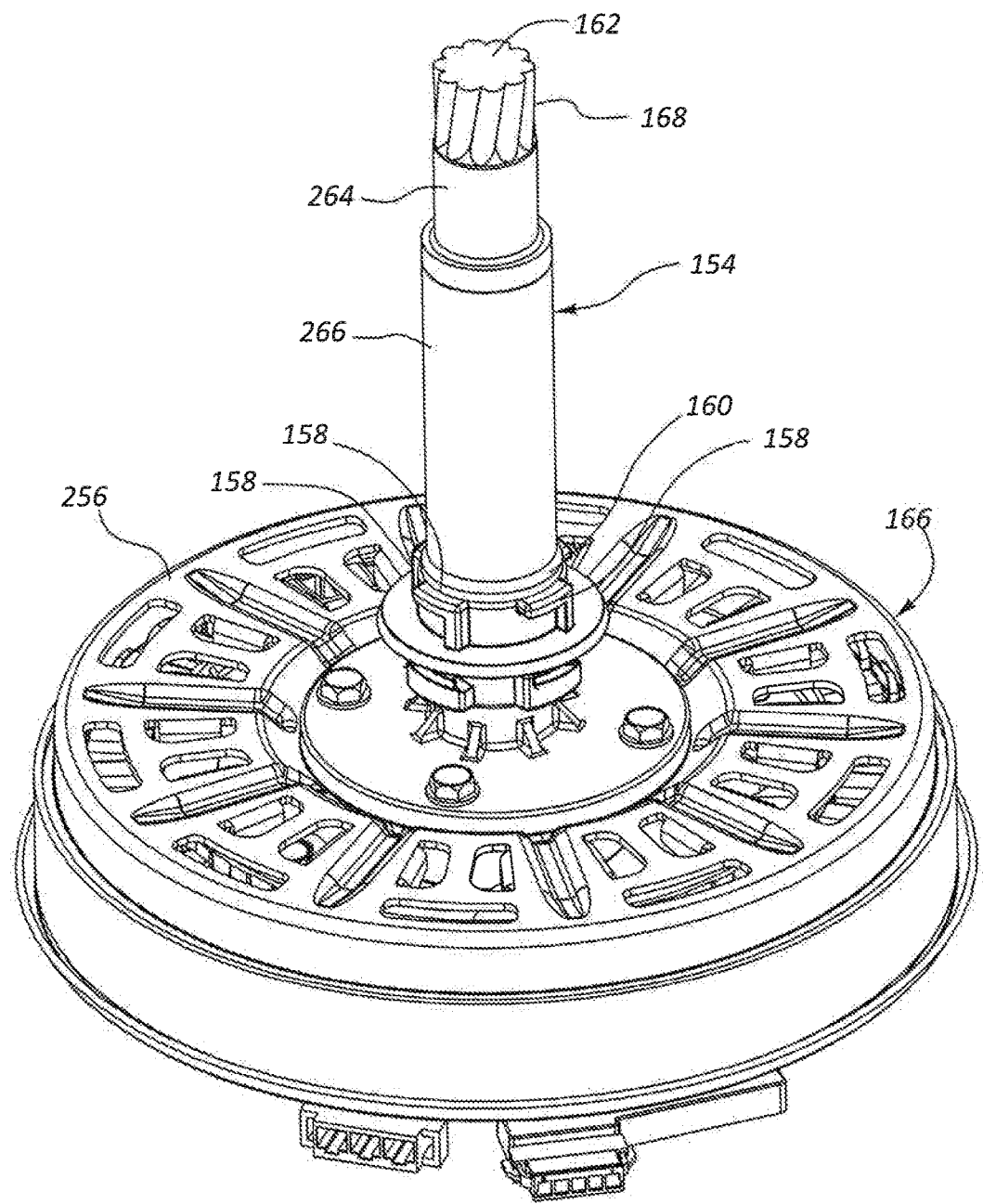
FIG. 21 is a perspective view of a motor and driveshaft assembly of the present disclosure.
Figure 22:
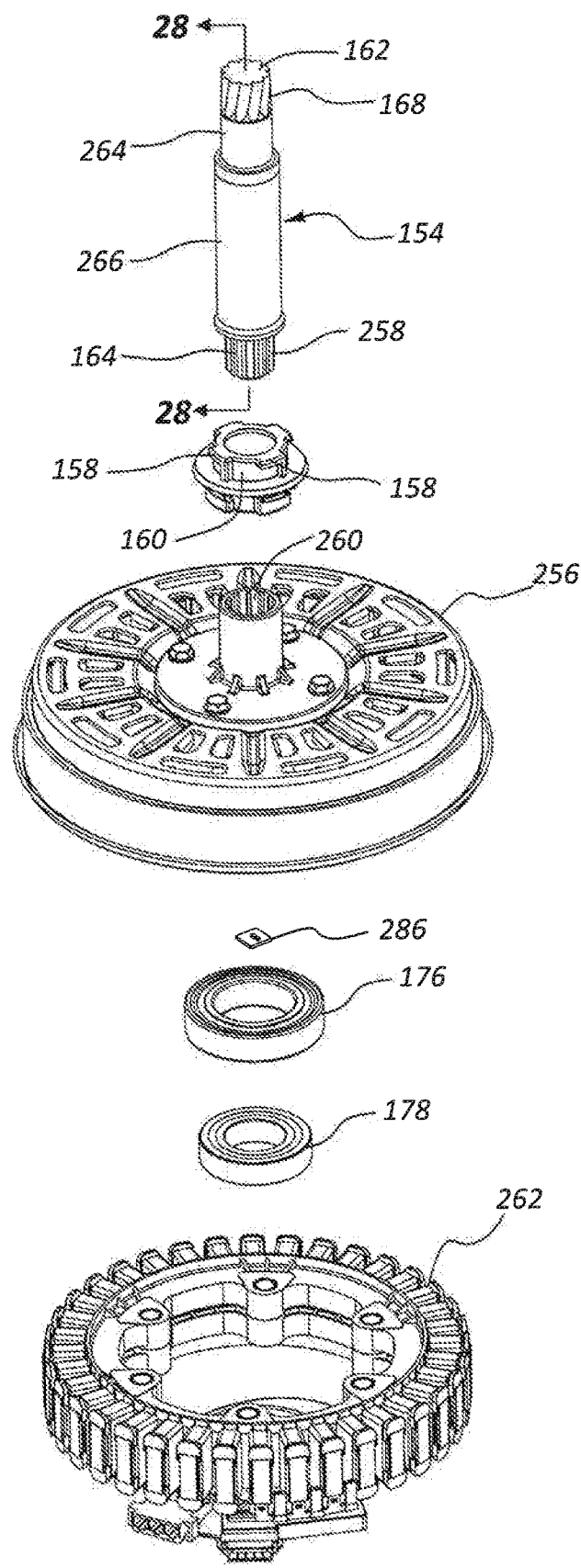
FIG. 22 is an exploded view of the motor and driveshaft assembly of FIG. 21.
Figure 23:
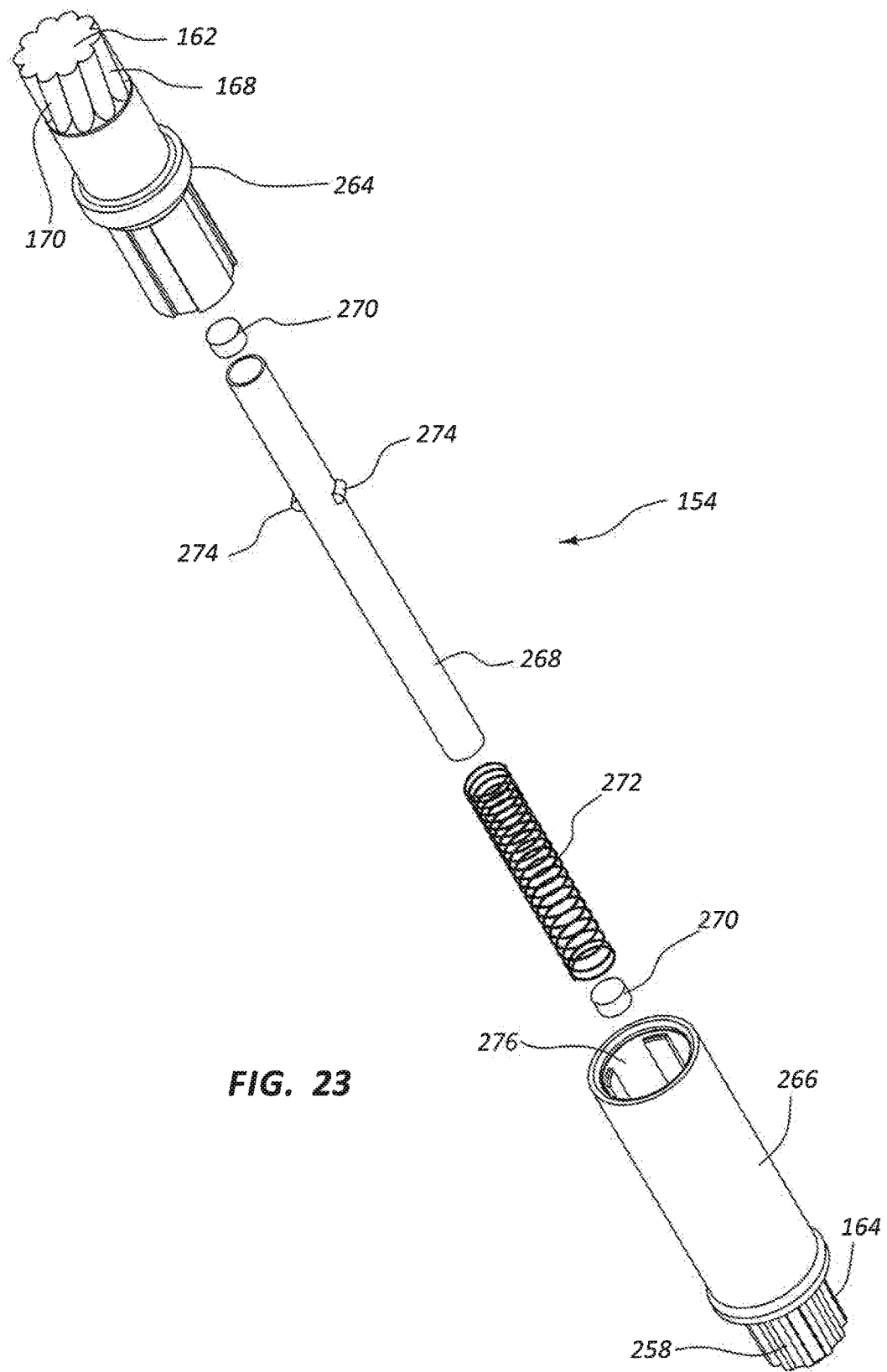
FIG. 23 is an exploded view of the driveshaft of FIG. 21.

As shown in FIGS. 8 and 21-22, the motor 166 may be directly connected with the driveshaft 154 at base portion 160. The driveshaft 154 may be connected to a rotor 256 of the motor 166 at a motor engagement surface 258 at the proximal end 164 of the driveshaft 154 and a driveshaft engagement surface 260 of the rotor 256. The driveshaft 154 may be insertable into the rotor 256 at the driveshaft engagement surface 260. The base portion 160 of the driveshaft 154 may extend around the driveshaft 154 and may be configured to remain stationary as the driveshaft 154 rotates. In some embodiments, the base portion 160 is attached to the upper housing 114 to remain still relative to the driveshaft 154. The rotor 256 may be driven by a stator 262 in the motor 166. Using a rotor-stator type motor 166, the motor is brushless, and the mixer apparatus 100 may have reduced heat and noise generation. This may allow the base unit 102 to be waterproofed and quiet in operation since no vents for heated air may be necessary fir its operation.

In some embodiments, the stator 262 may be controlled by the electronics unit 254 to turn the rotor 256 in two directions (e.g., clockwise and counter clockwise). Generally, the electronics unit 254 may drive the motor 166 in a primary direction for mixing purposes, but in some cases, such as during emergencies or when signals indicating a need to "stop" are detected by the electronics unit 254, the motor 166 may be driven in the opposite direction to quickly stop rotation. This may be referred to as reverse braking of the motor 166. In other situations, a mixing tool attachment 106 may become stuck on the driveshaft 154, and the normal direction of rotation of the motor 166 may be reversed to help the user remove the mixing tool attachment 106. While a rotor-stator type motor 166 is shown in these figures, it will be appreciated that other types of motors such as brush-based motor may he used in the base unit 102.

Referring now to FIGS. 23-28, various features of the driveshaft 154 are shown in detail. The driveshaft 154 may comprise an upper driveshaft 264 and a lower driveshaft 266 that are configured to be connected to each other. See FIGS. 23 and 28. As shown in the exploded view of FIG. 23 and section view of FIG. 28, the interior of the driveshaft 154 may comprise a magnet carrier 268 configured to carry two magnets 270. In some arrangements, the magnet carrier 268 may comprise a solid shaft with magnets 270 connected to opposite ends, or may comprise a single, large magnet extending along the length of the magnet carrier 268. It may be beneficial, however, to have two magnets 270 in the magnet carrier 268 so that one may be close to the distal end 162 of the driveshaft 154 and one may be close to the proximal end 164 of the driveshaft 154 without increasing the weight or cost of the magnets 270 by having a large, solid magnet.

The magnet carrier 268 may be biased by a biasing member 272 (e.g., a spring) relative to the lower driveshaft 266 due to contact between the biasing member 272, the lower driveshaft 266, and the nodes 274 extending peripherally from the magnet carrier 268. Thus, the magnet carrier 268 may translate axially through a central chamber 276 formed within the upper driveshaft 264 and lower driveshaft 266.

Figure 24:
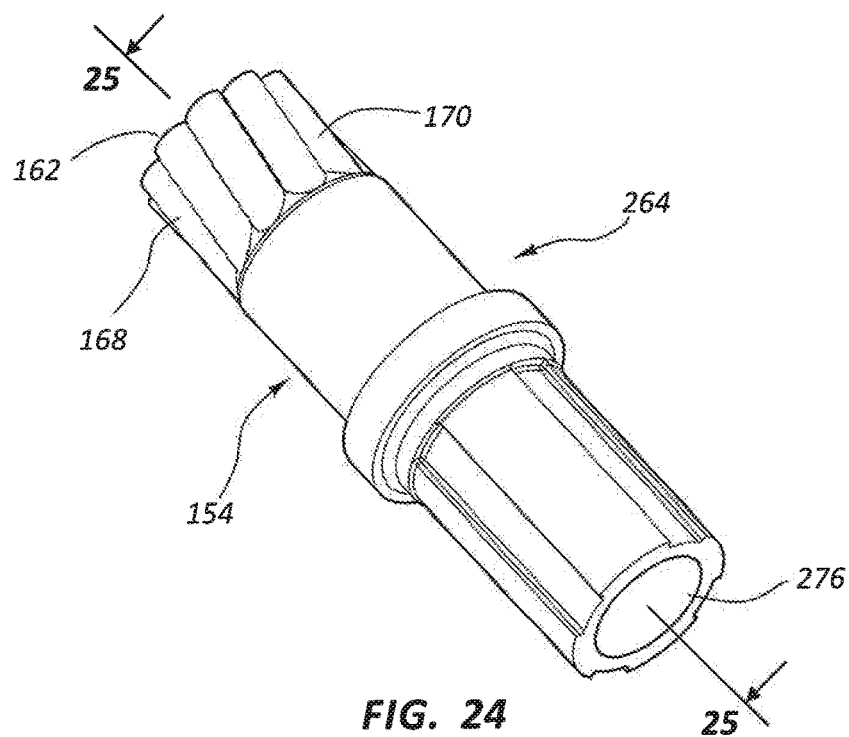
FIG. 24 is a view of an upper driveshaft portion of the driveshaft of FIG. 21.
Figure 25:
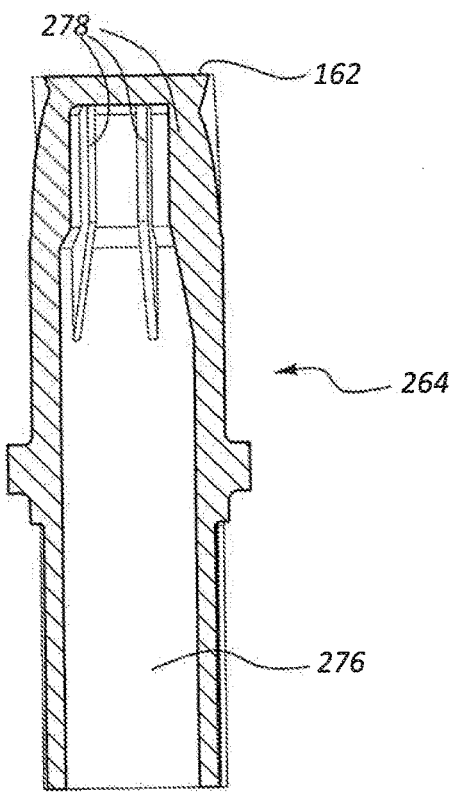
FIG. 25 is a central section view of the upper driveshaft portion of FIG. 24.
Figure 26A:
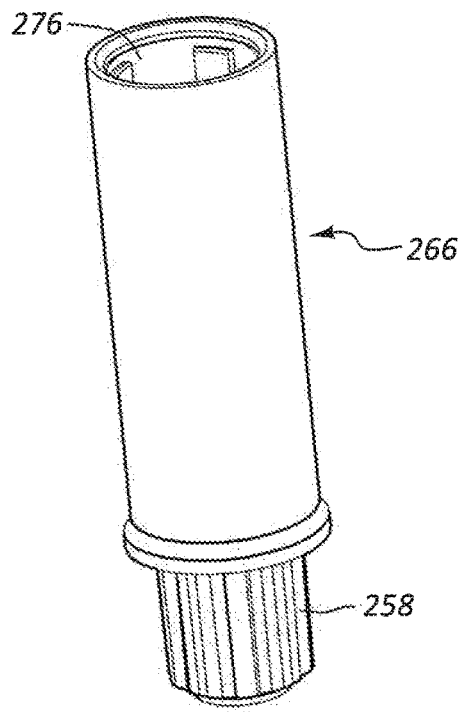
FIG. 26A is a view of a lower driveshaft portion of the driveshaft of FIG. 21.
Figure 26B:
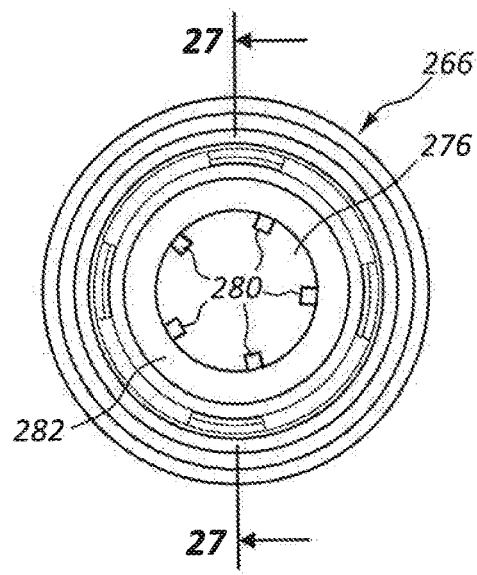
FIG. 26B is a top view of the lower driveshaft portion of FIG. 26A.
Figure 27:
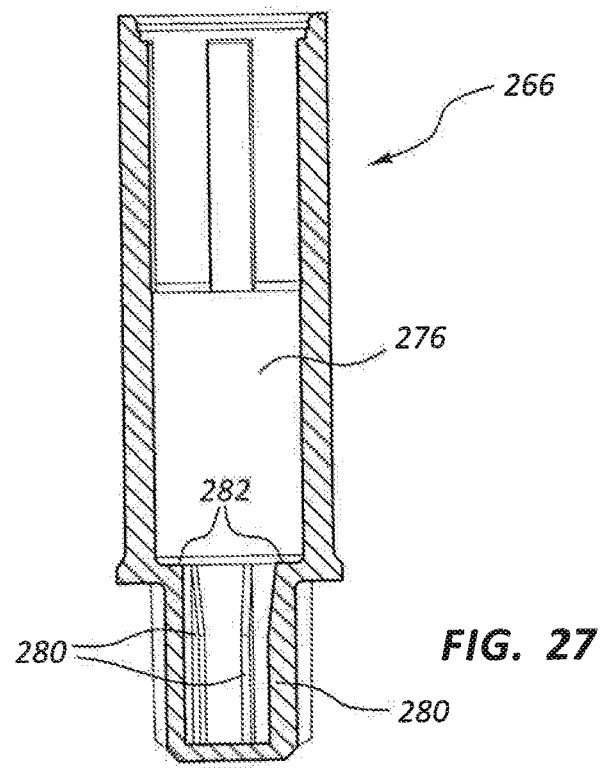
FIG. 27 is a central section view of the lower driveshaft portion of FIG. 26A.

FIG. 25 shows a section view of the upper driveshaft 264 of FIG. 24. The central chamber 276 may comprise a plurality of guide members 278 to help retain and align the magnet carrier 268 within the driveshaft 154. FIGS. 26B and 27 also show guide members 280 of the lower driveshaft 266 that may be used to guide the magnet carrier 268. The magnet carrier 268 is shown positioned within the guide members 278, 280 in FIG. 28. As shown in FIG. 26B, which is a top view of the lower driveshaft 266, the guide members 280 may be circumferentially spaced around the central chamber 276 to support the magnet carrier 268 from multiple directions. Guide members 278 of the upper driveshaft 264 may also be circumferentially arranged. FIGS. 26B and 27 also show a retaining surface 282 within the central chamber 276 that is configured to act as a support and retaining surface for the biasing member 272 when the driveshaft 154 is assembled. See also FIG. 28.

Figure 28:
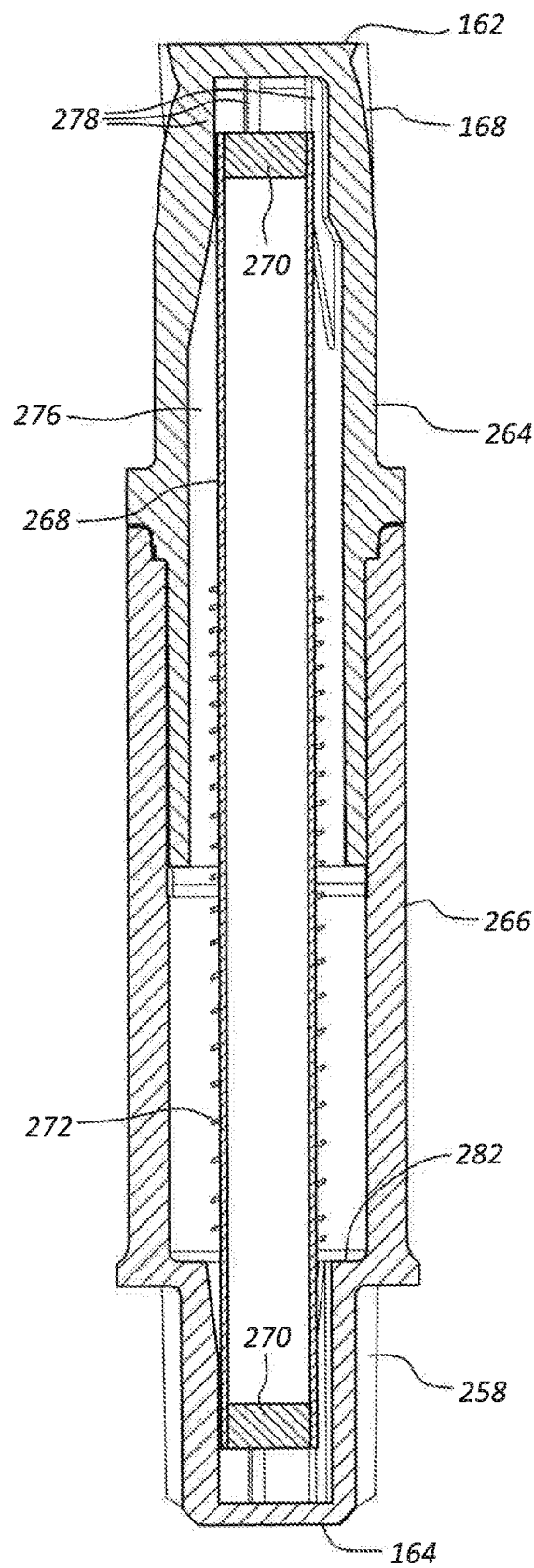
FIG. 28 is a central section view of the driveshaft of FIG. 21.

FIG. 28 is a section view of the driveshaft 154 that illustrates the connection and assembly of the internal portions of the driveshaft 154. Within the central chamber 276, the magnet carrier 268 may translate axially when a magnetic field is presented at the distal end 162 or proximal end 164 of the driveshaft 154 due to the magnets 270 which are positioned proximate those respective ends 162, 164. The magnet carrier 268 is shown in a neutral position in FIG. 28, but, depending on the polarity of the magnets 270 in the magnet carrier 268, the magnet carrier 268 may be attracted distally (i.e., toward the distal end 162) or repelled proximally (i.e., toward the proximal end 164) when the magnetic field is introduced at the distal end 162. This movement of the magnet carrier 268 may compress or expand the biasing member 272. When the magnetic field is removed, the biasing member 272 may bring the magnet carrier 268 back to the neutral position.

Various mixing tool attachments (e.g., dough hook attachment 202, French whisk attachment 210, and cookie whisk attachment 230) may comprise a magnetic portion. For example, the mixing tool attachments may comprise a magnetic body portion (e.g., body portion 206, central body 212, or central body 232), a magnet attached to the mixing tool attachment (e.g., on or within a driveshaft engagement surface 284 in FIGS. 16B, 17B, and 19B) or in another element of the mixing tool attachment (e.g., the whisk holders 226, 246 or central gears 216, 236). Mixing tool attachments with a magnetic portion may induce a magnetic field through the driveshaft 154 when the attachments are connected to the distal end 162 of the driveshaft 154, and this magnetic field may induce movement of the magnet carrier 268 within the driveshaft 154.

The electronics unit 254 may be connected to a magnetically-sensitive sensor in the base unit 102. The Hall effect sensor 286 shown in FIGS. 8-10 and 22 is one example of a magnetically-sensitive sensor in the mixer apparatus 100. The Hall effect sensor 286 may he positioned at the top of the tilted shaft 132 of the lower housing 112 below the driveshaft 154 along longitudinal axis L. When the magnet carrier 268 moves in the driveshaft 154, the Hall effect sensor 286 may transduce the change in the magnetic field of the magnets 270 in the magnet carrier 268. Thus, the Hall effect sensor 286 may be used to detect attachments connected to the driveshaft 154. The change in the magnetic field may correlate with a distance between the magnet carrier 268 and the Hall effect sensor 286 or a movement of the magnet carrier 268, in which case the Hall effect sensor 286 readings may be used to determine the distance between at least one magnet 270 and the Hall effect sensor 286.

Each of the various mixing tool attachments that are attachable to the driveshaft 154 (e.g., dough hook attachment 202, French whisk attachment 210, and cookie whisk attachment 230) may comprise a magnetic portion that has different strength or is configured to be positioned at a different distance from the driveshaft 154 (and magnets 270) when each attachment is connected. This means that the Hall effect sensor 286 may detect a different magnetic field for each different mixing tool attachment due to their unique effects on the movement and magnetic field-induced positioning of the magnet carrier 268 in the driveshaft 154.

As a result, the electronics unit 254 may operate differently based on which mixing tool attachment is connected to the driveshaft 154. More power may be required to turn a kneading hook, so the electronics unit 254 may increase power settings or other operational settings for the motor 166 in order to facilitate better kneading when a hook attachment is detected, and the electronics unit 254 may set the motor 166 at less power when a thin wire beater or whisk attachment is in place (e.g., to whip cream or make a meringue). Thus, the type of attachment detected via the magnetic sensor may directly affect the control settings for the motor 166 made by the electronics unit 254. If no attachment is detected, the electronics unit 254 may set the mixer apparatus 100 to a predetermined setting, such as, for example, a setting preventing rotation of the driveshaft 154 (correlating with a scenario where no mixing tool is attached) or a default power and speed setting (correlating with a scenario where a default attachment does not have a magnetic element). In some embodiments, the electronics unit 254 may also output a signal to the user interface 110 indicating which attachment is detected, that no attachment is detected, and/or that the motor 166 is disabled.

According to a related method embodiment, a mixer apparatus may be provided having a magnetic element in a mixing tool attachment that is configured to be attached to a mixing tool attachment point of the mixer apparatus. A sensor in the mixer apparatus may detect a magnetic field produced by the magnetic element when the mixing tool attachment is attached to the mixing tool attachment point. Control electronics of the mixer apparatus may adjust operational settings of the mixer apparatus (e.g., motor speed or power) according to the magnetic field detected. In some embodiments, the operational settings may comprise turning off the mixer (e.g., when a mixing tool attachment is removed and a sufficient magnetic field is not detected). In some embodiments, the control electronics may differentiate between different mixing tools based on the different strength or position of the magnetic elements (or an absence thereof) in the different mixing tools.

The type of mixing tool attachment detected may affect the operational settings of the motor 166. The electronics unit 254 may set upper and/or lower limits for the operation of certain mixing tool attachments to avoid damage to the mixing tool attachments or other components of the mixer apparatus 400. For example, if a strong, thick tool attachment is connected to the motor 166 such as a dough kneading hook, the power settings available to the user to control the hook's movement may comprise a high upper power limit so that the motor 166 can provide high levels of torque to the hook. If a more delicate tool is connected to the motor 166 such as a French whisk, the power settings available may comprise a lower upper power limit so that the French whisk is not improperly used with a high power setting in a material that could bend or otherwise damage the wires in the whisk. Similarly, if the tool is a hook, an upper limit on speed of the rotation of the hook may be lower as compared to a whisk since in many applications the hook may be more beneficially used at lower rotational velocity than a whisk.

In another example, limits on the duration of operation of the motor 166 may be set according to which tool is detected on the mixer apparatus 100. For example, if a kneading hook is detected, the electronics unit 254 may control the motor 166 to automatically shut off after a predetermined length of time that corresponds with a preferable length of kneading time for certain kinds of dough. If a whisk is detected, the shut-off time may be adjusted or disabled, as appropriate.

In yet another example, the user may select a recipe to create using the user interface 110 or another input device. The recipe may require a certain kind of mixing tool attachment to create, so the electronics unit 254 may prevent movement of the motor 166 to complete the steps of that recipe until an appropriate attachment is detected. Similarly, some recipes may have steps that require different kinds of tool attachments for each step. The control electronics of the electronics unit 254 may therefore check whether the appropriate attachment is detected at each step of the process so that the wrong tool is not used at the wrong time.

Fast-Stop Features

Figure 29:
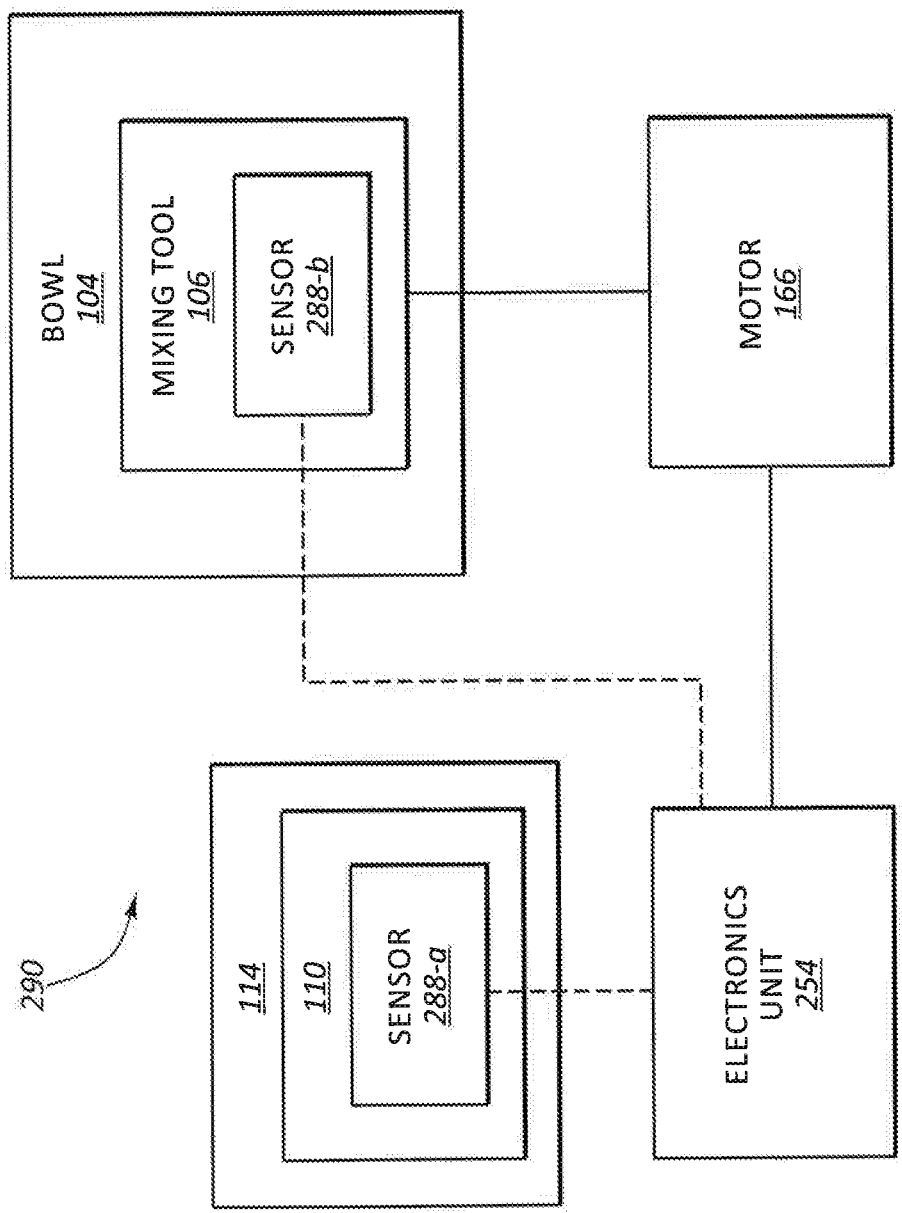
FIG. 29 is a block diagram of a system according to the present disclosure.

In some embodiments the electronics unit 254 may be linked to a contact sensor 288 disposed on the mixer apparatus 100. FIG. 29 is a block diagram of a mixer apparatus 290 having a plurality of contact sensors 288-a, 288-b. As shown in FIG. 29, a contact sensor 288-a may be positioned at the user interface 110 or a contact sensor 288-b may be positioned at the rotary mixing tool 106 (i.e., a mixing member) and may be in electronic communication with the electronics unit 254. The electronics unit 254 may be in control communication with the motor 166, which is in turn configured to rotate the rotary mixing tool 106. In some arrangements the contact sensor 288-a may detect contact of a hand at the user interface 110, and in some configurations the contact sensor 288-a may detect contact anywhere on the upper housing 114 of the mixer apparatus.

According to a method aspect of the present disclosure, the electronics unit 254 may control the motor 166 based on signals transduced by a contact sensor 288-a, 288-b. The sensors 288-a, 288-b may be touch-sensitive and may therefore detect the touch of a human hand on at least a portion of the user interface 110 or the rotary mixing tool 106. In one example embodiment, the motor 166 may drive the rotary mixing tool 106 to rotate until one of the sensors 288-a, 288-b are contacted by a human hand. Contact detection by contact sensor 288-a may indicate that the user wishes to initiate an emergency stop of the motor 166, and contact detection by contact sensor 288-b may indicate that a hand is within the bowl 104 and therefore that the movement of the mixing tool 106 should be stopped, at least until the hand is removed. When a hand is detected by a contact sensor 288-a, 288-b, the electronics unit 254 may power down or brake the motor 166. One way the motor 166 may brake is by the electronics unit 254 quickly reversing the motor 166. Typically, this type of braking will stop the motor 166 within one third of a revolution (at least for the rotor-stator type motor described elsewhere herein).

In some embodiments, only one of the contact sensors 288-a, 288-b may be implemented in the mixer apparatus 100. Thus, only one surface of the upper housing 114, user interface 110, or rotary mixing tool 106 may be touch-sensitive. In some embodiments, the rotary mixing tool 106 may comprise a mixing implement (e.g., a wire or hook) that extends into the bowl 104, and the contact sensor 288-b may transduce human contact with any part of the mixing implement.

Some situations may require a fast stop of the mixer apparatus 100 when the motor or mixing tool attachments are hard jammed, stalled, or experience significant interference such as, for example, when a person's arm or hand is positioned in the bowl or the media being mixed is too dense or heavy for the motor to correctly operate. Conventional mixers cannot fast stop in this manner, so their motors will try to continue to operate under these conditions until manually turned off or there is a mechanical failure (e.g., overheating). Embodiments of the mixer apparatus 100 of the present disclosure may use a control unit to monitor, calculate, or measure the output power of the motor to detect the occurrence of a hard jam, stall, or significant interference with the motion of the motor and/or mixing tool attachments. Upon detection of one of these conditions, the control unit may stop or brake the motor in an attempt to limit or prevent damage to the mixer or other unwanted or dangerous conditions.

Automatic Control Methods

Conventional mixer appliances may be used to knead doughs automatically by monitoring the loading profile that the dough places on the electric motor during the kneading cycle. During the "development" stage of the dough, the power required to mix the dough at a constant speed gradually increases. As the dough transitions from the "development" stage to the "let-down" stage, the power required to continue to mix the dough at a constant speed begins to decrease. For best bread making results, the kneading process should terminate as the bread transitions from the "development" to "let-down" stage.

One of the most accurate and ideal methods to observe the loading profile of the dough is to monitor the output power of the motor. This may be achieved by using a torque transducer that couples the motor to the kneading arm and gives an accurate picture of the loading profile induced by the transition from the "development" stage to "let-down" stage of the dough. However, a torque transducer in a consumer appliance like a food processor is impractical due to cost and size.

Conventional mixers monitor the input voltage (i.e., the power) to the electric motor as a means to observing the loading profile of the dough, but this method has shortcomings. The input power to the motor does not equal output power from the motor because of losses in the motor (i.e., due to imperfect motor efficiency, which is the ratio of the output power to the input power). Unfortunately, the motor efficiency changes as the motor temperature changes, so output power is not always easily determined using known base motor efficiency values. For example, the motor temperature rises as the mixer completes a kneading cycle. This change in motor efficiency during the kneading cycle can skew the results of the observed loading profile.

Figure 30:
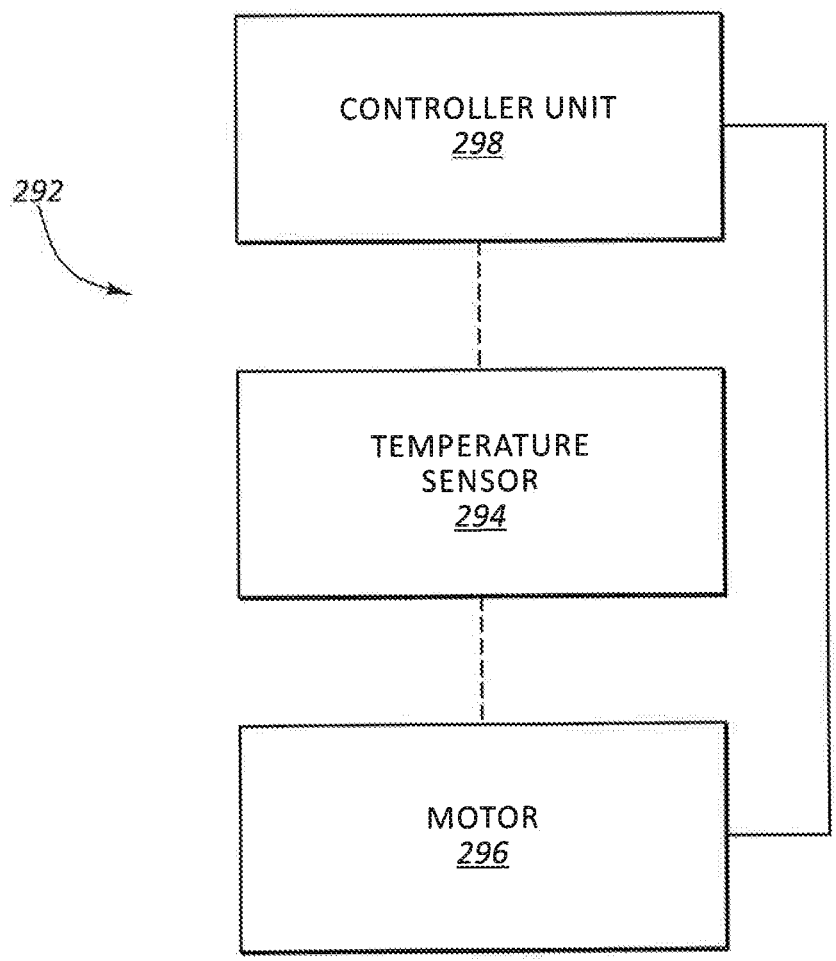
FIG. 30 is a block diagram of a system according to the present disclosure.

To overcome this deficiency, a mixer 292 of the present disclosure may implement a temperature sensor 294 to monitor the temperature of a mixer motor 296. See FIG. 30. The motor temperature information may be readable by a controller unit 298 (e.g., electronics unit 254) to be used to compensate for the changing efficiency of the motor 296. This may provide a more accurate calculation of the motor output power due to removing unknown changes to the motor efficiency in an observed loading profile. See also FIG. 34 and related description below.

Thus, the controller unit 298 may engage the motor 296 with the temperature sensor 294 tracking the temperature of the motor 296. The controller unit 298 may monitor the temperature of the motor 296 using the temperature sensor 294 while the motor 296 operates. Over time, the output power of the motor 296 may be determined by the controller init 298 by referencing information about the motor's efficiency over a range of temperatures. By tracking the motor's efficiency more accurately, the output power of the motor 296 that is delivered to a mixing tool may be controlled to be more consistent as the motor 296 heats up and becomes less efficient. Additionally, the controller unit 298 may track the input motor voltage and the measured motor current to calculate the output power of the motor 296. This calculated output power may be used to observe the loading profile of dough being mixed in real time. This calculated output power (with temperature compensation) may typically be more accurate than using only the input motor voltage.

Also, in a mixer apparatus having a direct drive for the mixing tool attachments (e.g., mixer apparatus 100), no gear train is positioned between the motor and the kneading arm. Much like an electric motor, a gear train has an efficiency that may also change with time. The elimination of the gear train in the present mixer apparatuses may enhance their ability to calculate a more accurate output power because the direct drive configuration means there are less changing variables in the system.

Lid Detection and Control

Figure 31A:
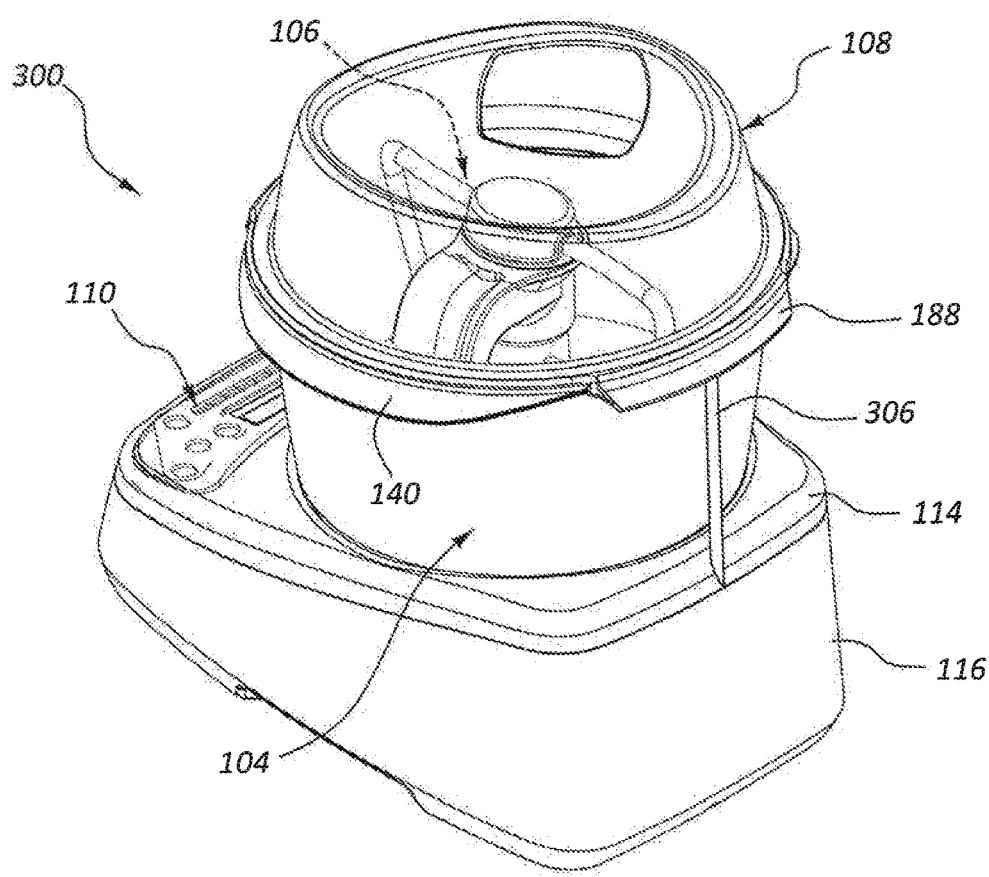
FIG. 31A is a rear perspective view of another embodiment of a mixer apparatus of the present disclosure.
Figure 31B:
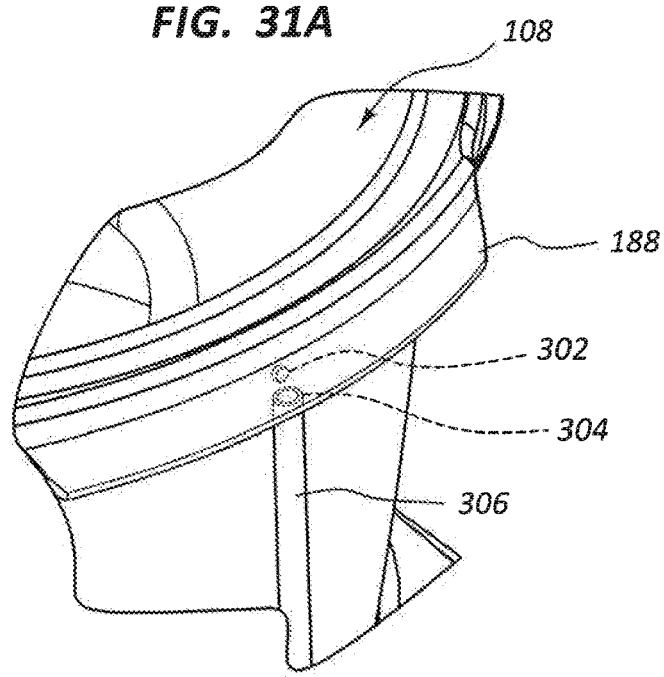
FIG. 31B is a detail view of the mixer apparatus of FIG. 31A.

In some embodiments, the mixer apparatus 100 may comprise a lid detection system 300. As shown in FIGS. 31A-31B, the lid detection system may comprise a magnetic element 302 embedded in or attached to a latching portion 188 of the lid 108 of the mixer apparatus 100. One or more of the latching portions 188 may have a magnetic element 302. The magnetic elements 302 may produce a magnetic field that can be sensed by a switch 304 positioned on a switch post 306. For example, the switch 304 may be a magnetically-sensitive Reed switch. The switch post 306 may be referred to as a lid detection portion of the base unit 102. In some arrangements, the switch post 306 may comprise an arm or wing shape extending toward the top of the bowl 104 from the base unit 102.

When a lid 108 having magnetic elements 302 is attached to the bowl 104 in locked orientation, the switch 304 may trigger so that the presence of the lid 108 may be detected by a control unit in the mixer apparatus 100 (e.g., as part of the electronics unit 254 in the base unit 102). The locked orientation may require the magnetic element 302 to be within a predetermined distance from the switch 304.

Figure 32:
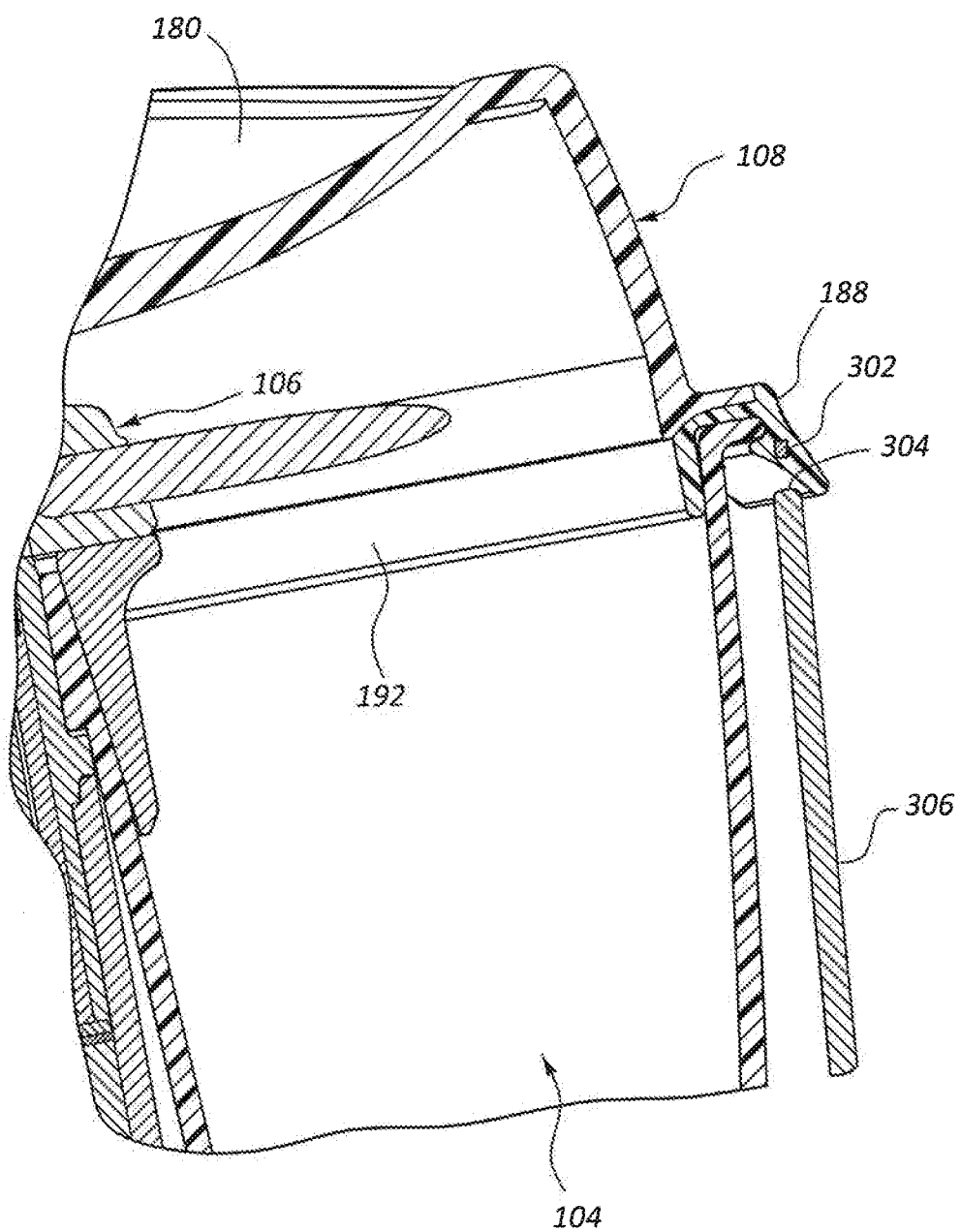
FIG. 32 is a partial central section view of the mixer apparatus of FIG. 31A.

The presence or absence of the lid 108 may affect the operation of the mixer apparatus 100 by the electronics unit 254. For example, the motor 166 and/or rotary mixing tool 106 may be prevented from rotation if the lid 108 is not detected by the switch 304. Alternatively, a message or warning may be displayed via an output display or indicator element in the user interface 110. If the lid 108 is detected, the mixer apparatus 100 may operate normally. Magnetic elements 302 may be positioned in a plurality of latching portions 188 of the lid 108 so that the presence of the lid 108 may be detected in a plurality of different bowl-attached positions of the lid 108. FIG. 31B shows a detailed view of the post 306 and magnetic element 302, and FIG. 32 shows a side section view of the post 306, an embedded magnetic element 302, and switch 304. In some embodiments, the lid 108 may be considered to be in a locked orientation when the latching portions 188 are engaged around the rim 138 of the lid or when the lid 108 is otherwise removably attached to the bowl 104 and/or unable to be freely withdrawn from e bowl by lateral movement or movement along the longitudinal axis L of the bowl 104.

Figure 7:
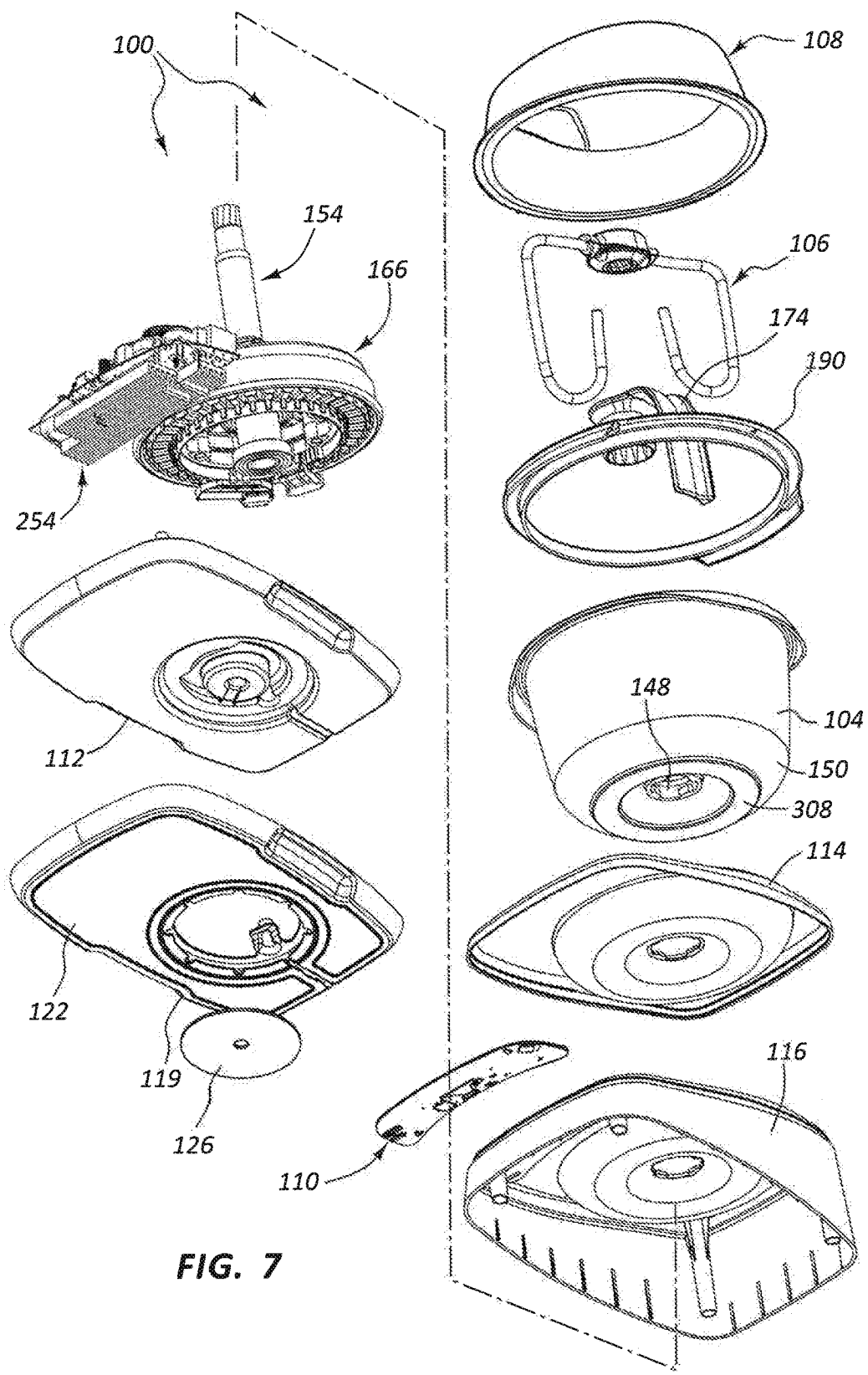
FIG. 7 is another exploded view of the mixer apparatus of FIG. 1A.

In some embodiments, the lid detection system 300 may comprise a switch 304 that is integrated with the bowl 104. For example, the switch 304 may be embedded in or near the rim 138 of the bowl 104. Electrical leads for the switch 304 may extend down the bowl to an electrical contact between the base unit 102 and the bowl 104 (e.g., at the circular base portion 308 of the bowl 104 as shown in FIG. 7). The electrical contact may beneficially circumferentially extend around the base of the bowl 104 so that the contact may be received by the base unit 102 irrespective of the rotated position of the bowl 104.

In other embodiments, the switch 304 may comprise a non-magnetic sensor configured to detect the presence or absence of the lid 108. For example, the sensor may be an optical sensor configured to optically detect the lid 108 or a pressure switch that is triggered by the attachment of the lid 108 to the bowl 104.

Figure 33:
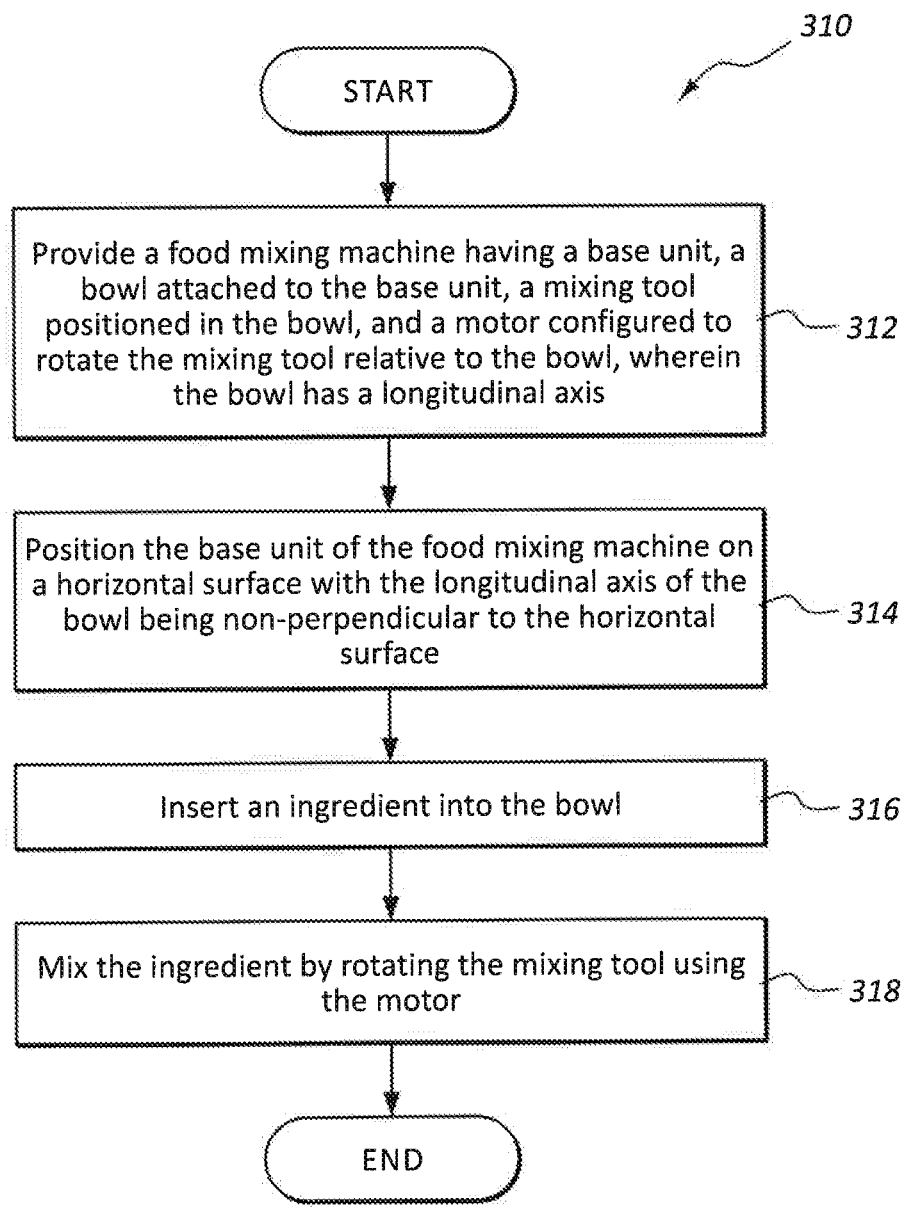
FIG. 33 is a flowchart showing an example method according to the present disclosure.

Various structures and apparatuses of the present disclosure exemplify elements and features of methods of the present disclosure. FIG. 33 shows a flowchart indicating an example embodiment of a method 310 for improving mixture of ingredients in a food mixing machine. The method 310 may comprise providing a food mixing machine having a base unit, a bowl attached to the base unit, a mixing tool positioned in the bowl, and a motor configured to rotate the mixing tool relative to the bowl, wherein the bowl has a longitudinal axis. See block 312. The method 310 may further comprise positioning the base unit of the food mixing machine on a horizontal surface with the longitudinal axis of the bowl being non-perpendicular to the horizontal surface and inserting an ingredient into the bowl, then mixing the ingredient by rotating the mixing tool using the motor. See blocks 314, 316, and 318.

In this method 310, the ingredient may be gravitationally biased to settle toward one side of the bowl. The mixing tool may be removably attached to the base unit. The method 310 may further comprise attaching the mixing tool to a drive shaft, the drive shaft being rotatable by the motor. The mixing tool may be rotated upon attachment to or detachment from the base unit. Positioning the base unit may comprise positioning the longitudinal axis of the bowl at an angle between about 75 and about 85 degrees relative to the horizontal surface. Positioning the base unit may comprise placing a bottom surface of the base unit on the horizontal surface. Positioning the base unit may comprise resting a plurality of feet of the base unit on the horizontal surface. The mixing tool may be configured to touch a bottom surface of the bowl while mixing the ingredient. A drive shaft of the food mixing machine may be inserted through the bowl.

Figure 34:
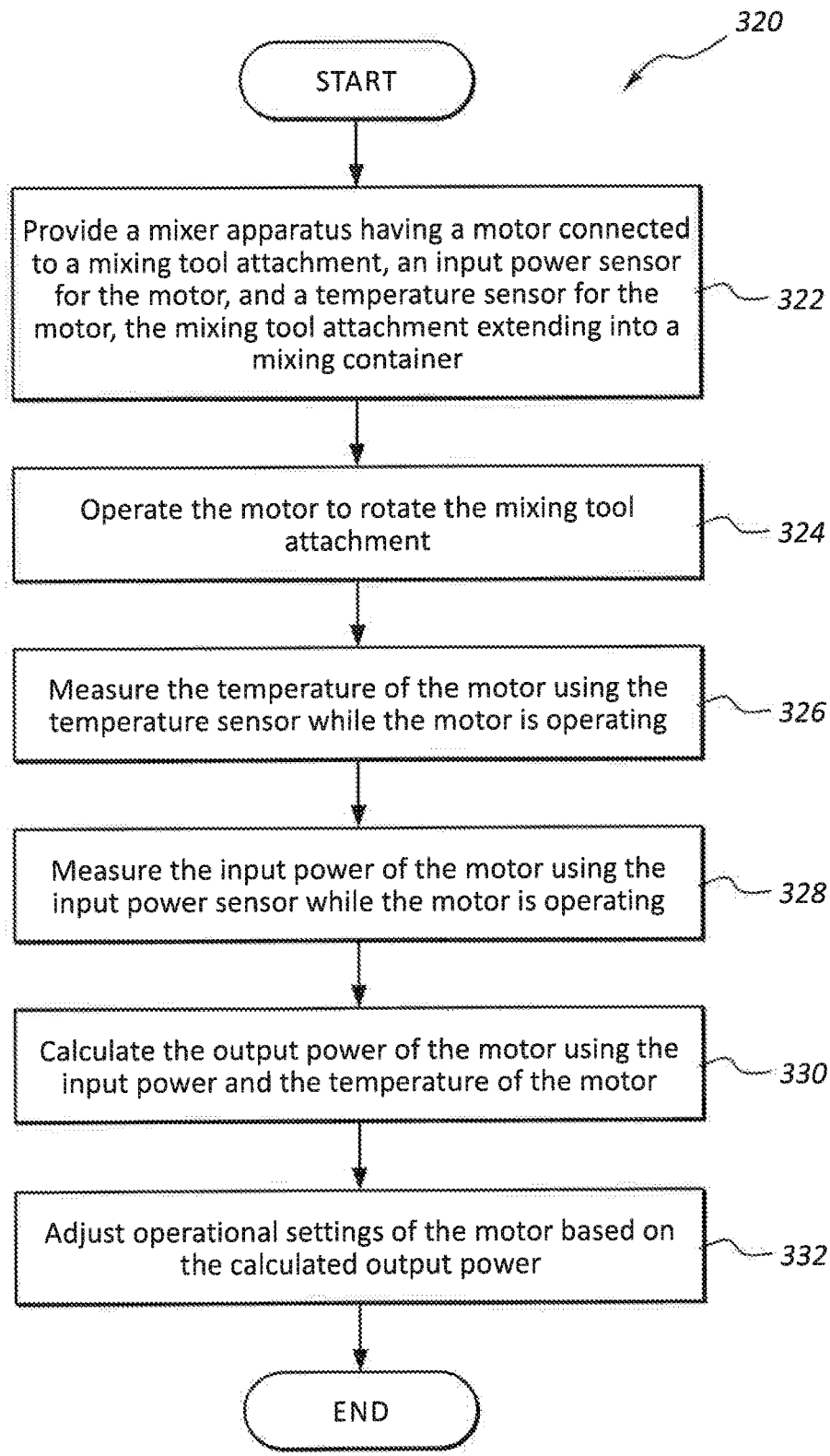
FIG. 34 is a flowchart showing an example method according to the present disclosure.

FIG. 34 is a flowchart illustrating another method 320 according to the present disclosure. This method 320 may be used to control a motor (e.g., motor 166) based on the input power and temperature of the motor. The method may comprise providing a mixer apparatus having a motor connected to a mixing tool attachment, an input power sensor for the motor, and a temperature sensor for the motor, wherein the mixing tool attachment extends into a mixing container, as shown in block 322. An input power sensor may comprise an input voltage or current sensor, for example. As shown in block 324, the method 320 may also include operating the motor to rotate the mixing tool attachment. While the motor is operating, the method may include measuring the temperature of the motor using the temperature sensor and measuring the input power of the motor using the input power sensor while the motor is operating, then calculating the output power of the motor using the input power and the temperature of the motor. See blocks 326, 328, and 330. The method may further comprise adjusting operational settings of the motor based on the calculated output power, as shown in block 332. Operational settings may be the input power settings of the motor. The calculated output power may, for instance, indicate a certain rate of movement of the mixing tool attachment, and if the output power drops too low, the operational settings of the motor may be turned up to maintain a desired output power level.

Remote Devices and Wireless Control Systems

Some embodiments of the mixer apparatus 100 may have a controller unit configured to control an operational setting of the motor 166. The controller unit may be incorporated as part of the electronics unit 254 of the mixer apparatus 100 along with a wireless communication interface that is connected to the controller unit. The wireless communication interface may comprise an interface for wireless communications such as Wi-Fi, BLUETOOTH®, ZIGBEE®, a cellular data network (e.g., 3G or Long-Term Evolution (LTE)), or similar wireless communications that permit communication of data to the electronics unit 254 from another device. The controller unit may receive information from a device external to the mixer apparatus 100 or that is part of the mixer apparatus 100. The information received may include operational parameters for the motor. The operational parameters may include information such as, for example, a motor power level, a target rotational velocity of the motor or mixing tool attachment, a mixing duration, and other values that may be implemented in operating the motor 166. In an example embodiment, the operational parameters may comprise a plurality of steps of a process to be executed by the control unit when controlling the operation of the motor 166. For instance, if the user is using the mixer apparatus 100 to prepare a specific recipe, the steps necessary for the mixer apparatus 100 to complete the recipe may be the operational parameters received by the controller unit via the wireless interface. Such steps may include, for example, a first mixing speed setting at a first power level for the motor for a first duration of time, followed by a second mixing speed setting at a second power level for the motor for a second duration of time. At least one operational setting may include stopping the movement of the motor 166 and/or waiting for input via the user interface 110 or from the other device before moving on to an additional step.

Remote devices used to communicate with the wireless communication interface of the electronics unit 254 may comprise computing devices that are configured with their own wireless communication interfaces and are compatible with the wireless communication interface of the electronics unit 254. A remote device may, for example, comprise a portable wireless communications device such as a smartphone, tablet, or other wireless-enabled device. Operational parameters may he obtained by or input into the wireless communications device via a user interface on the remote device and then transmitted to the mixer apparatus 100 via the wireless communication interface of the remote device. For example, a mixer speed setting and duration may be programmed into a smartphone device and then transmitted to the mixer apparatus 100. In some cases, the operational parameters may be predetermined and obtained by the remote device, such as by being downloaded from a remote server (e.g., via a connection to the Internet) to the remote device. In other embodiments, the electronics unit 254 may use its own wireless connection to link to a remote server and to obtain information. In these embodiments, a "portable" device may comprise a device configured and sized in a manner that allows it to be carried by an average person.

In another embodiment, the remote control device may be a user interface positioned in the base unit 102 of the mixer apparatus. The user interface (e.g., user interface 110) may by touch-sensitive to transduce user input by touch. That user interface may be wirelessly connected to the electronics unit 254 or may be directly wired to the electronics unit 254.

Thus, preprogrammed settings for the mixer apparatus 100 may be obtained and sent to the mixer apparatus 100 according to a plurality of recipes or other instructions. In this manner, a user may obtain mixer parameters that are provided by third parties and then execute those parameters without having to test or guess which parameters will produce the best results for the recipe being prepared by the mixer apparatus 100. In an example embodiment, if a recipe calls for flour to be added as the first ingredient into the bowl 104, the first motor rotational velocity may be a low value that ramps up slowly so as to not fluff up and eject flour from the bowl 104 due to an initial jerking movement of the mixing tool attachment 106. Then, after butter or another sticky or fluid ingredient is added to the mix, the velocity may be increased. Because these settings are obtained externally and provided to the mixer apparatus 100 rather than as the result of trial-and-error, mistakes in making the recipe may be more easily avoided. In some arrangements, the user may register the status of each step being performed as the mixer apparatus 100 is used to complete a process in order to direct the mixer apparatus 100 to change settings.

In one embodiment, the remote device may comprise a measuring device, such as a weight scale, humidity measurement device, thermometer, or other transducer. A measuring device may be used to measure a physical characteristics of ingredients that will be added to the mixer apparatus 100 and then to communicate that data (or associated data) to the electronics unit 254 of the mixer apparatus 100. For example, a user may weigh a quantity of flour on an electronic scale, and the scale may measure the weight of the flour and transmit that value to the mixer apparatus 100. The mixer apparatus 100 may then calculate motor operational parameters and/or preferred mixing tool attachments to mix that quantity of flour when it is combined with eggs or other ingredients in the bowl 104. In another example, the remote device may be a food thermometer hat determines the temperature of butter to be added to the bowl 104 and provides a motor power setting to the electronics unit 254 corresponding with whether the butter will be runny, soft, pliable, or hard in the bowl 104. Thus, the remote device may transduce a physical characteristic of an ingredient and then transfer operational settings to the electronics unit 254 via the wireless communications interface. The remote measuring device may transmit instructions to the mixer apparatus 100 rather than, or in addition to, measurement data.

Figure 35:
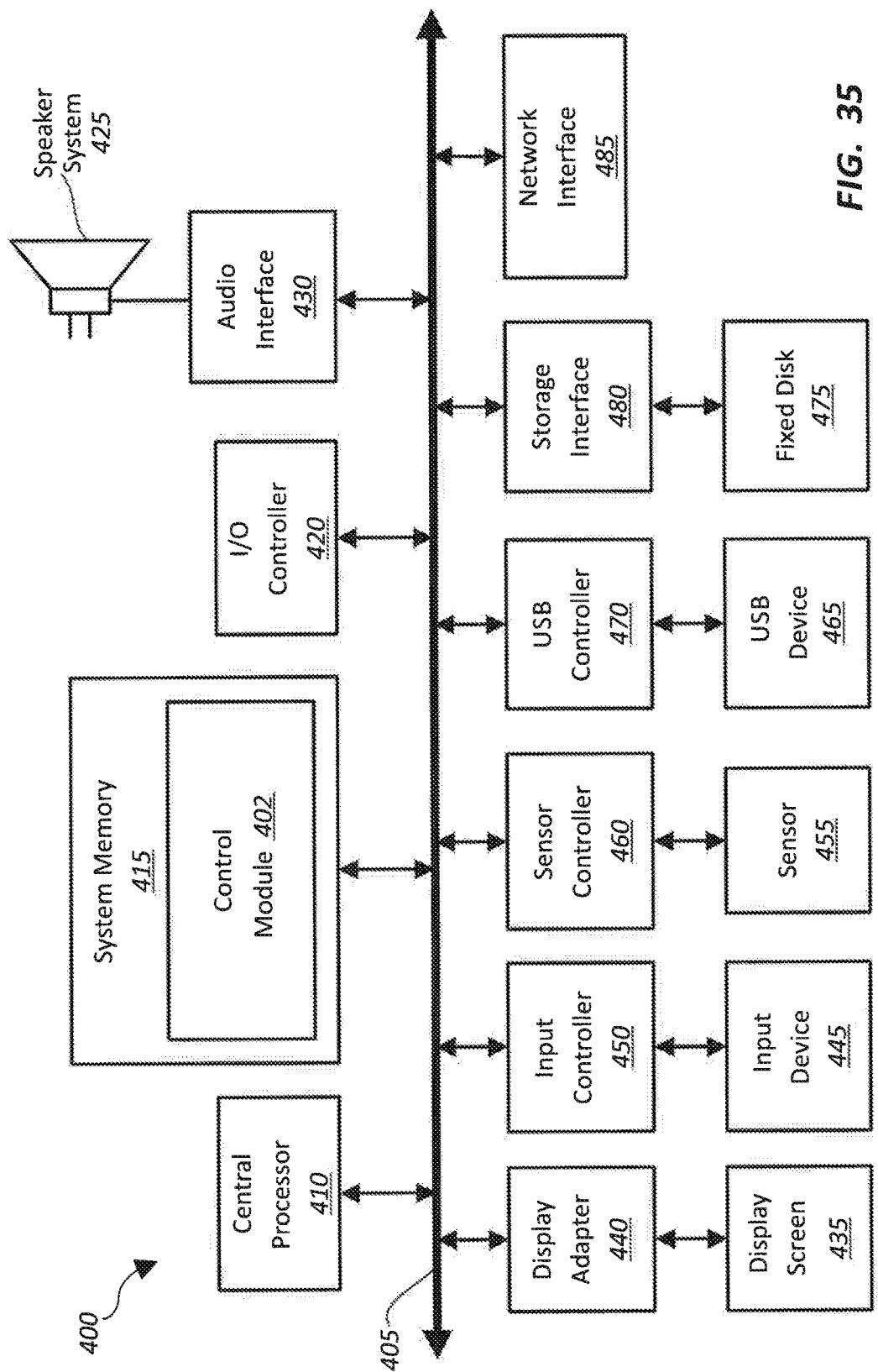
FIG. 35 is a block diagram of a circuit for a controller unit according to the present disclosure.

FIG. 35 depicts a block diagram of a computer system 400 suitable for implementing aspects of the present systems and methods. The computer system 400 may be part of the electronics unit 254 of the present disclosure. Computer system 400 includes a bus 405 which interconnects major subsystems of computer system 400, such as a central processor 410, a system memory 415 (typically RAM, but which may also include ROM, flash RAM, or the like), an input/output controller 420, an external audio device, such as a speaker system 425 via an audio output interface 430, an external device, such as a display screen 435 via display adapter 440, an input device 445 (e.g., a keyboard, touchscreen, etc.) (interfaced with an input controller 450), a sensor 455 (interfaced with a sensor controller 460), one or more universal serial bus (USB) device 465 (interfaced with a USB controller 460), and a storage interface 480 linking to a fixed disk 475. A network interface 485 is also included and coupled directly to bus 405.

Bus 405 allows data communication between central processor 410 and system memory 415, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, a control module 402 which may implement the present systems and methods may be stored within the system memory 415. Control module 402 may comprise instructions to implement steps of methods disclosed herein, such as, for example, the methods of FIGS. 33-34 and other methods used to control the motor 166 and other electronics of a mixer apparatus 100. Applications resident with computer system 400 are generally stored on and accessed via a non-transitory computer readable medium, such as a hard disk drive (e.g., fixed disk 475), an optical drive (e.g., an optical drive that is part of a USB device 465 or that connects to storage interface 480), or other storage medium. Additionally, applications can be in the form of electronic signals modulated in accordance with the application and data communication technology when accessed via network interface 485.

Storage interface 480, as with the other storage interfaces of computer system 400, can connect to a standard computer readable medium for storage and/or retrieval of information, such as a fixed disk drive 475. Fixed disk drive 475 may be a part of computer system 400 or may be separate and accessed through other interface systems. A modem connected to the network interface 485 may provide a direct connection to a remote server via a telephone link or to the Internet via an internet service provider (ISP). Network interface 485 may provide a direct connection remote server via a direct network link to the Internet via a POP (point of presence). Network interface 485 may provide such connection using wireless techniques, including digital cellular telephone connection, Cellular Digital Packet Data (CDPD) connection, digital satellite data connection or the like.

Figure 4:
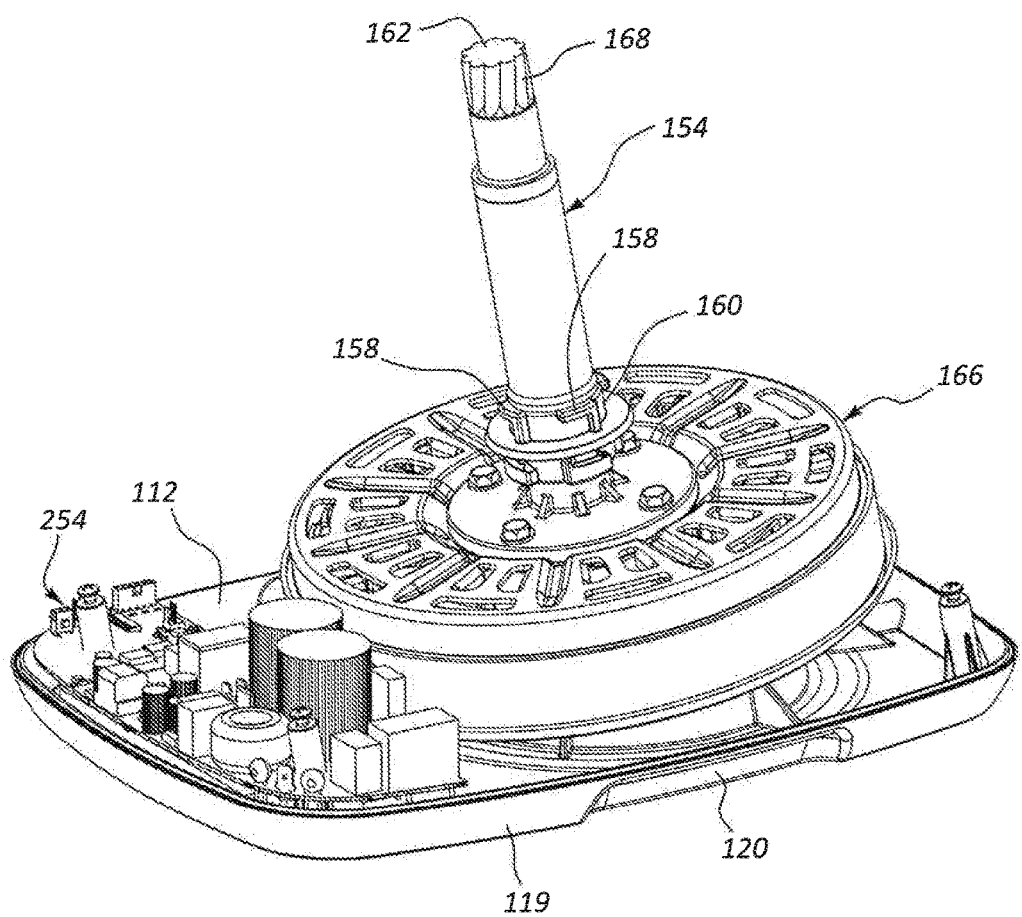
FIG. 4 is a perspective view of the mixer apparatus of FIG. 3A with the upper housing, side housing, and user interface removed.
Figure 5:
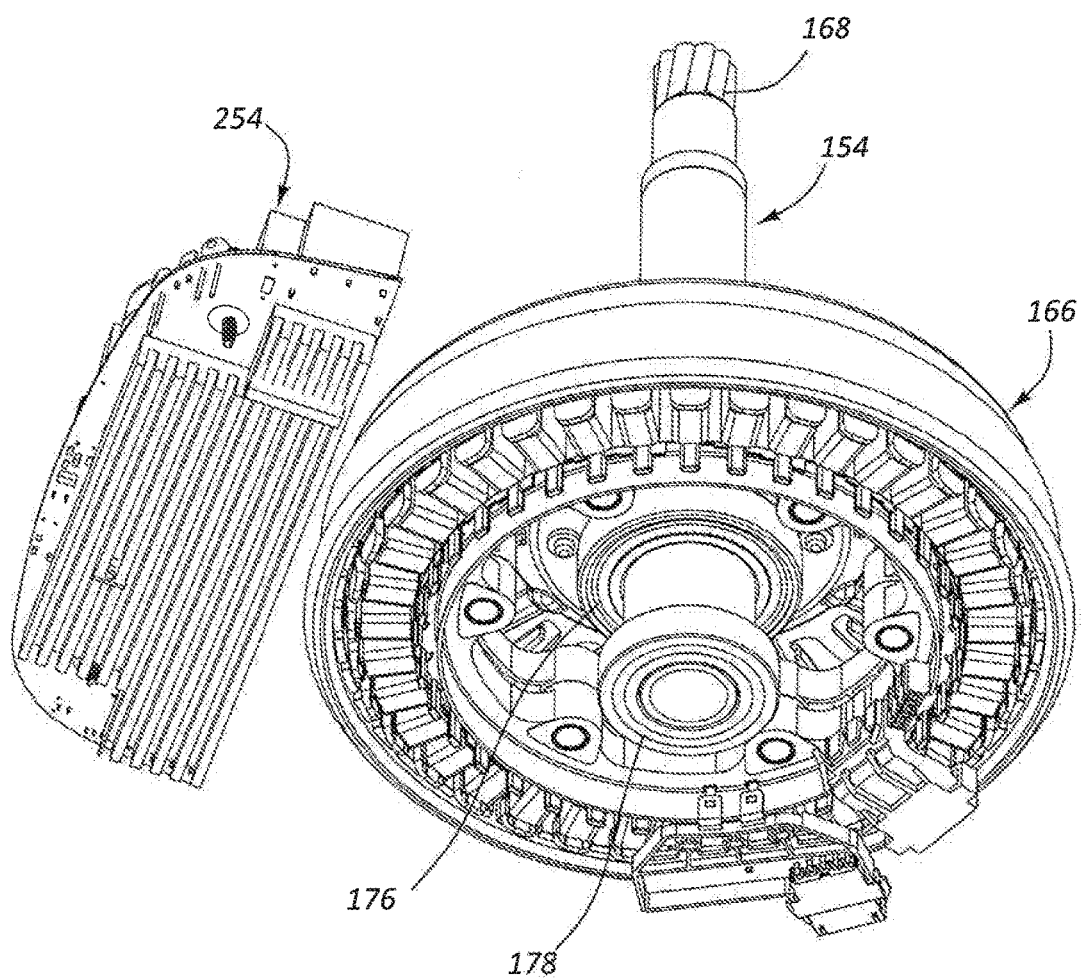
FIG. 5 is a bottom perspective view of the mixer apparatus of FIG. 4 with the lower housing removed.
Figure 6:
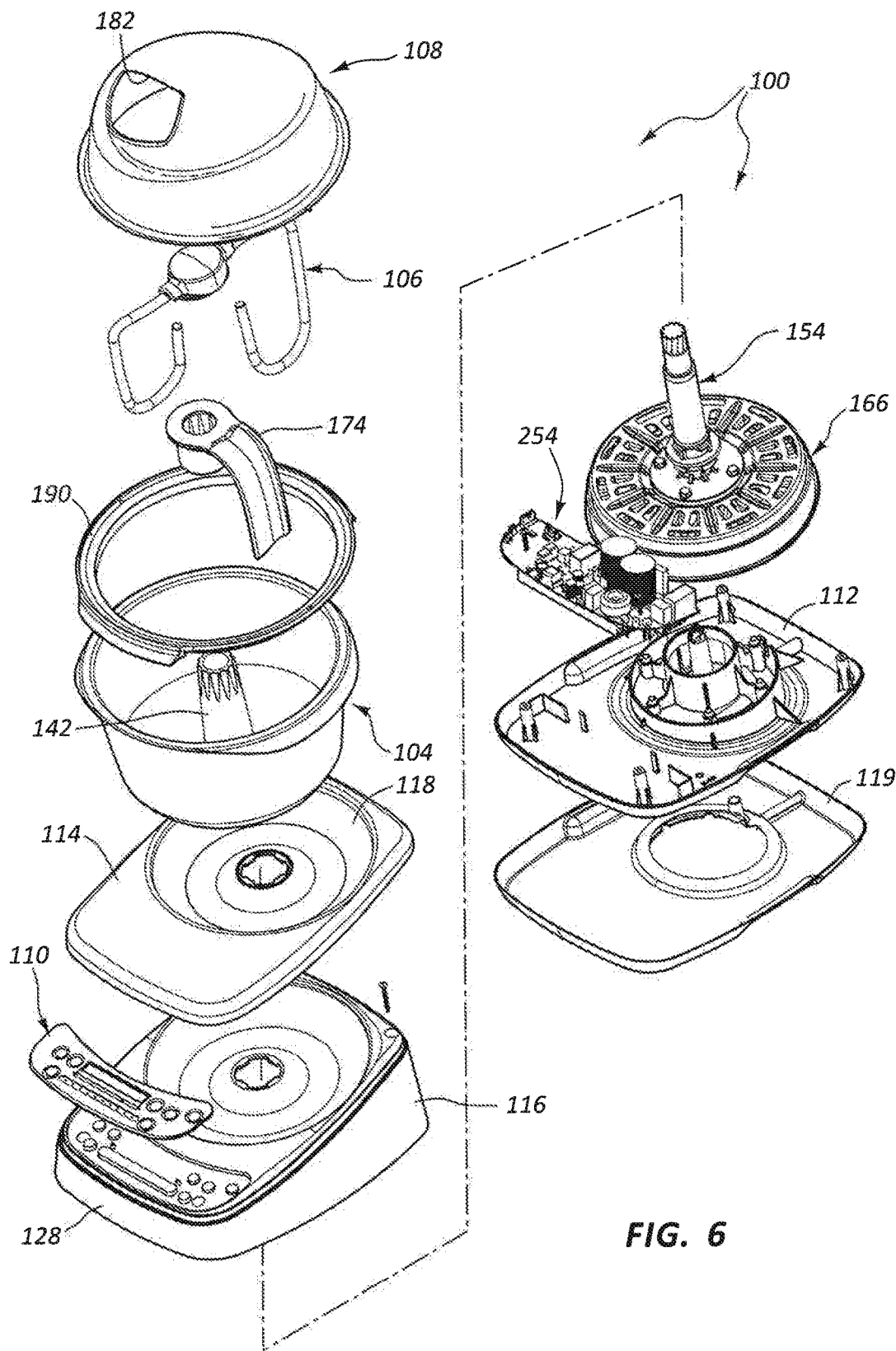
FIG. 6 is an exploded view of the mixer apparatus of FIG. 1A.

Many other devices or subsystems (not shown) may be connected in a similar manner (e.g., document scanners, digital cameras and so on). Conversely, all of the devices shown in FIG. 4 need not be present to practice the present systems and methods. The devices and subsystems can be interconnected in different ways from that shown in FIG. 4. The operation of a computer system such as that shown in FIG. 4 is readily known in the art and is not discussed in detail in this application. Code to implement the present disclosure can be stored in a non-transitory computer-readable medium such as one or more of system memory 415, or fixed disk 475. The operating system provided on computer system 400 may be MS-DOS®, MS-WINDOWS®, OS/2®, UNIX®, Linux®, or another known operating system.

Moreover, regarding the signals and network communications described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiments are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized, as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Various inventions have been described herein with reference to certain. specific embodiments and examples. However, they will be recognized by those skilled in the art that many variations are possible without departing from the scope and spirit of the inventions disclosed herein, in that those inventions set forth. in the claims below are intended to cover all variations and modifications of the inventions disclosed without departing from the spirit of the inventions. The terms "including:" and "having" come as used in the specification and claims shall have the same meaning as the term "comprising."

What is claimed is:

1. A variable engagement planetary food mixing tool comprising:
    a mixing container;
    a mixing device, comprising:
        a body having a driveshaft engagement portion and a first longitudinal axis;
        a sun gear concentric with the first longitudinal axis, the sun gear having a first helical gear surface, the first helical gear surface having a first number of gear teeth;
        a planet gear having a second longitudinal axis, the second longitudinal axis being non-parallel to the first longitudinal axis, the planet gear having a second helical gear surface extending around the second longitudinal axis, the second helical gear surface having a second number of gear teeth, the planet gear engaging the first helical gear surface of the sun gear in a plurality of positions along the second longitudinal axis, the first and second numbers of gear teeth being configured to cause the planet gear to be at a different rotational position around the second longitudinal axis each time the planet gear makes a successive revolution around the sun gear;
        a mixing member connected to the planet gear and movable around the first longitudinal axis while rotating around the second longitudinal axis as the planet gear traverses the sun gear, wherein a distal end of the mixing member is movable along the second longitudinal axis between a first axial position in contact with the mixing container and a second axial position out of contact with the mixing container.

2. The tool of claim 1, wherein the driveshaft engagement portion comprises a third helical gear surface configured to engage a gear surface of a driveshaft.

3. The tool of claim 1, wherein the sun gear comprises a bowl engagement portion, the bowl engagement portion configured to hold the sun gear stationary relative to a bowl when the bowl is inserted into the sun gear.

4. The tool of claim 1, wherein the mixing member is at least one of a hook, a whisk, a blade, or a kneading member.

5. The tool of claim 1, wherein the position of the planet gear along the second longitudinal axis is dependent upon a velocity of movement of the planet gear relative to the sun gear.

6. The tool of claim 1, wherein the position of the planet gear along the second longitudinal axis is dependent upon a force applied to the mixing member along the second longitudinal axis.

7. The tool of claim 1, wherein the first number of gear teeth is not a multiple of the second number of gear teeth.

8. The tool of claim 1, wherein the mixing member comprises a plurality of wires, each of the wires having a diameter between about 0.09 inches and about 0.2 inches.

9. The tool of claim 1, wherein the mixing member comprises a plurality of wires forming a whisk shape, each of the wires having a distal end extending away from the planet gear, wherein the plurality of wires are laterally separable from each other at the distal ends.

10. The tool of claim 1, wherein the mixing member comprises a plurality of wires forming a whisk shape, each of the wires being non-overlapping along a longitudinal axis of the mixing member.

11. A motorized food mixing apparatus having a variable engagement planetary food mixing tool, the mixing apparatus comprising:
    a base unit;
    a motor housed in the base unit;
    a driveshaft rotatable by the motor, the driveshaft having a first longitudinal axis;
    a mixing container attached to the base unit;
    a mixing tool, comprising:
        a body engaging the driveshaft;

a sun gear concentric with the first longitudinal axis, the sun gear having a first helical gear surface;

a planet gear having a second longitudinal axis, the second longitudinal axis being non-parallel to the first longitudinal axis, the planet gear having a second helical gear surface extending around the second longitudinal axis, the planet gear being movable relative to the sun gear among a plurality of axial positions on the second longitudinal axis;

a mixing member extending into the mixing container, the mixing member being connected to the planet gear and configured to move around the first longitudinal axis while rotating around the second longitudinal axis as the planet gear traverses the sun gear, a distal end of the mixing member being movable along the second longitudinal axis between a first position in contact with the mixing container and a second position out of contact with the mixing container.

12. The mixing apparatus of claim 11, wherein the mixing container comprises a post and the sun gear of the mixing tool comprises an engagement surface, wherein the engagement surface engages the post and holds the sun gear stationary relative to the post.

13. The mixing apparatus of claim 11, wherein the mixing member rests against a bottom surface of the mixing container in the first position.

14. The mixing apparatus of claim 11, wherein the first longitudinal axis is tilted away from a vertical direction.

* * * * *